United States Patent
Miller et al.

(10) Patent No.: US 7,496,890 B2
(45) Date of Patent: Feb. 24, 2009

(54) GENERATION OF CONFIGURATION INSTRUCTIONS USING AN ABSTRACTION TECHNIQUE

(75) Inventors: Matthew E. Miller, Kirkland, WA (US); Bruce L. Chamberlin, Auckland (NZ); Michael D. Lewis, Snohomish, WA (US); Shaun H. Blackmore, Auckland (NZ)

(73) Assignee: Microsoft Corporation, Redmond, WA (US)

( * ) Notice: Subject to any disclaimer, the term of this patent is extended or adjusted under 35 U.S.C. 154(b) by 717 days.

(21) Appl. No.: 10/611,688

(22) Filed: Jun. 30, 2003

(65) Prior Publication Data

US 2004/0268298 A1    Dec. 30, 2004

(51) Int. Cl.
*G06F 9/44* (2006.01)
(52) U.S. Cl. .................. 717/107; 717/108; 717/109; 717/120; 717/121
(58) Field of Classification Search ......... 717/106–109, 717/120, 121
See application file for complete search history.

(56) References Cited

U.S. PATENT DOCUMENTS

| | | | |
|---|---|---|---|
| 5,367,686 A | | 11/1994 | Fisher et al. |
| 5,414,846 A | | 5/1995 | Lemble et al. |
| 5,555,411 A | | 9/1996 | England et al. |
| 5,758,154 A | | 5/1998 | Qureshi |
| 6,080,207 A | * | 6/2000 | Kroening et al. ............ 717/172 |
| 6,430,609 B1 | * | 8/2002 | Dewhurst et al. ........... 709/220 |
| 7,152,109 B2 | * | 12/2006 | Suorsa et al. ............... 709/226 |
| 2004/0003388 A1 | * | 1/2004 | Jacquemot et al. .......... 717/174 |

OTHER PUBLICATIONS

Vaughan et al., GNU AutoConf, Automake, and Libtool, New Riders, 1st edition: Oct. 2000, pp. 21-46.*
Paul Dubois, Software Portability with imake, O'Reilly & Associates, Inc, Fisrt Edition, Jul. 1993, pp. 8-10, 21-25 and 31-38.*
Mike Lewis, "Automated Purposing Framework," accessed on Feb. 3, 2003, available at <http://www.eu.microsoft.com/serviceproviders/whitepapers/automated_purposing.asp>, 6 pages.
Hal Render and Roy Campbell, "An Object-Oriented Model of Software Configuration Management," ACM, 1991, Cat. No. 089791-429-5/91/0005/0127, pp. 127-138.

* cited by examiner

*Primary Examiner*—Tuan Q Dam
*Assistant Examiner*—Zheng Wei
(74) *Attorney, Agent, or Firm*—Lee & Hayes, PLLC

(57) ABSTRACT

A definition module generates configuration instructions used to build one or more machines. The definition module generates the configuration instructions by drawing from a generic library of configuration objects having a variety of attributes and parameters associated therewith. A pre-established template defines how the information provided in the library is organized to build groups of machines. An inheritance mechanism is provided for automatically resolving unspecified parameter values by searching through a hierarchy of objects to determine the unspecified values. The definition module includes a graphical user interface having a tree display section for displaying a hierarchical tree of objects associated with the configuration instructions, a parameter display section for displaying parameters associated with the objects in the tree display section, and a properties display section for displaying properties associated with objects in the tree display section or the parameters in the parameter display section. The configuration instructions can be easily consolidated into packages and transferred from one site to another, or downloaded from a central site.

34 Claims, 37 Drawing Sheets

```xml
- <Machine Name="MRADIUS" Description="Lab2 Rack31 DL380 - :3"
  UniqueID="D144JZG1L122" BaseFileName="MRADIUS" Vendor="HP Compaq" Model="HP
  Compaq.ProLiant.DL380.DL380Array" OperatingSystem="Windows 2000.Server SP3
  Integrated" MachineFunction="Windows 2000 Server.Base Server">
   - <Values>
        <Parameter Name="Boot.CPQVFloppyImage" Value="=Default.CPQVFloppyImage" />
        <Parameter Name="Common.Sync" Value="=Default.DomainComplete" />
     </Values>
   - <Stage Stage="PreOSStage">
        <PhaseList PhaseList="ProLiant_Standard" />
     </Stage>
   - <Stage Stage="PostOSStage">
        <PhaseList PhaseList="W2K with supoorting tools no domain" />
     </Stage>
  </Machine>
```

700

A Sample of an XML Template for a Machine

Fig. 7

A Sample of Machine.ini File Generated by the Configuration Definition Module

New Group Wizard: Select Machines to create

Please enter information about the machines in the group.    1102

Machines

| Name | Description |
|------|-------------|
| ☑ AD2 | Second AD Machine |
| ☑ WEB1 | Web Server |
| ☑ WEB2 | 2nd Web Server |

1108

Please select the machines you wish to create.

Machine Details    1106

- Name: AD2
- Unique ID: 365726473
- OS: W2kServer
- Vendor: HP Compaq
- Model: DL380Array
- Function: Domain Controller

[Details...] [Update]

1104

[< Back] [Next >] [Finish] [Cancel]

GENERATION OF CONFIGURATION INSTRUCTIONS USING AN ABSTRACTION TECHNIQUE

TECHNICAL FIELD

This invention relates to the configuration of programmable machines, and, in a more particular implementation, to the generation of instructions to configure one or more computers.

BACKGROUND

Mechanisms exist for automatically installing a software product on a computer with a minimum of human intervention. These mechanisms typically provide one or more configuration files that define a series of steps that the computer should perform to install the software product. As the installation proceeds, the computer accesses information from these files. Such information may include a collection of parameters that define values that govern the configuration process. As a result of the configuration, the computer is transformed from a generic processing unit to a specific unit for performing a specific role (such as a web server). In this sense, the installation of operating system programs and application programs can be viewed as "building" a machine.

In many business environments, building a computer infrastructure solution may require configuring a collection of computers. There is typically a cooperative relationship between the computers in such a collection. For instance, a particular business environment may include a cluster of computers (defining "nodes") configured to collectively perform a function. In another common arrangement, a business environment may include one or more backup computer systems that mirror the operation of a normal production computer system. Accordingly, the task of configuring these collections of computers must take into account the environment-specific interaction between these computers.

There are many challenges involved in configuring groups of computers. For instance, in implementing a particular solution, a business can select from a very wide variety of computer architectures, machine interconnection arrangements, vendors, models, operating systems, application programs, and so on. A system provider (e.g., a technician or engineer) must therefore be amply familiar with the technical details associated with each of these design options. For this reason, the task of generating configuration instructions often requires the services of highly skilled technicians or engineers who have a significant degree of experience with different setup options. And even with such trained individuals, it may require substantial effort and time to sort out all of the complexities involved in generating instructions for sites that include many different computers.

Moreover, because a solution may involve a unique aggregation of design options, a system provider may have difficulty modifying a solution generating for one business site for use in another business site with similar requirements. That is, the unique interdependencies in the solution may prevent the system provider from modifying a prior solution in a modular fashion to provide an updated solution. This difficulty may force the system provider to essentially start from scratch in constructing a new solution for a new business site. Needless to say, these problems may impact the business in a negative way. For instance, these inefficiencies may equate to longer than expected delays and higher than expected costs associated with the configuration task.

Tools exist to assist system providers in generating instructions for the configuration of computers. Nevertheless, there is room for substantial improvement in such tools. For instance, the tools may still approach the task of generating instructions on a case by case basis, providing scripts and protocols narrowly tailored to each case. Hence, these tools may not evolve gracefully to accommodate new architectures, interconnection arrangements, operating systems, and application programs introduced to the market. In other words, these tools may lack a general design paradigm that prevents them from efficiently managing the ever-changing myriad of design options available in constructing computer solutions.

The above-described lack of a general design paradigm also negatively impacts the efficient transfer of configuration information between different technical personnel. The transfer of information is typically accomplished by specifying an identified computer setup in a burdensome and ad hoc manner, that is, by identifying critical parameters, scripts, and interconnection arrangements using a variety of communication techniques (such as drawings, computer documentation, oral instruction, and so on). Because of the ad hoc nature of this information transfer, faulty or insufficient information may be conveyed, requiring potentially time consuming and costly rework. And even when accurate information is conveyed, the conventional approach does not provide an efficient technique for quickly deploying the solution specified in the instructions. These inefficiencies may grow in proportion to the complexity of the configuration task. As stated above, many sites require the configuration of multiple machines having a cooperative relationship. There is no efficient technique for conveying consolidated instructions that can be used to configure machines in this kind of complex environment.

Accordingly, there is a general need in the art for a more efficient and user-friendly technique for generating instructions used to configure programmable machines, such as computers.

SUMMARY

A definition module manipulates scripts used to configure one or more machines using a collection of abstract configuration objects. The configuration objects are drawn from a library of such objects. The configuration objects include a variety of attributes and parameters associated therewith. Pre-established templates define how the information provided in the library is organized to build groups of machines. Some of the objects in the library can include parameters having unspecified values. The definition module uses an inheritance mechanism to automatically resolve these unspecified parameter values on the basis of the context in which the object is being used in a particular build configuration. The manipulation of scripts on an abstract level is a particularly efficient and user-friendly method for building machines. For instance, configuration instructions can be modified on a modular basis without incurring burdensome rework of the entire build configuration. In this manner, the user is insulated from much of the intricacy involved in configuring the machines.

The configuration instructions can be consolidated into packages. In one case, a single package can be used to completely configure all of the machines located at a particular site. Further, a site can successively access multiple packages to provide multiple respective configurations to suit different processing environments (e.g., to suit different processing loads). The definition module can efficiently transmit or receive packages to/from other sites. One such other site is a central repository of configuration objects made available to users. The transfer of packages represents an efficient technique for sharing technical information between users, or between a head-end entity and its subscribers.

The definition module also includes a graphical user interface having a tree display section for displaying a hierarchical tree of objects associated with the configuration instructions, a parameter display section for displaying parameters associated with the objects in the tree display section, and a properties display section for displaying properties associated with objects in the tree display section or the parameters in the parameter display section. The user interface display provides a convenient mechanism for manipulating the configuration objects, and for conveying information regarding the configuration objects.

Additional benefits of the above-described mechanism for generating configuration instructions are set forth in the following discussion.

BRIEF DESCRIPTION OF THE DRAWINGS

FIG. 7 shows an exemplary markup language file that conforms to the schema shown in FIG. 6.

FIGS. 10-33 show different UI presentations provided by the system of FIG. 1 used to perform a variety of tasks.

Figure 1:
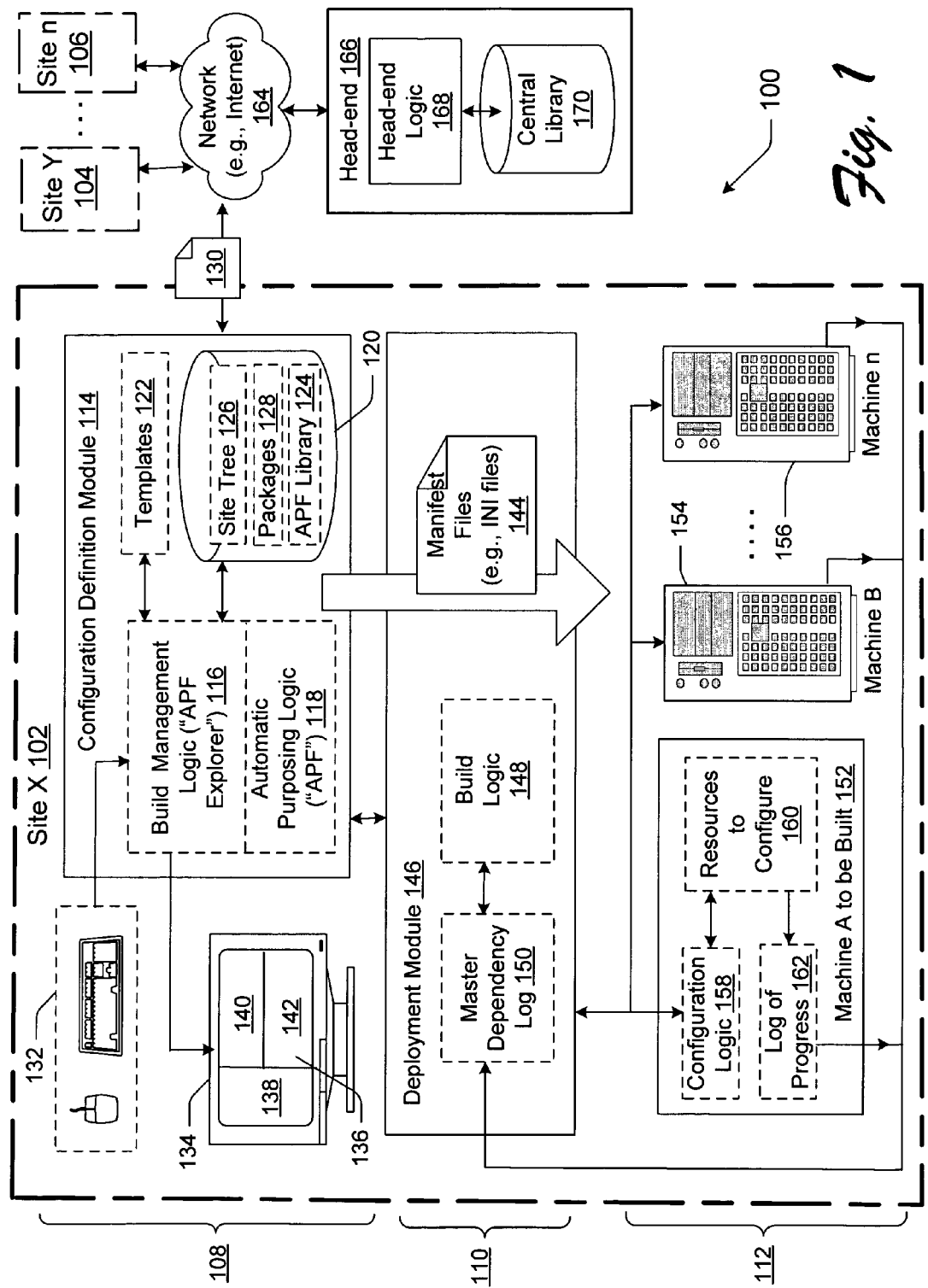
FIG. 1 shows an exemplary system for defining instructions for the configuration of a collection of machines, and for using those instructions to configure the collection of the machines.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure pertains to the configuration of electronic programmable machines (henceforth referred to as simply "machines"). The task of configuring the machines is also referred to as "building" herein; this terminology reflects the fact that the configuration effectively transforms the machine from a generic machine into a specific machine that serves a specified role. In one exemplary implementation, the techniques described herein can be applied to the configuration of a single electronic machine in either a home-use context or business-use context (or other context). In another exemplary implementation, the techniques described herein can be applied to the configuration of multiple machines in a home-use context or business-use context (or other context). In the case of multiple machines, there may be interrelationships in the functionality provided by the machines that should be taken into account in the configuration of any member of such a collection of machines.

The term "machine" used herein has broad connotation. The term generally represents any kind of resource that can be configured by installing machine instructions on the resource. A "machine" is most often identified in this disclosure as some kind of computer, such as a general purpose computer or an application-specific computer. A computer is programmed by storing machine instructions, in its memory, that define its operating system and application programs. Servers represent one class of computers designed to provide services to users via a network, such as the Internet, an intranet, a LAN, etc. In addition, in other implementations, the techniques described herein can be applied to other kinds of devices, such as routers, network switches, network storage devices, programmable control systems, and so on.

The term "configuration instructions" used herein has broad connotation as well. It refers to any kind of information that can be generated that specifies the steps that a machine should sequence through to install a particular software product. The configuration instructions may include scripts that specify a series of actions that the machine should perform. The configuration instructions may also include one or more parameters that define environment-specific settings that govern the setup. The configuration instructions may also include one or more links (i.e., references) to other collections of configuration instructions. The configuration instructions may prompt the machine to install an operating system, application program, and/or other kind of code or information that defines it functionality.

Generally speaking, the tools described herein for generating instructions for configuring machines can be implemented in hardware, software, or combination of hardware and software.

This disclosure is organized as follows. Section A of this disclosure provides an overview of exemplary techniques and implementations for generating and applying configuration instructions. Section B discloses exemplary user interface (UI) presentations that assist a user in the generation of the configuration instructions, as well as other tasks. Section C provides additional exemplary details regarding the operation of a system for generating configuration instructions described herein. And Section D provides an exemplary computer environment for generating the configuration instructions.

A. Overview of Techniques and Implementations

Exemplary System

FIG. 1 shows an exemplary system 100 for generating instructions for the configuration of a collection of machines, and for applying those instructions to the collection of machines. More specifically, FIG. 1 shows multiple sites: site X 102, site Y 104, and site n 106 (where "n" generally indicates the last of a plurality of sites). A "site" generally represents infrastructure associated with a collection of machines to be built (i.e., configured). For instance, different sites can correspond to different businesses having respective groups of machines to be configured. Alternatively, different sites can correspond to different parts of an infrastructure associated with a single business. Other variations on this site-based motif are possible.

The functionality associated with the exemplary site X 102 is divided into three categories shown in FIG. 1. In a first category, equipment 108 generally represents functionality for defining or generating the configuration instructions, as well as other high-level managerial tasks, such as the transfer or receipt of configuration instructions to/from other sites. In a second category, equipment 110 represents functionality for coordinating the actual building of the machines. In a third category, equipment 112 represents the machines to be built. In this last category of equipment 112, three server-type machines are shown, although any number or type of machines can be built (including only one machine). The functionality in each of the above-described categories will be discussed in turn in the following explanation.

To begin with, equipment 108 includes a configuration definition and management module 114 (referred to for brevity as the "definition module" 114 henceforth). The definition module 114 generates the instructions used to build the machines in the collection of equipment 112. To perform this task, the definition module 114 includes build management logic 116 and automatic purposing logic 118. The automatic purposing logic 118 provides functionality for manipulating a collection of scripts and associated parameters that can be assembled to create the configuration instructions. An exemplary software product that can be used for this task is the Automatic Purposing Framework (APF) software product produced by Microsoft Corporation of Redmond, Washington. The build management logic 116 provides a so-called "front end" to the automatic purposing logic 118. More specifically, the build management logic 116 provides a technique for abstracting parameters provided by the automatic purposing logic 118 so that these parameters can be handled in a more efficient and flexible manner than heretofore provided. In other words, the build management logic 116 "manages" the parameters provided by the automatic purposing logic 118 so that they can be manipulated in more effective ways than heretofore provided. The build management logic 116 also provides functionality for providing user interface (UI) presentations that allow a user to interact with the build management logic 116 in a user-friendly and efficient manner. The build management logic 116 also performs other tasks, to be discussed in due course. The build management logic 116 is also referred to by an exemplary name of "APF Explorer" software product. However, it should be noted that the design concepts discussed here are not limited in application to the Automatic Purposing Framework software product.

The build management logic 116 and the automatic purposing logic 118 interact with a database 120 and a template storage 122. The database 120 stores a collection of objects that allow a user to manage the parameter information provided by the automatic purposing logic 118. More specifically, the database 120 can be conceptualized as including at least three groupings of information. In a first grouping, an APF library 124 (henceforth simply "library 124") defines building blocks that a user can string together to provide configuration instructions for a specific collection of machines (or other resources). More specifically, as will be discussed in connection with FIG. 5, such building blocks are grouped into different categories, such as objects pertaining to different available vendors, objects pertaining to different operating systems, objects pertaining to different machine functions, objects related to stages and phases involved in configuring machines, and so on. The objects stored in the library 124 are maintained in a relatively general, generic, and standardized form. For instance, while some parameters associated with the objects in the library 124 are specified in advance, other parameters are left open-ended and will assume specific values only when used to construct configuration instructions for a specific combination of machines at a site. For example, a parameter in the library 124 might have a generic value of "Default.DistUser," which might resolve to the specific value of "administrator" when used in a particular build environment. The generic and flexible nature of the library 124 has notable advantages, as it allows common building blocks to represent many different configuration options; this is in contrast to prior solutions, which attempted to construct unique proprietary solutions for different configuration options without regard to any common principles binding different solutions together.

A second grouping in the database 120 pertains to a site tree arrangement of objects 126 (henceforth simply "site tree 126"). More specifically, the building blocks provided in the library 124 can be assembled to form a hierarchical organization of objects representative of machines to be configured at a particular site (such as site X 102). For example, assume that a particular site includes two groups of machines, G1 and G2, where group G1 includes machines M1 and M2, and group G2 includes machines M3 and M4. In this case, the site tree 126 would represent a collection of objects taken from the library 124 that represent such an organization of machines.

A third grouping in the database 120 represents packages 128. Packages 128 refer to collections of objects in the database 120 that are assembled together as a single file. This allows the packages to easily be transferred from one site to another.

The database 120 can be implemented using different kinds of technology, such as structured query language (SQL) technology.

On the other hand, the template storage 122 provides information pertaining to templates. Templates serve at least two roles in the definition module 114. According to a first role, the templates can be used to provide a skeleton representation of a machine or group of machines specified in the site tree 126 (or elsewhere). This skeleton representation conforms to a predetermined form (schema) and contains enough information, in combination with information in the library 124, to reconstruct a description of a group of machines or a single machine. In one exemplary implementation, the template information is expressed in a markup language, such as the Extensible Markup Language (XML). Templates stored in the template storage 122 can be exported and transferred to other sites, where they can be used to generate configuration instructions at such other sites. The build management logic 116 can also cull a subset of information from the database 120 and organize it into a package (represented by package objects 128), and then transfer this package to another site.

FIG. 1 shows the transfer of an exemplary template or package 130 to a remote site, such as site Y 104. The transfer of XML templates and packages 130 between sites provides an efficient way of conveying configuration instructions between sites. As mentioned in the BACKGROUND section of this disclosure, the transfer of instructions in prior systems was handled in a non-systematic, not-standardized, ad hoc manner.

According to another role, in one implementation, groups of machines in the site tree 126 are specified by filling out a template that governs the organization and nature of machines in the group. The makeup of individual machines in the group is also specified by filling out a template that governs the basic features of the machine. As will be described in greater detail in Section B, this functionality can be implemented by sequencing the user through a series of configuration guidance displays that prompt the user to fill out the predetermined templates.

Input devices 132 are provided that allow a user to interact with the build management logic 116. Such input devices 132 may include a conventional keyboard and mouse-type pointing device, but can include any kind of input device (such as voice recognition, touch-sensitive screen input, etc.).

A display device 134 is provided for receiving and displaying information generated by the build management logic 116. The display device 134 may comprise a computer monitor or other electronic display apparatus having a graphical user interface (GUI) presentation 136. In one exemplary implementation, the GUI 136 organizes information into three panels or panes. Pane 138 shows the organization of a collection of objects stored in the library 124 of the database 120 in hierarchical tree form. Pane 138 also shows the organization of a collection of objects in the site tree 126 of the database 120 in hierarchical tree form. Pane 138 also shows the organization of a collection of objects in the packages 128 of the database 120 in hierarchical tree form. On the other hand, pane 140 shows one or more parameters associated with a highlighted object in pane 138. Pane 142 shows one or more properties associated with a highlighted item in either pane 138 or pane 140. For instance, if a user selects and highlights one of the parameters shown in pane 140, then pane 142 will present information regarding the properties of the highlighted parameter. Additional details regarding the information presented in panes 138, 140, and 142 are provided in Section B below.

The build management logic 116 generates one or more files that specify the configuration instructions. A collection of such files is referred to as manifest files 144. The manifest files 144 can include a file having the extension ".INI." An INI file specifies the information required to configure a machine. For instance, this file may specify various scripts used to configure the machine, as well as various parameters associated with the scripts. For example, a file "Machine_A.INI" would provide the information required to configure a machine named "Machine_A." The manifest files 144 may also include a so-called answer file that specifies a number of parameters used in installing an operating system on a machine. The manifest files 144 may also include a synchronization file that specifies various dependencies that govern building several machines in parallel. For instance, a particular machine may reach a point in its configuration where it needs the support of (or information provided by) another machine that is concurrently being built. The synchronization file in the manifest files 144 provides information that specifies such dependencies.

Advancing now to the middle tier of FIG. 1, equipment 110 includes a deployment module 146. The deployment module 146 can represent a server or other kind of computer device that coordinates the configuration of the machines in the collection of equipment 112. It performs this task using build logic 148, in conjunction with the manifest files 144 specified by the build management logic 116. Build logic 148 is also coupled to master dependency logic 150. The master dependency log 150 stores information regarding the progress of each machine in executing its allocated configuration tasks. This information serves as a central repository that can be accessed by any machine in the collection of equipment 112. As will be discussed, the machines use this information to ensure that they perform their allocated configuration tasks in a synchronized and cooperative manner.

Finally, in the lowest tier in FIG. 1, equipment 112 is shown as including three machines (152, 154, 156) to be built, such as three servers. The machines (152, 154, 156) can represent standalone units. In this case, these machines (152, 154, 156) can be individually configured without taking into consideration the configuration of other machines. Alternatively, the machines (152, 154, and 156) can be arranged in a group in which the machines (152, 154, 156) interact with each other to collectively provide some functionality. In this case, the machines (152, 154, 156) may have to be configured in a specific order. The synchronization file specified in the manifest files 144 provides information regarding the interdependencies involved in configuring multiple machines. That is, this file ensures that, in the configuration process, no machine attempts to use a resource before it is built. Also, as mentioned above, the master dependency log 150 in the deployment module 146 can be used to inform each machine of the progress of other machines in performing their respective configuration tasks. Thus, as described above, the synchronization file and the master dependency log 150 collectively provide a mechanism by which the machines (152, 154, 156) can coordinate their allocated configuration tasks with respect to each other.

Figure 2:
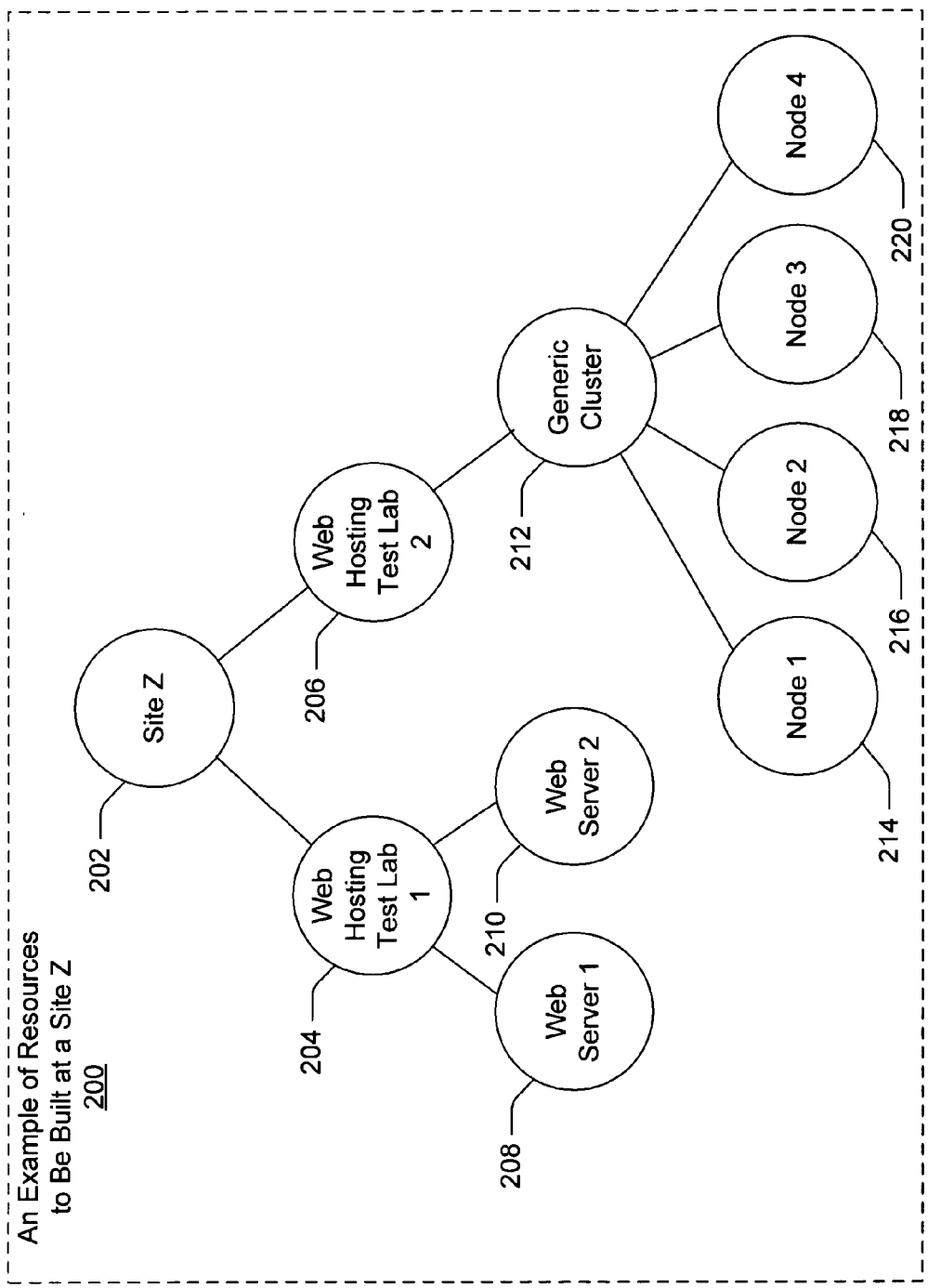
FIG. 2 shows an exemplary collection of machine resources that can be built using the system of FIG. 1.

Jumping ahead briefly in the sequence of figures, FIG. 2 provides an exemplary grouping of machine resources available at a particular site, as represented in site tree 126 of the database 120. The grouping is arranged in tree form to represent the hierarchical relationship between different features of the grouping. A topmost "site Z" object 202 generally represents an aggregate of all of the equipment to be configured at a site Z. Objects 204 and 206 represent subgroupings of equipment within the site Z object 202. Namely, object 204 pertains to a first web hosting test lab, while object 206 represents a second web hosting test lab. The first web hosting test lab includes first and second web servers, represented by objects 208 and 210, respectively. The second web hosting test lab includes a generic cluster represented by object 212. The generic cluster, in turn, includes an exemplary collection of four nodes represented by objects 214, 216, 218, and 220. In summary, in FIG. 2, the bottom leafs of the tree (corresponding to objects 208, 210, 214, 216, 218, and 220) represent actual machines (e.g., computers) that require configuration. The higher nodes in the tree conceptually represent different groupings of the actual machines in the lower leafs of the tree. Again, however, the specific grouping of machines in FIG. 2 is merely illustrative of one of a myriad of different configuration options that the system 100 shown in FIG. 1 can be applied to. Other multi-computer sites may include various groupings of production and backup computers, etc. Further, the system can be used to configure other kinds of machines, such as routers, networks switches, network storage devices, and so on. The definition module 114 can send these kinds of devices a sequence of commands and parameter values to configure them.

Returning to FIG. 1, machine 152 illustrates exemplary internal features of one of the machines in the equipment 112. As shown in this figure, machine 152 includes configuration logic 158 that coordinates the configuration of machine A. In one implementation, the manifest files 144 can be stored in the deployment server 146 during initial stages of the initialization process, but can thereafter be downloaded into individual respective machines. Configuration logic 158 can store information obtained from the manifest files 144, as well as additional configuration-related information that is downloaded to machine 152 (or obtained from some other source).

The actual "target" of the configuration procedure is the resources 160. The resources 160 can represent memory that is to receive an operating system, one or more application programs, or other information. The resources 160 can also represent other mechanisms that can be changed from one state to another depending on the configuration instructions specified in the manifest files 144. For instance, such other mechanisms could therefore encompass any kind of switching or routing mechanisms.

Machine 152 also includes its own progress log 162. The progress log 162 stores an indication of how far the machine 144 has advanced in its configuration. Information stored in progress log 162 can be forwarded to the master dependency log 150 in the deployment module 146; this allows other machines to be apprised of this machine 152's configuration progress.

Generally, FIG. 1 separates different functional aspects of the system 100 into separate modules to facilitate discussion. However, a collection of these modules can be implemented by a single computer device. For instance, the build management logic 116 can be implemented on the same computer device as the deployment module 146. On the other hand, other modules that are shown as coupled together can alternatively be implemented as separate computer devices. For instance, the build management logic 116 and automatic purposing logic 118 can be implemented on separate computers. Other such implementation arrangements are possible. Generally, any module can be coupled to any other module by a hardwired link, by a network, or by another kind of coupling strategy. As mentioned above, any of the logic shown in FIG. 1 can be implemented as software-based machine instructions, firmware, or a combination of software and firmware.

Finally, although not shown, the build management logic 116 can be incorporated within other kinds of application programs and associated business environments, such as order entry programs, image deployment, asset management solutions, etc. In this context, the build management logic 116 is used as a tool within such other kinds of business environments.

Figure 3:
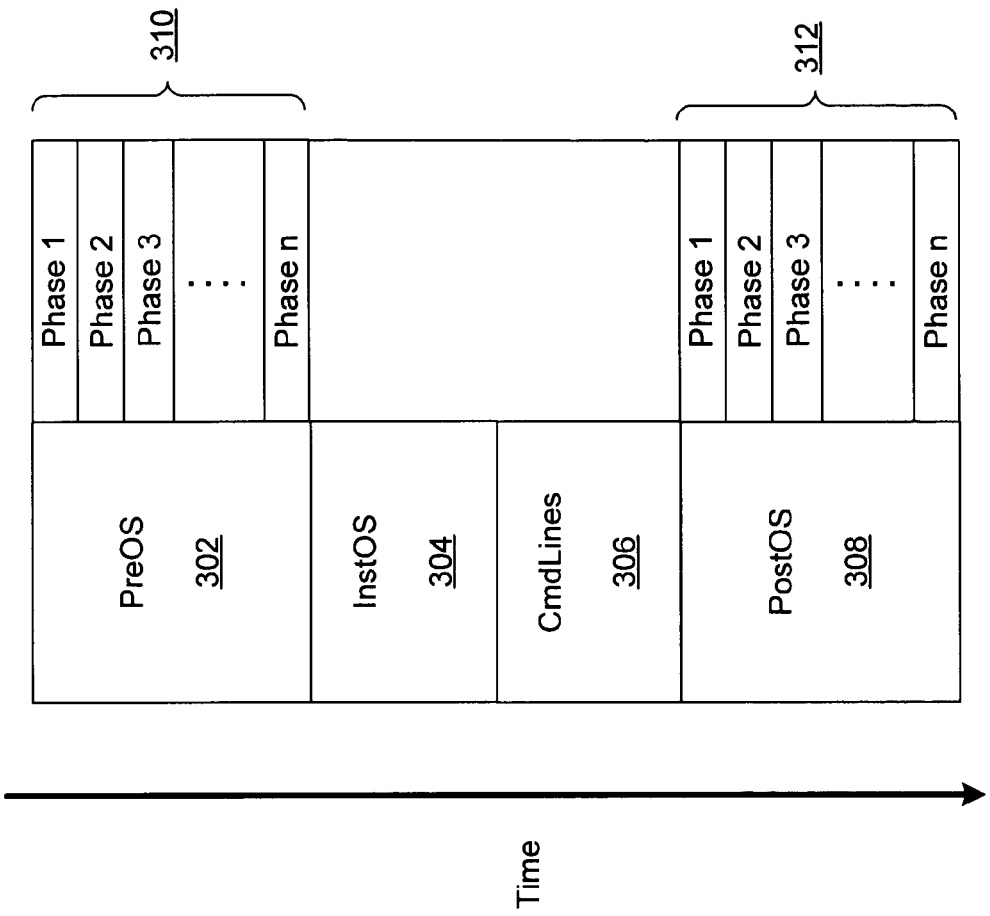
FIG. 3 shows a technique for configuring a machine by breaking the configuration task into a series of stages, each of which may include a plurality of phases.

In one exemplary configuration, each of the machines shown in FIG. 1 is configured by progressing through a series of stages. And each stage, in turn, may include multiple phases that are executed in a prescribed sequence. FIG. 3 shows details of one such strategy for configuring a machine using a series of stages and phases. Namely, the configuration proceeds by sequencing through, in order, a PreOS stage 302, an InstOS stage 304, a CmdLines stage 306, and a Post OS stage 308. The PreOS stage 302 includes a series of phases 310 performed in the top to bottom order specified in FIG. 3. The PostOS stage 308 includes another series of phases 312 shown in FIG. 3. A first phase list (not shown) can be used to reference the collection of phases 310, and a second phase list (not shown) can be used to reference the collection of phases 312.

The PreOS stage 302 involves the configuration of hardware BIOS, RAID arrays, and similar resources. This stage 302 also creates and formats disk partitions for installing an operating system. The InstOS stage 304 initiates the automated installation of the operating system. The CmdLines stage 306 updates the operating system to automatically run the PostOS stage 308 after the installation of the operating system completes and the computer device reboots; hence, the CmdLines stage 308 is performed relatively late in the installation of the operation system. Finally, the PostOS stage 308 performs actions that configure the computer for its intended purpose after the operating system installation.

FIG. 3 reflects only one exemplary implementation that associates phase lists with the PreOS stage 302 and the PostOS stage 308. However, other implementations can associate phase lists with any other combination of stages, including, in one case, stages 302, 304, and 308, and, in another case, all of the stages. Further, the stages shown in FIG. 3 are also exemplary. Other applications may employ different types of stages and different numbers of stages.

Illustrations of exemplary phases will be presented in Section B of this disclosure. Generally, a phase invokes one or more scripts that perform a prescribed configuration task. The phase may also specify one or more parameters which supply values used in performing the configuration task. For instance, a parameter might specify a numerical value that governs the setup of a piece of hardware used in the machine. Another parameter might act as a pointer to information stored in a database or on a network (such as the Internet). These are merely illustrations of the flexible role of parameters in the configuration process. Generally, the database 120 stores these parameters, and the build management logic 116 manages these parameters by manipulating these parameters in useful and efficient ways.

Transfer of Configuration Information

Returning to FIG. 1, a network 164 couples the multiple sites (102, 104, . . . 106) together. The network 164 can represent any kind of network, such as a wide area TCP/IP network (e.g., the Internet), an enterprise-wide intranet, a LAN, and so on. The network 164 can be implemented using various types of hardwired links and/or wireless links. In one configuration, the sites (102, 104, . . . 106) can directly transfer templates and packages to each other using any kind of file transfer technology, such as file sharing.

In addition, a head-end site 166 provides configuration-related services to each of the sites (102, 104, . . . 106). The head-end site 166 can be implemented as a server. It can include head-end logic 168 for performing host-related tasks, as well as a database 170. Any of the sites (102, 104, . . . 106) can download templates and packages from the database 170 of the head-end site 166 (and can also upload templates and package to the database 170). The head-end site 166 can also coordinate the transfer of templates and packages between sites (102, 104, . . . 106). In operation, URL (Uniform Resource Locator) information (or other identifying information) can be associated with templates and packages stored at the head-end site 166. To retrieve a particular resource, a user can specify the URL corresponding to the desired resource. The head-end site 166 can provide various web pages (not shown) which assist the user in retrieving the desired resource. The web pages can provide search functionality for finding a particular resource based on specified key terms. The web pages can also provide catalog-type listings of available resources. As will be described below, different users can be assigned to different groups. In this case, the head-end site 166 can be configured to provide different levels of access to different groups of users.

In one case, a package can be created to configure all of the machines located at a particular site. Thus, it is easy to build a relatively complexity group of interrelated machines by downloading a package from another site or the head-end site 166. In one case, a site can receive multiple packages. These packages specify different configurations for the site's machines to suit different processing objectives and requirements. A site user can thus dynamically change the configuration of the machines located at the site simply by loading another package and using this package to generate new configuration instructions for dissemination to the machines. For example, a site user may choose to dynamically vary the configuration at a site in response to changes in traffic load experienced at the site, or based on a predetermined schedule for such changes. In another implementation, a site can be configured to automatically apply a different package in response to detected changes in the processing environment. Alternatively, a user at the head-end site can configure the machines located at a remote site without involvement of personnel at that remote site, or with minimal involvement of personnel at that site. Still alternatively, the head-end site 166 can be configured to automatically configure machines located at a remote site in response to detected changes in the processing environment affecting that site. Still other permutations on this design strategy are possible.

The above-described system can be used in a number of different commercial environments. In one case, a group of users can cooperatively maintain the head-end site 166 for their collective use. In this context, users at different sites can upload packages that might be of use to other users, as well as download packages from the head-end 166 created by other users. In another case, a third party entity can offer the resources of the head-end site 166 to subscribing users. Such an entity may offer the resources free of charge or for a fee, or on some other basis. For instance, this would provide a convenient mechanism for both computer manufacturers and software developers to disseminate software to interested recipients. Such software can provide the base-level initial programming of the kind illustrated in FIG. 3, as well as application programs or other instructions to already configured machines.

Although only one head-end site 166 is shown, the system 100 can include multiple head-end sites.

The SQL Database

The object-oriented design paradigm is used to organize information in the database 120. Generally, in this design approach, entities are represented as objects. Objects are organized in hierarchies, where each object may have a child object, and each child object, in turn, may have its own child object. Each object may also have attributes and parameters associated therewith.

More specifically, within an exemplary hierarchy, the object-oriented approach provides the following general root objects in the present case: Site (represented the root site); Vendors (representing a collection of vendors); OperatingSystems (representing a collection of top level operating systems); Machinefunctions (representing a collection of top level machine functions); 'Stage Name' (representing names of stages, including Boot, Common, PreOSStage, InstOSStage, and PostOSStage); 'OperatingSystem' (representing each top level operating system); 'MachineFunction' (representing each top level machine function); and 'Vendor' representing each top level vendor.

Within the context of a particular machine, the following root objects are also available: Machine (representing the current machine's object); Vendor (representing the current machine's vendor object); Model (representing the current machine's model object); OperatingSystem (representing the current machine's operating system object); MachineFunction (representing the current machine's machine function object); Group (representing the current machine's parent group object); and Default (allowing the referencing of a parameter specified at any level of the machine group or site hierarchy).

Further, each object in the database 120 has inherent attributes associated with it. The following exemplary attributes are common to each object: ID (representing an internal ID assigned to the object); Name (representing a name assigned to the object); Description (representing a description of the object); Version (representing the object's version number); Owner (representing an individual authorized to perform some action on the object, such as updating the object); OwnerID (representing an ID assigned to the object's owner); Parent (representing the object's parent); and ParentMachine (Representing the parent machine of the object if it exists).

Also, an object may have one or more child objects associated therewith. For instance, the Site object has a MachineGroups child object associated therewith. The MachineGroup object has MachineGroups and Machine child objects associated therewith. The Vendor object has a Models child object associated therewith. The Model object has a Models child object associated therewith. The OperatingSystem object has an OperatingSystems child object associated therewith. The MachineFunction object has a MachineFunctions child object associated therewith. And the Machine object has a Stages child object associated therewith.

The database 120 therefore contains fine-grained information regarding items involved in the configuration (where such "items" can refer to objects representing a group of machines, a machine, a stage of a machine's configuration, a phase of a stage, a parameter, and so on). In other words, the configuration items may be thought of as forming a hierarchical tree having a plurality of nodes. Different kinds of information can be "attached" to (i.e., associated with) different nodes in the tree in a highly granular fashion. Some of the fine-grained information simply identifies or describes the configuration items. Some of the information refers to validation rules applicable to the configuration item. (Validation rules govern the kind of error checking that the build management logic 116 performs when a user enters information regarding any of the configuration items. For instance, the validation rules may ensure that the entered data has a prespecified format or type, etc.) Some of the information refers to how the configuration items are displayed on the user interface 136 or printed out in the manifest files 144, or refers to the behavior of the thus displayed configuration items (e.g., how the user can subsequently edit the configuration items). Some of the information pertains to the individual who owns the configuration item. An "owner" may correspond to the individual who created or specified the parameter; therefore, that owner alone may have access rights to change it or export it, etc. Some of the information pertains to the version of the objects and parameters stored in the database 120. In one implementation, a new version of an object or parameter is created each time it is modified. This is merely a representative sampling of different kinds of information that can be associated with the "nodes" in the trees provided in the database 120. It bears repeating that the information stored in the database 120 mainly pertains to pointer type information which ultimately resolves by forming a series of instructions used to configure a collection of machines; however, in interacting with the database 120, the user is not typically manipulating the scripts themselves, but an abstract object framework that represents the scripts, and ultimately refers to the scripts.

Figure 4:
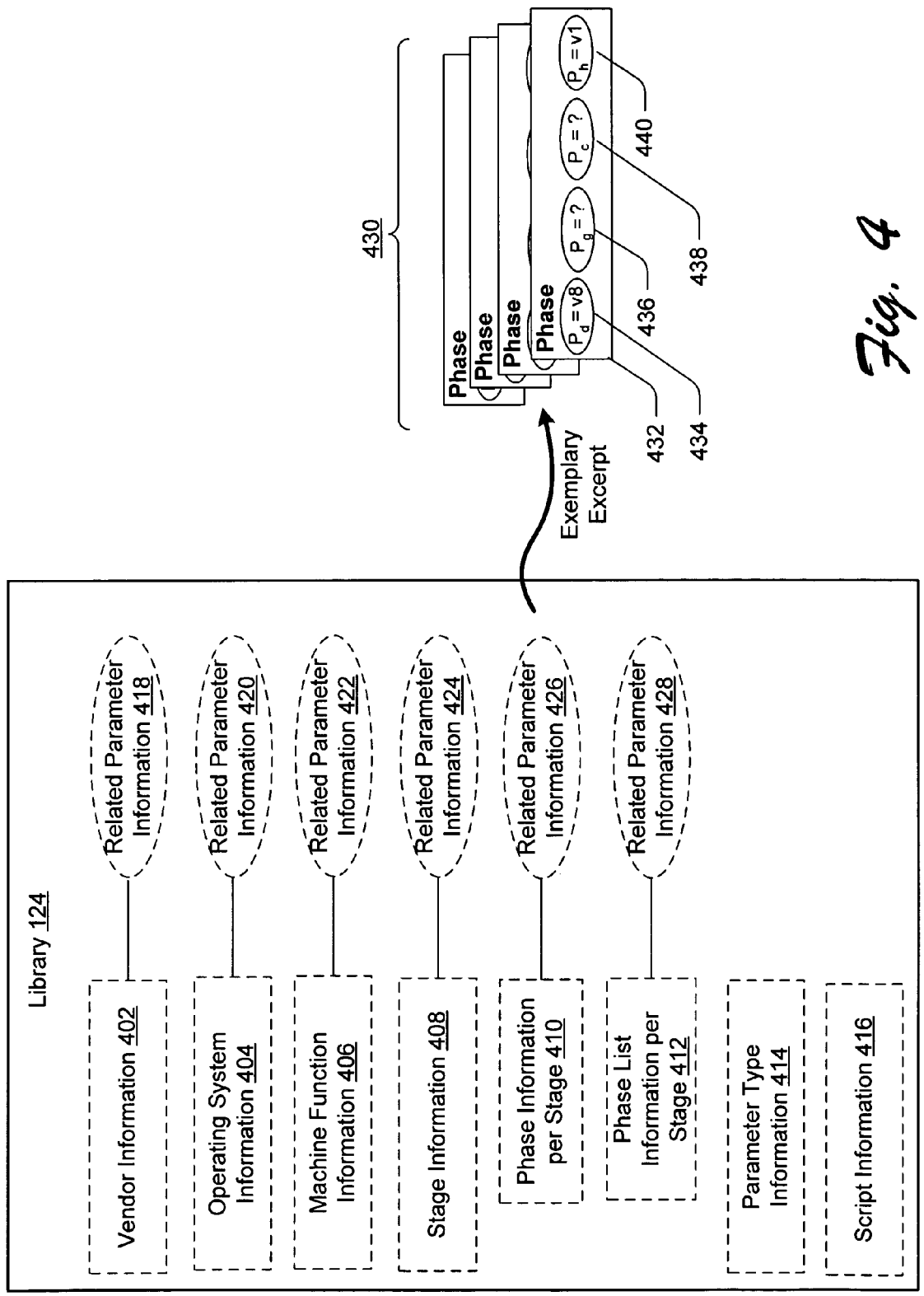
FIG. 4 shows information stored in a library provided in the system of FIG. 1.

FIG. 4 shows an exemplary organization of information stored in the library 124 in greater detail, and is used as a vehicle for explaining additional features and merits of the database 120 organization. The library 124 contains vendor information 402 that identifies different manufacturers (or, more generally, providers) of machines and other configurable resources. The library 124 also contains operating system information 404 that pertains to a collection of operating systems that can be installed on the machines as part of their configuration. The library 124 also includes machine function information 406 that specifies the functions performed by the machines. For instance, a machine can be configured such that it serves the role of a web server; hence, a web server is one of the functions that this machine can perform if properly configured. The library 124 also includes stage information 408, phase information 410, and phase list information 412. This information specifies stages, phase lists, and individual phases that can be used to configure a machine at a particular site. The library 124 can also provide parameter type information 414 that identifies a variety of types associated with parameters specified in the library 124. The library 124 can also include script information 416 that provides the actual instructions used to perform a particular configuration task within a configuration. For instance, different phases can include pointers to scripts which respectively perform the tasks associated with the phases.

The site tree 126, on the other hand, typically contains information regarding the site that provides the machines to be configured. The site tree 126 contains group information regarding an organization of machines in one or more groups. The site tree 126 also includes machine information regarding machines provided in the individual groups, each of which includes stage, phase list, and phase information associated therewith as specified in the library 124. As mentioned above, the above-identified information in the library 124 and the site tree 126 can be associated with one or more objects in the database 120.

Different parameters pertain to different respective aspects of the configuration operation. Accordingly, different parameters can be associated with different respective objects in the database 120. For example, a collection of parameters may have a global bearing on the configuration of multiple machines within a site, while another collection of parameters have a relatively local role in executing one phase within a collection of phases that make up a stage. In the former case, the database 120 can associate the high-level parameters with corresponding high-level objects within the database 120. In the latter case, the database 120 can associate the low-level parameters with corresponding low-level objects within the database 120. FIG. 4 illustrates the above-described object/parameter mapping as follows: parameter information 418 is associated with vendor information 402; parameter information 420 is associated with operating system information 404; parameter information 422 is associated with machine function information 406; parameter information 424 is associated with stage information 408; parameter information 426 is associated with phase information 410; and parameter information 428 is associated with phase list information 412. The information shown in FIG. 4 is merely illustrative of the kinds of information that can be stored in the database 120; other implementations can include additional configuration objects, or can omit certain configuration objects shown in FIG. 4. Parameters can be associated with different nodes in the site tree 126 in a similar manner to that described above.

FIG. 4 also conceptually shows an excerpt from the phase information 410 and associated parameter information 426 of the database 120. The excerpt shows a set of phases 430 that compose a phase list used in a particular stage in the configuration of a machine. As indicated in this figure, each phase can have one or more parameters associated therewith. For example, in an illustrative case, phase 432 can have parameters 434, 436, 438, and 440 associated therewith.

As described above, the library 124 does not attempt to capture the complete universe of parameter value permutations possible in different applications. Rather, the library 124 specifies fixed values for a first class of parameters, but the library 124 leaves the values of other parameters open-ended (that is, unspecified) for a second class of parameters. The values for the parameters in the second class can be provided (or instantiated) when objects in the library are assembled together to define a particular configuration environment involving a collection of machines in the site tree 126. The values for the first class of fixed parameters can be specified in advance because, for instance, these values do not change depending on the design context in which their associated configuration object is used. FIG. 4 conveys these concepts in high-level form using the particular collection of parameters (434, 436, 438, and 440) associated with phase 434. Namely, parameters 434 and 440 have fixed values that do not change when the configuration object representing the phase 434 is "inserted" into a specific design solution in the site tree 126. On the other hand, parameters 436 and 438 have open-ended (unspecified) values. The values for these parameters can be specified when the configuration object representing the phase 432 is inserted in a specific design solution.

Figure 5:
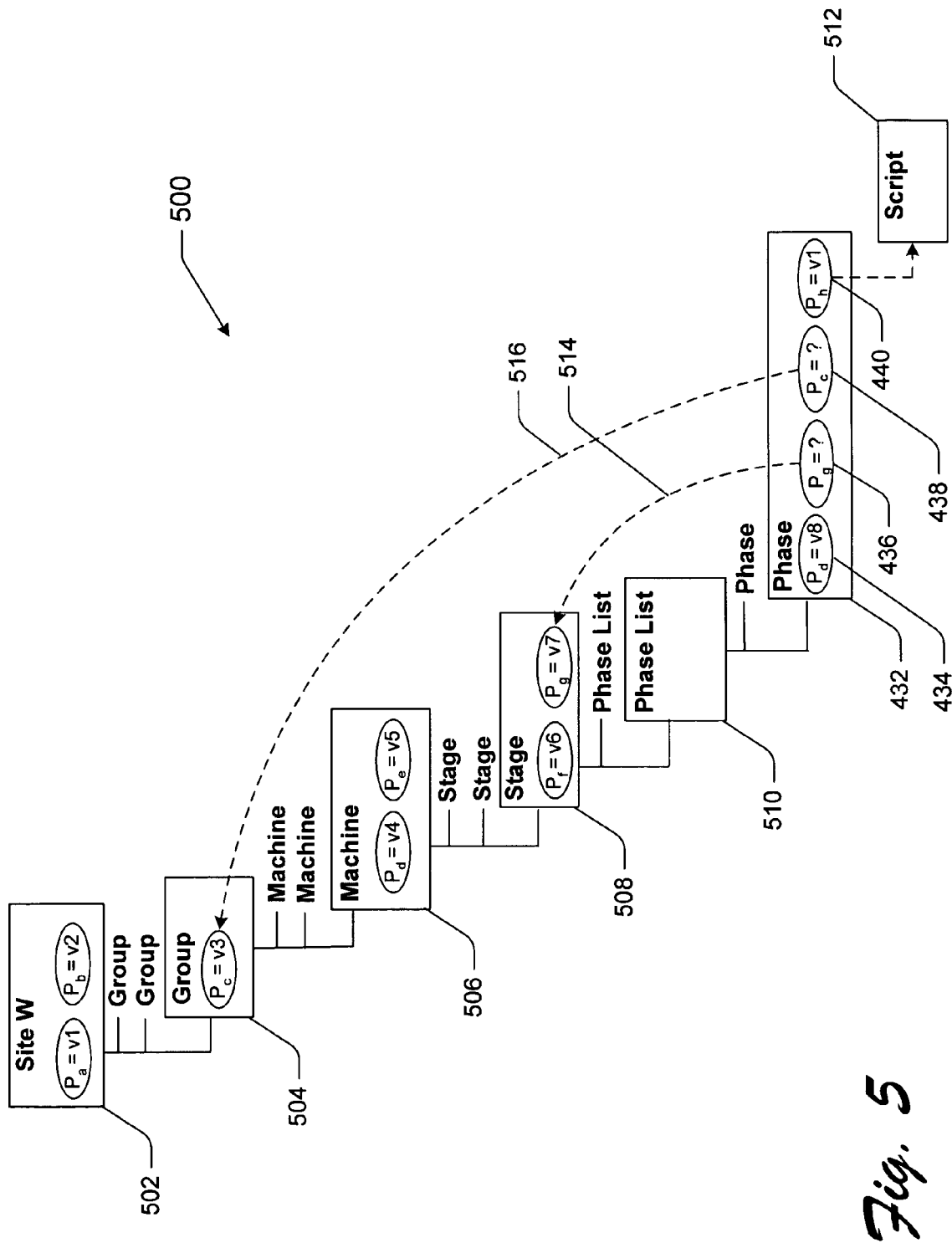
FIG. 5 shows a hierarchy of objects in a particular configuration site, and also demonstrates how parameters associated with a particular object may inherit the values of objects located higher in the hierarchy.

FIG. 5 shows how the open-ended values associated with the phase 432 in FIG. 4 are assigned specific values when placed in the context of a specific design solution 500 in the site tree 126. Namely, the design solution 500 is provided at a site W. Site W is represented by site object 502 in a hierarchy associated with the design solution 500 in the site tree 126. The site W includes a collection of different groups of machines. One of the groups is represented in the design solution 500 as group object 504, and one of the machines in one of the groups is represented by machine object 506. A plurality of stages, phase lists, and phases are associated with each machine to be configured. Stage object 508 represents one of the stages in the design solution 500, phase list object 510 represents one of the phase lists in the design solution 500, and phase 432 represents one of the phases in the design solution 500. Parameter 440 in phase 432 can point to a script 512 that performs the tasks allocated to the phase 432.

Section B explains how the build management logic 116 can create the type of design solution 500 shown in FIG. 5. By way of preview, the collection of objects can be created from "scratch" by defining the salient features of the objects and their interrelations. This can be performed using one or more configuration guidance presentations that sequence the user through a series of panels designed to solicit information from the user regarding the properties of the objects in the design solution 500. In this manner, the properties in the solution are forced to conform to a pre-established template. Alternatively, a user can create a design solution for a particular site by importing such design solution from an external source (e.g., from an external site). Alternatively, a user can create a design solution by modifying a pre-existing design solution. The build management logic 116 also permits users to update the information stored in the library 124, such that the database 118 continues to support a wide variety of configuration object types.

Assume, as explained above, that the phase 432 is "inserted" within the design solution 500. Parameters 434 and 440 have fixed values that do not change when the object 432 is inserted in the design solution tree 500. For instance, these parameters might specify that computer resources are mapped to specific fixed drives. On the other hand, as noted before, parameters 436 and 438 have open-ended values. In the illustrative case of FIG. 5, the value of parameter 436 is defined within object 508 (on the stage level), and the value of parameter 438 is defined within object 504 (on the group level). Generally, to resolve the value of a variable parameter, the build management logic 116 steps up the design solution tree 500 to determine whether each successively higher object contains information which resolves the value of the parameter. Line 514 in FIG. 5 represents the resolution of the value of parameter 436, while line 516 represents the resolution of the value of parameter 438.

The strategy depicted in FIG. 5 therefore provides a flexible technique for specifying parameter values within a specific design solution. Whereas heretofore technical personnel specified the collection of parameters used in a design solution on a case by case basis, the design paradigm shown in FIG. 5 provides general rules for inferring the values of many parameters, so that the specific values are automatically assigned to objects based on the context of their use within a tree of other objects. Hence, the design paradigm shown in FIG. 5 has the potential for defining configuration instructions in a much more user-friendly and flexible manner than heretofore provided. The relative ease at which configuration instructions can be created by the above-described strategy also allows solution providers having relatively low levels of experience to generate configuration instructions.

FIG. 5 also illustrates the ability to override parameter values set at higher levels in the hierarchical tree. For example, machine object 506 specifies a parameter value $P_d$. However, phase 432 also specifies a value for $P_d$ via parameter 434. The value specified locally within phase 432 takes precedent over the more remote value specified at the machine level. In general, the design solution 500 shown in FIG. 5 can be viewed as a large linked list. A value of a parameter associated with an object in the list is defined by the closet object higher in the hierarchy which specifies such value.

The build management logic 116 can use different techniques to perform the parameter referencing functions described above. As noted above, the library 124 can represent different configuration items using an object-oriented design approach in which individual configuration items are represented as objects having properties and various relationships to other objects (such as child objects) in a hierarchy of objects. Values in the hierarchy can be specified using so-called expressions. For example, assume that an object named "Machine" has a property called "Name." In this case, the expression "=Machine.Name" will return the name of the Machine object. The conventional "." notation is used to string together a sequence of linked elements in the hierarchy.

For example, the following expressions return the following results in the context of the exemplary hierarchical tree shown in FIG. 2.

a) The expression "=Site.Web Host Test Lab 1" returns the result: Object<Machine Group> b) The expression "Site.Web Hosting Test Lab1.Web Server 1" returns the result: Object<Machine>.

c) The expression "Site.Web Hosting Test Lab 2.Generic Cluster.Node 1" returns the result: Object<Machine>.

d) The expression "Site.Web Hosting Test Lab 1.Web Server 1.Common" returns the result: Object<Stage>.

Parameters associated with a particular object can be assessed using the "." notation in a similar manner to that described above. For example, assume that the parameter OrgName is assigned the value XYZ_Corp. In this case, the expression "=object.OrgName" would resolve to the specific value "XYZ_Corp." In addition, expressions can be embedded within parameter values using the following exemplary notation: %=expression%. For example, assume that a currently identified machine corresponds to Node 1 shown in FIG. 2. In this case, the following expressions return the following results:

a) The expression "%=Machine.Name%.INI" returns the results Node 1.INI.

b) The expression "Machine Name is %=Macine.Name%" returns the result "Machine Name is Node 1."

c) The expression "%=Machine.IniFileName%" returns the results Node 1 .INI.

The above-described referencing can be used to provide inheritance in the following manner. For instance, suppose that a phase list in the library was generically identified as "OperatingSystem.PostOSPhaseList." This generic value would prompt the build management logic 116 to locate the PostOSPhaseList that is associated with the OperatingSystem object. In defining a machine, a user may be able to select among a plurality of operating systems, and hence, a plurality of OperatingSystem objects. Hence, the actual phase list returned by this expression will vary depending on the constitution of the site tree 126. However, there may be many OperatingSystem objects associated with different machines in a vast group of machines. Thus, resolving the precise value of the expression will require successively stepping up the site tree 126 to find the closest object which resolves the value of the parameter. That is, the site tree 126 can be viewed as a large linked list. In evaluating an expression, the build management logic 116 starts at a certain point in this linked list, and subsequently moves up the tree. The build management logic 116 attempts to find the "closest" object up the tree which resolves the unspecified parameter.

Another feature of the SQL database 120 is a role-based access mechanism. According to this feature, the database 120 grants different editing/access rights to different respective user groups (associated, in turn, with different roles). For example, the database 120 can grant a library editor full access rights to access, modify, and transfer any information stored in the database 120. However, the database 120 may allow other individuals (such as technicians) permission to only generate .INI files for certain groups of machines, or a particular machine. The particular allocation of access rights can be defined to suit the requirements of a particular business and technical environment. The database 120 can determine what access rights are appropriate to a user by mapping the user's password to predefined access information associated with the password. This access information defines what the user can "see," and what the user can subsequently "do" to the information (such as editing the information, exporting the information, generating .INI files, and so on).

Templates, Packages, and .INI Files

As explained above, a template provides a skeleton or blueprint which defines the basic organization and constitution of groups of machines and individual machines. Templates serve two roles. First, templates serve as a standardized framework for passing information from one user to another. Such a template is formed by culling all of the values that were specifically set for a machine or group of machines and storing those exported values in the template. The template has a fixed organization of elements. Other information that is not specific to the machine or group of machines can be reconstructed by the recipient from their own library 124. For instance, a template may generally include a pointer to a phase list, but may omit a description of the phases within the phase list. The receiving site can reconstitute the phases based on the local library 124 at that site. Second, templates can be used as a blueprint for constructing new groups of machines and new machines. More specifically, a series of configuration guidance panels can be used to construct the new groups and machines based on the templates.

Templates are represented in a markup language, such as XML. By way of background, XML is a subset of the Standard Generalized Markup Language (SGML) that enables users to create customized tags that describe the meaning of data, as opposed to the presentation of data. Generally, an XML document is composed of XML objects, each of which includes a start tag (such as <author>), an end tag (such as </author>), and information between the two tags (which is referred to as the content of the objects). An object may include a name-value pair (referred to as an attribute) related by an equal sign that modifies certain features of the object (such as MONTH="May"). The objects in an XML document have a hierarchical relationship to each other that can be represented as a tree, such as the tree shown in FIG. 2. The objects in the tree are also commonly referred to as "nodes." A so-called XML schema provides a formal specification that defines the types of objects and the organization of objects that should appear in an XML document in order for that document to be considered so-called well formed.

Figure 6:
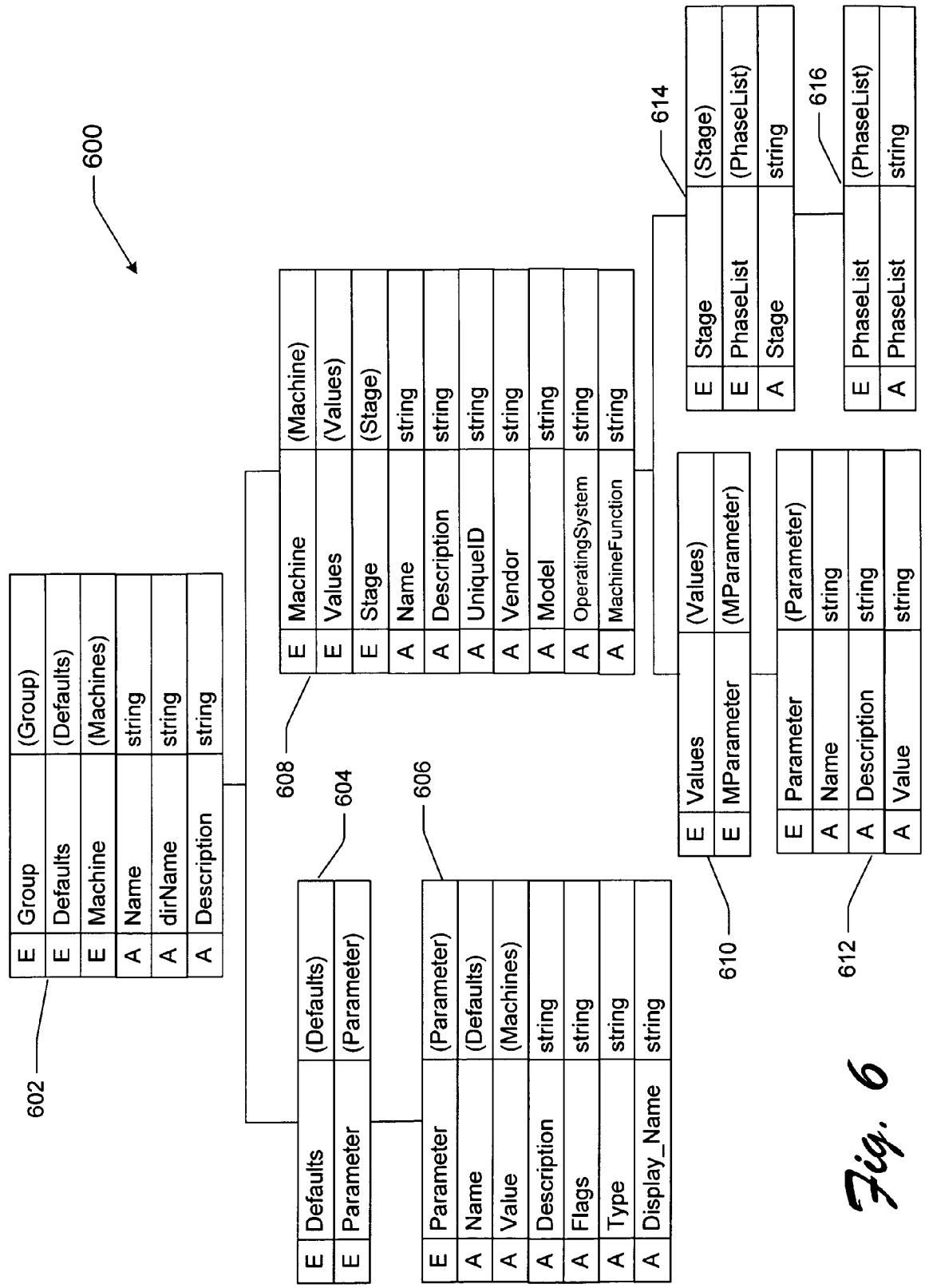
FIG. 6 shows an exemplary markup language schema used to specify the organization of information in a template provided by the system of FIG. 1.

FIG. 6 shows an exemplary schema 600 for defining the selection and organization of information in templates. It includes hierarchical arrangement of elements (or objects) (including elements 602, 604, 606, 608, 610, 612, 614, and 616). The elements are denoted by the letter "E" in FIG. 6. Selected elements also include one or more attributes associated therewith. The attributes are represented by the letter "A" in FIG. 6. More specifically, FIG. 6 represents an XML schema 600 for a group of machines. Group templates are a superset of machine templates. Each of the objects in the schema 600 is identified in more detail below.

The root-level group element 602 represents a sequence of groups contained in the template. The group element 602 has attributes of: Name (representing the name of the group); Description (representing the description for the group); and DirName (representing the subdirectory that contains APF files for the group). The default element 604 contains a list of parameters that are used as defaults for the group. The parameter element 606 is used to define a parameter of an object. The parameter element 606 includes the attributes of: Name (representing the name of the parameter); Value (representing the value of the parameter); Description (representing a description of the parameter); Flags (representing flags associated with the parameter); Type (represent the type of the parameter); and Display_Name (representing the displayed name associated with the parameter).

The machine element 608 is used to define an instance of a machine. The machine element 608 includes the following attributes: Name (representing the name of the machine); Description (representing a description of the machine); UniqueID (representing a unique ID assigned to the machine); Vendor (representing a vendor associated with the machine; Model (representing a model associated with the machine); OperatingSystem (representing an operating system associated with the machine); and MachineFunction (representing a machine function associated with the machine). The values element 610 contains a list of parameter values that are set on the machine. The parameter object 612 specifies parameters associated with the machine. The following attributes are associated with the parameter object 612: Name (referring to the name of the parameter); Description (referring to the description of the parameter); and Value (referring to the Value assigned to the parameter). The stage element 614 references a particular stage. It has a stage attribute that identifies the name of the particular stage. Finally, the PhaseList element 616 is used to set the phase list for a specific stage. It includes the PhaseLink attribute that identifies the name of phase link that references a phase list associated with the stage.

FIG. 7 shows an exemplary XML template 700 for a machine. As shown there, this template 700 includes elements having attributes that correspond to the schema 600 shown in FIG. 6. Note that, in this template 700, the name of two phase lists are provided. The specific phases in these phase lists and the associated scripts can be recovered from the library 124.

Generally, references are used extensively within templates to reference objects in the database 120. One format for referencing a desired object or parameter uses expression references. The use of expression references was described above. Another format uses so-called ID references. An ID reference represents a reference to a specific Owner and Owner ID of the object. For example, the following ID expression references an object with owner "MS" and ID88: "MS.88."

Another way of referencing different parts of an XML template is by using XPath. XPath is a general-purpose query notation for addressing and filtering the elements and text of XML documents. XPath expressions can address parts of an XML document, and can manipulate strings, numbers, and Booleans, etc. Using XPath, a value of a parameter can be defined as an XPath query to another value in the template.

A template such as template 700 shown in FIG. 7 can be exported from one site to another. One technique for performing this task is via the user interface 136 provided by the build management logic 116. For example, in one exemplary implementation, using a mouse device, a user can point to a particular machine object in the hierarchical tree of objects associated with a particular site. Right clicking on the mouse device will provide a menu that gives the user the option of exporting the XML template corresponding to the designated machine to an identified destination, such as another site.

Figure 8:
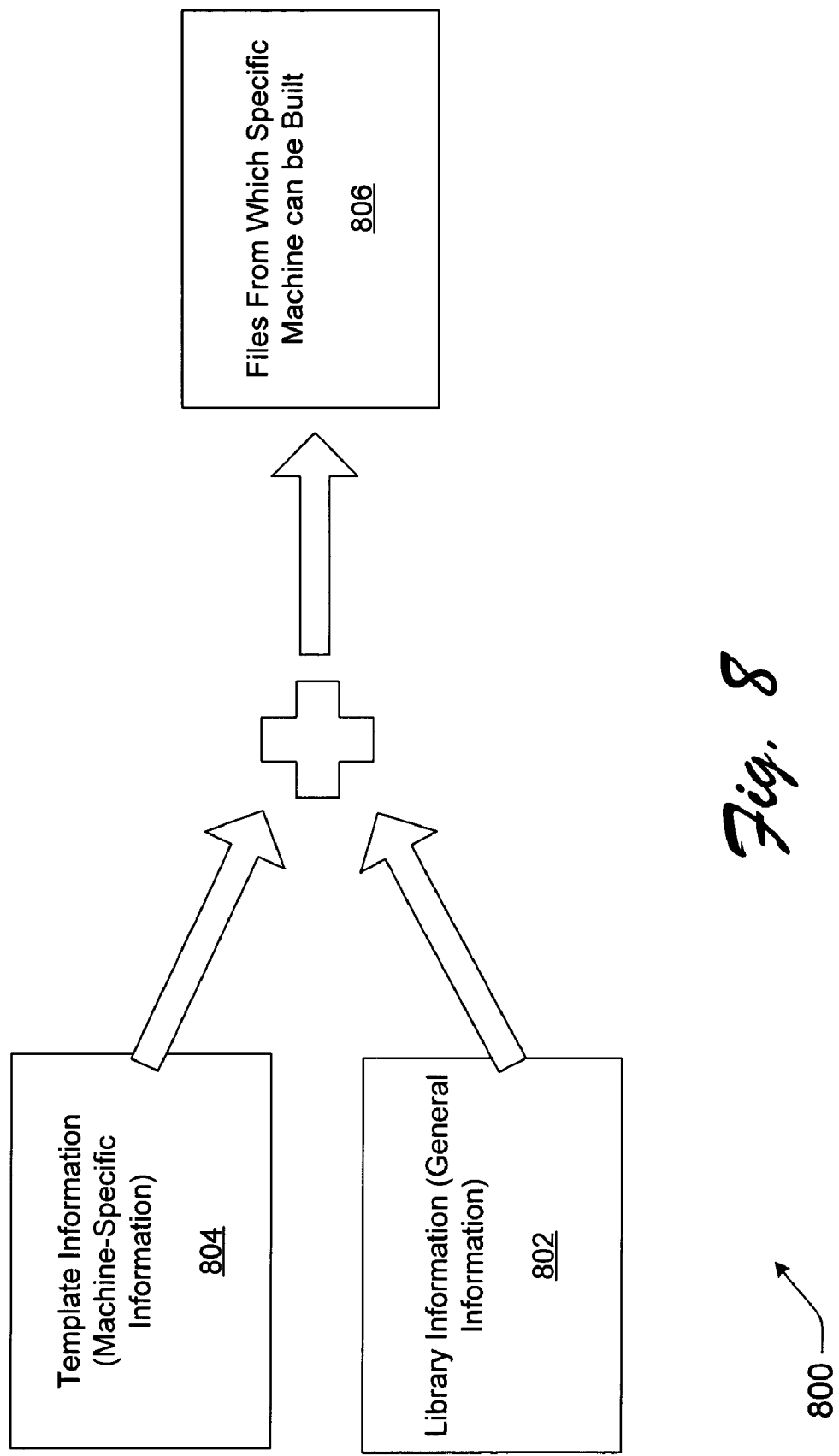
FIG. 8 demonstrates how imported template information and library information provided in the system of FIG. 1 combine to provide files from which a specific machine can be built.

FIG. 8 provides an overview 800 that illustrates how library information 802 and template information 804 combine to provide files 806 from which a specific machine can be built. This procedure can come into play, for instance, when a template is imported from another site and the user wishes to use this template to add a machine to their build site. The library information 802 is obtained from the library 124 of FIG. 1. The template information 804 is obtained from template storage 117 in FIG. 1. More specifically, as described above, the library 124 stores a collection of objects that define building blocks that a user can string together to provide configuration instructions for a specific collection of machines (or other resources). The objects stored in the library 124 are maintained in a relatively general form. On the other hand, the template storage 117 provides information in a particular format that defines how to apply the information in the library 124 to configure a specific set of machines at a site. The template information 804 may include, for instance, a number of parameters that are unique to the particular machine being built. The template information 804 may also include references to more general configuration objects present in library 124. When combined together, the template information 804 and the library information 802 enable the build management logic 116 to construct the files 806 to be used to build a machine or group of machines.

Another way to transfer information between different locations is through the packaging functionality provided by the build management logic 116. More specifically, a package refers to a self-contained collection of files that contain information extracted from the database 120. More specifically, a package will contain all library information, referenced files and other information required to completely define a design environment for generating configuration instructions at a site.

Generally, a user may create a package by creating a package object (referring to a root object that identifies the package), adding references to other objects to be included in the package (such as phase lists, vendors, models, machine functions, operating systems, and machine groups), adding parameters appropriate to the package, and then generating the thus-defined package. A created package has the following attributes: Name (representing the name of the package); Description (referring to a textual description of the package); author (representing a textual description of the package's author), and version (representing a version number assigned to the package, which is updated upon each subsequent modification of the package). The inclusion of objects in the package may also explicitly include other objects that are referenced.

As discussed above, a package can be created at one site (e.g., site X 102) and transferred to another site (e.g., site Y 104). Further, a package at another site (e.g., site Y 104) can be downloaded to a local site (e.g., site X 102). Further, a package can be downloaded from the head-end site 166. Further still, a package can be uploaded to the head-end site 166. The database 170 used to store templates at the head-end site 166 can provide unified storage at a particular location, or can be implemented as a distributed resource.

When the user has defined all objects and parameters to be used in configuring a specific machine, then the user can generate the actual configuration instructions used to build the machine. This can be performed in different ways. In one technique, the user, using a mouse device, can point to a particular machine located in a hierarchy of objects presented on the user interface 136 of the display device 134. Right-clicking on the machine prompts the display of a menu. One item of the menu gives the user the option to generate the configuration instructions for the identified machine.

Figure 9:
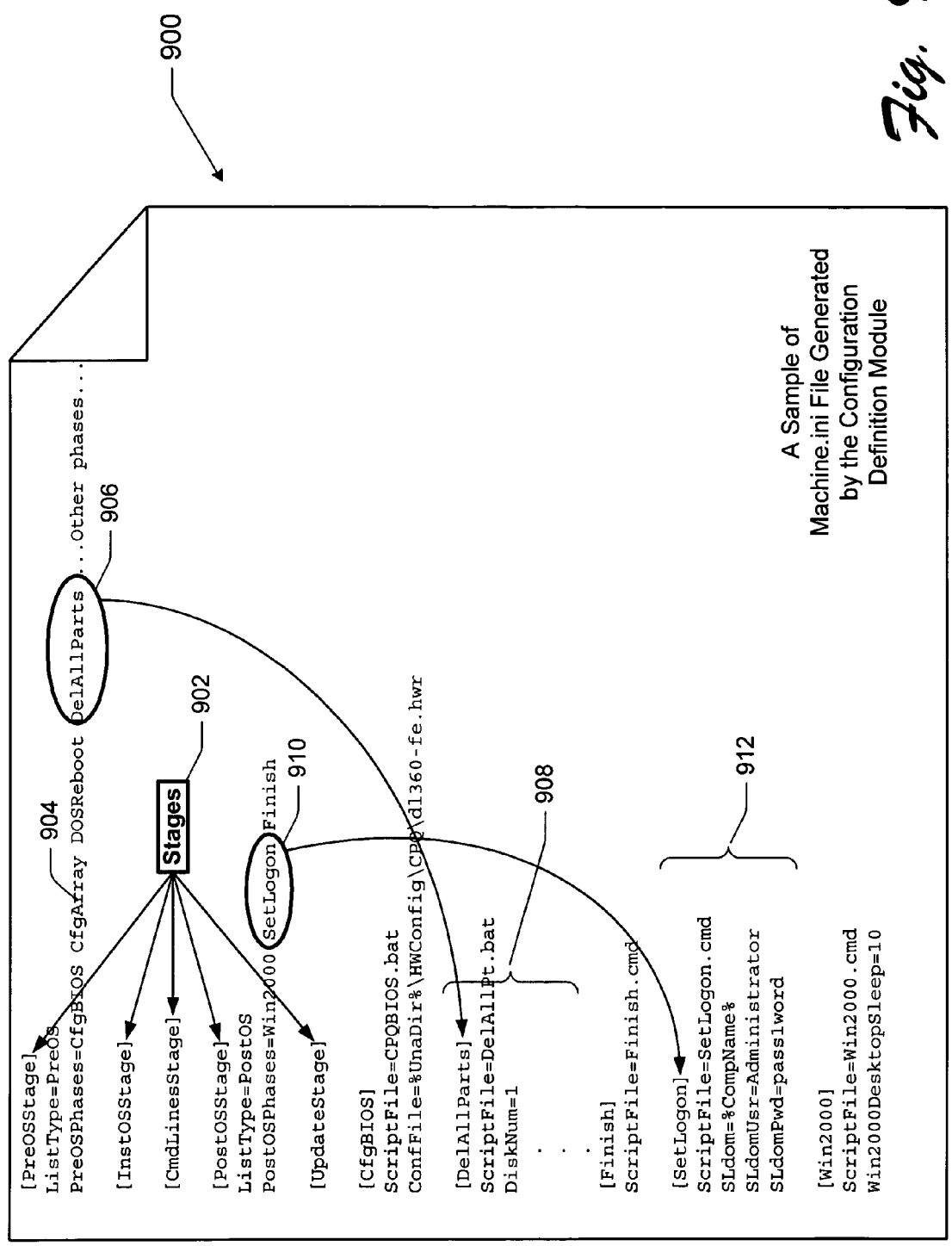
FIG. 9 shows an exemplary Machine.INI file generated by the system of FIG. 1.

FIG. 9 shows a simplified example of part of a file 900 that provides configuration instructions. As indicated there, the file 900 includes information 902 that references various stages involved in configuring the identified machine. For instance, the file 900 is provides a list 904 of phases used to execute the PreOSStage. An exemplary phase 906 in this list (DelAllParts) points to more detailed instructions 908 for executing this phase. Similarly, an exemplary phase 910 in the PostOSStage stage points to more detailed instructions 912 for executing this stage. The thus-created .INI file is transferred to the deployment module 146, and subsequently to the machines (152, 154, 156) to be used in building these machines.

B. User Interface (UI) Functionality

FIGS. 10-29 show different presentations provided by the system 100 of FIG. 1 used in performing a variety of tasks. More specifically, these presentations are displayed on the user interface (UI) 136 of the display device 134. The layouts of these UI presentations are exemplary; other implementations of the principles described here can employ different kinds of UI presentations. Each of the UI presentations in FIGS. 10-29 will be described in sequence in the following explanation.

Machine Definition UI Functionality

The database 120 may initially contain no configuration-related information. A user can provide such configuration-related information by importing it from another site or from the head-end site 166. This task is performed by specifying the location of the package and then importing the package from the identified address.

The imported package can contain templates for setting up a group of machines at a particular site. The build management logic 116 allows users to fill in this template by presenting a series of configuration guidance panels to the user (such as the well-known wizard-type instruction panels). FIGS. 10-13 provide UI presentations that show an exemplary series of such panels.

Figure 10:
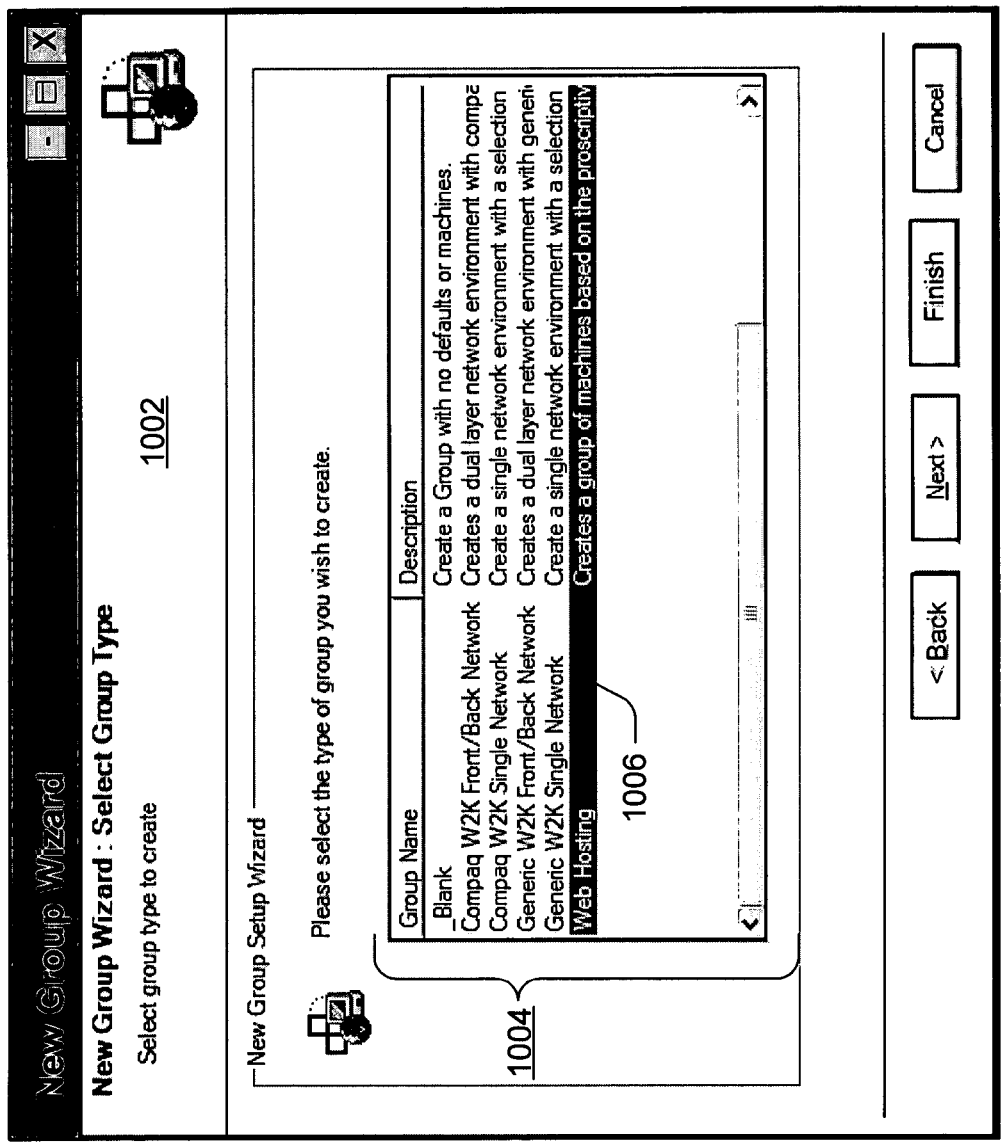

To begin with, FIG. 10 shows a configuration guidance panel 1002 for specifying a group type. The group type identifies a category of machine grouping to be built at a particular site, typically associated with a particular machine group role. FIG. 10 specifically presents a subpanel that presents a collection 1004 of group types from which the user can select. In this example, the user has selected a web hosting group type entry 1006. A subsequent configuration guidance panel (not shown) can allow the user to enter information regarding the defaults applicable to the selected group.

FIG. 11 shows another configuration guidance panel 1102 for specifying the machines that should be present in the group. More specifically, a left panel presents a list 1104 of machines within the group. A user can check the boxes corresponding to machines that should be present in the group. In this example, the user has selected all of the machines. A right panel presents entry fields 1106 that allow the user to specify details regarding the selected machines, such as: Name (representing the name of the new machine); a Unique ID (representing a unique ID assigned to the machine); Operating System (representing the operating system to be installed on the new machine); Vendor (representing the manufacturer or provider of the new machine); Model (representing the model of the new machine); and Function (representing the function or role assigned to the new machine). In the present example, the user is currently specifying the properties of a machine AD2 1108, highlighted in the right panel 1104. After specifying a group of machines in the above-identified manner, the properties of the group can be displayed. For instance, the build management logic 116 can present a hierarchical site tree that identifies objects associated with the group of machines. The user can add additional groups of machines in the above-described manner by pointing to a site object in the site tree and then right clicking on the mouse device.

Figure 12:
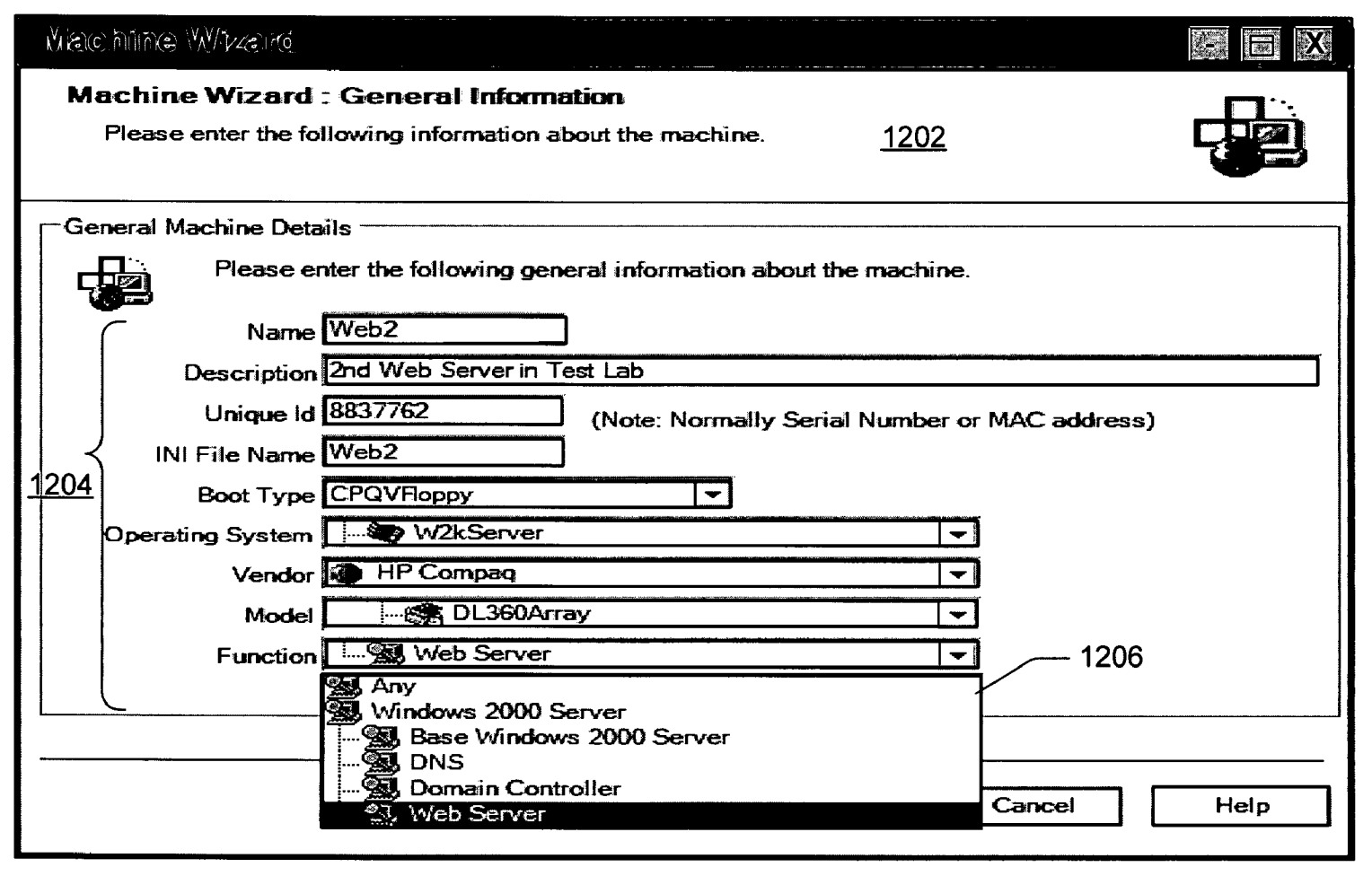

FIG. 12 shows another configuration guidance panel 1202 for specifying the properties of a machine. Generation of this panel can be initiated by pointing to an appropriate location in the site tree (such as a selected group within the site tree) and then right clicking on the mouse device. This configuration guidance panel 1202 prompts the user to enter a collection 1204 of information regarding the new machine, including: Name, Description; Unique ID; INI File Name (representing the name of the .INI file created for the new machine); Boot Type (representing the type boot device associated with the new machine); Operating System; Vendor; Model; and Function. A subset of the fields for specifying information within the collection 1204 can include respective drop-down selection boxes for displaying a group of options available to the user in defining the new machine. For instance, drop-down selection box 1206 shows the following exemplary functions: Base Windows 2000 Server; DNS; Domain Controller; and Web Server.

Figure 13:
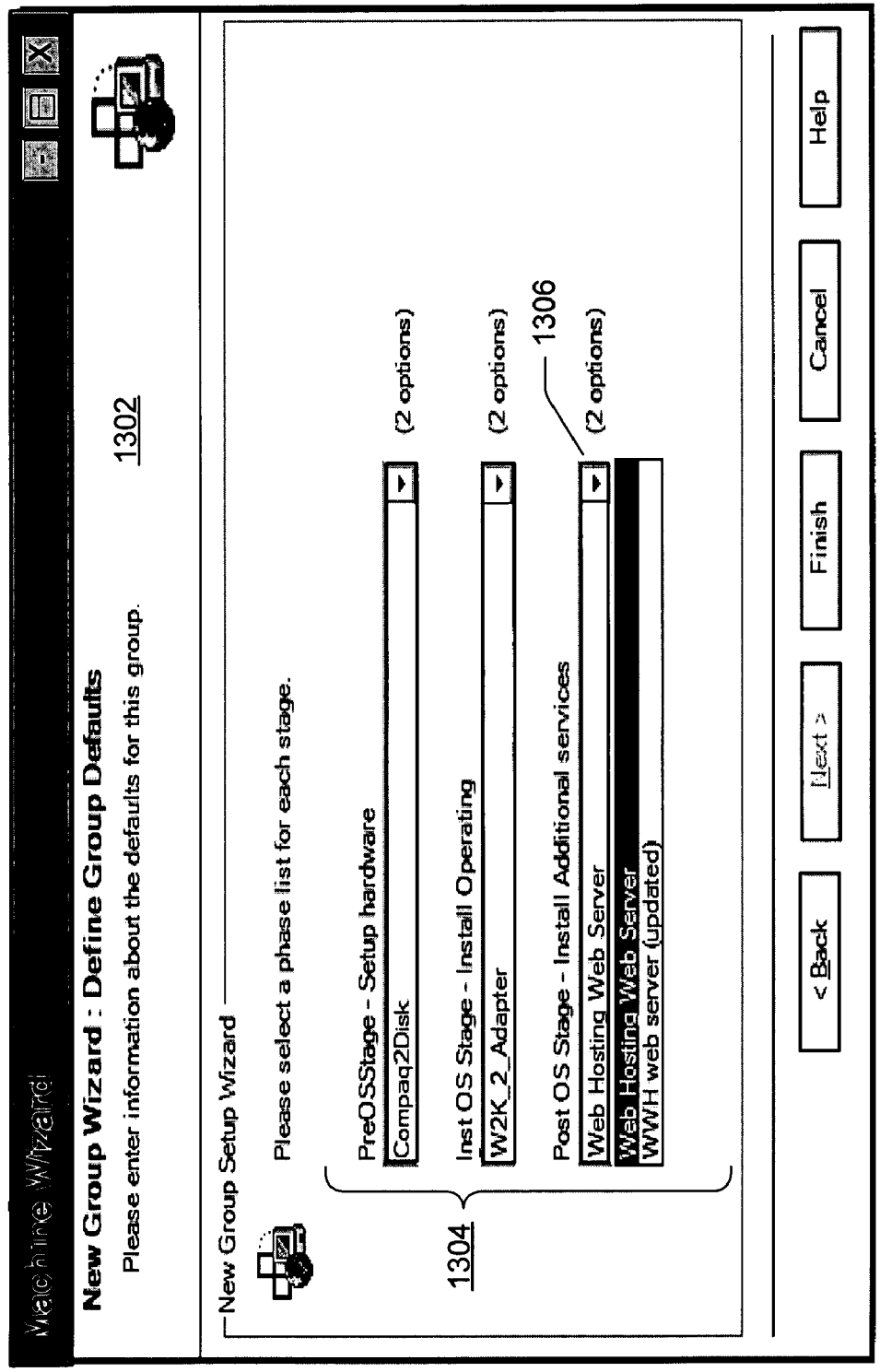

The configuration guidance panel 1302 shown in FIG. 13 includes a collection 1304 of drop-down boxes through which the user can define phase lists associated with different stages used to configure the new machine. For instance, the exemplary drop-down box 1306 allows the user to select between two specified phase lists. With respect to FIGS. 10-13, the configuration guidance procedure can dynamically change the options presented to the users in the drop-down boxes depending selections made in prior drop-down boxes.

Another way to create groups of machines or individual machines once a site tree has been established is to use cut and paste and/or drag and drop functionality. In this technique, a user can "cut" configuration objects from one part of the hierarchical tree, and "paste" them to another part of the tree, or can use drag and drop functionality to perform the same operation.

Site Tree UI Functionality

Figure 14:
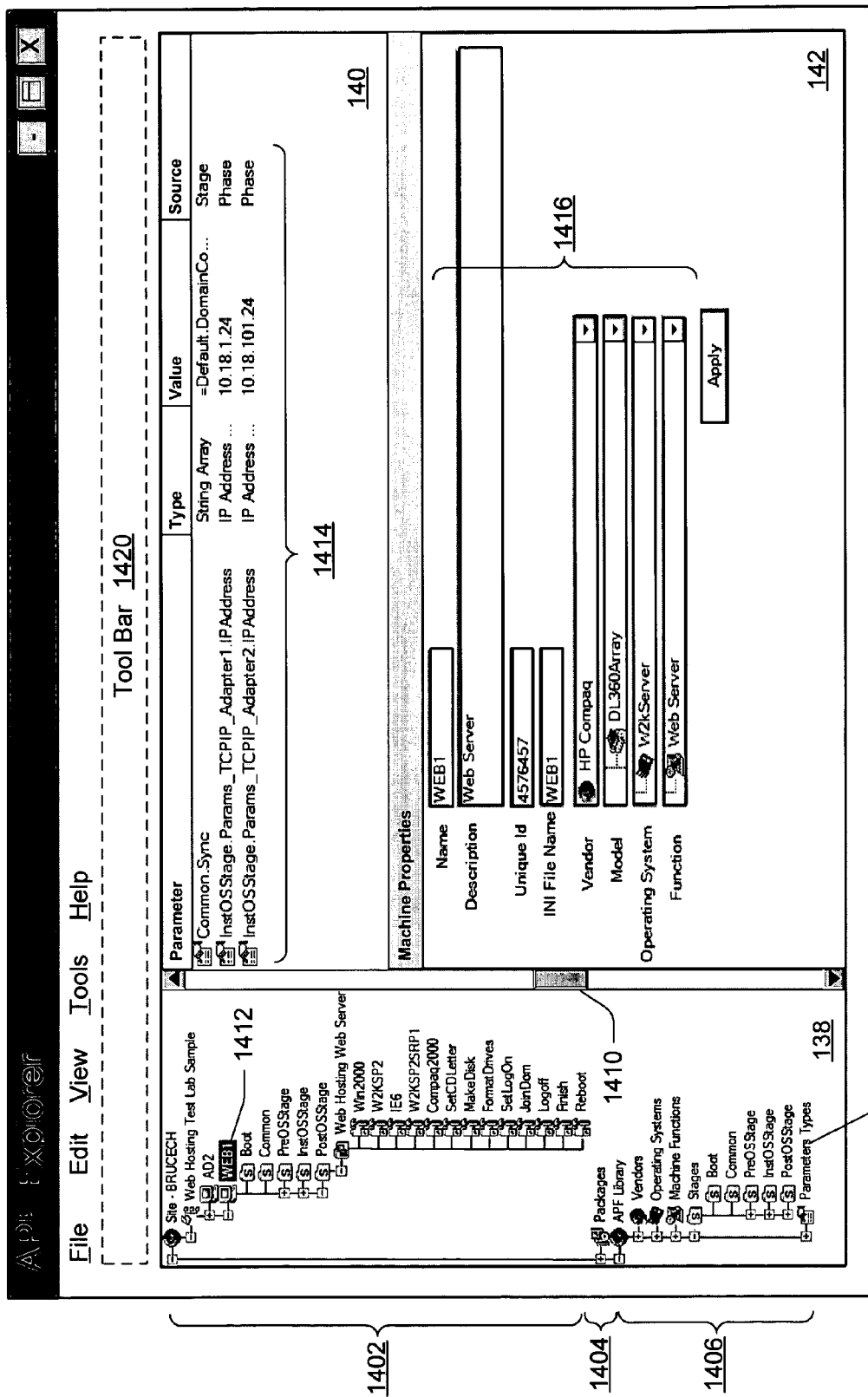

FIG. 14 is used as a vehicle for introducing the basic exemplary layout of the UI presentation 136. The presentation includes a tree pane 138 that provides a hierarchical tree listing of objects associated with the database 120. More specifically, a first portion 1402 of the tree pane 138 provides a tree listing of objects pertaining to machines associated with a particular site (where the site is arbitrarily named "BRUCECH" in this example) (corresponding to site tree 126 of FIG. 1). A second portion 1404 of the tree pane 138 provides a tree listing of objects associated with packages (corresponding to packages 120 of FIG. 1). The second portion 1404 is not expanded to reveal its contents in FIG. 14, but in later figures the tree will be exploded to reveal its contents. A third portion 1406 of the tree pane 138 provides a tree listing of objects associated with the library 124 of FIG. 1. A bottommost object 1408 in the library provides information regarding permissible types of parameters used in the build management logic 116. Types of parameters can include: boot type; directory type; file type; integer type; IP address auto type; IP/Mask static type; on/off binary type; password type, and so on. The tree display pane 138 includes a vertical scroll bar 1410 used to move the displayed tree up and down to reveal different parts of it.

A parameter display pane 140 provides information regarding parameters associated with different objects in the tree listing shown in the tree pane 138. In this case, the exemplary machine object WEB1 1412 in the tree pane 138 is highlighted. This prompts the build management logic 116 to display a collection 1414 of parameters associated with this machine at the machine level. More specifically, the parameter display pane 140 provides a first field that identifies the name of the parameter, a second field that defines type of the parameter, a third field that defines the value assigned to the is parameter (if it can be determined), and a fourth field that defines the level in the hierarchy at which the parameter was initially created.

A properties display pane 142 provides information regarding the properties of an object that is highlighted in the tree pane display 138—in this case, WEB1 machine 1412. Hence, the properties display pane 142 provides machine properties associated with object 1412. A specific collection 1416 of properties includes: Name, Description, Unique ID, INI File Name, Vendor, Model, Operating System, and Function assigned to the machine. An apply button 1418 records the selections made by a user via the properties display pane 142. A tool bar 1420 located at the top of the window-type UI object shown in FIG. 14 can include a collection of icons (not shown) for initiating other actions with respect to the creation and management of configuration instructions.

Figure 15:
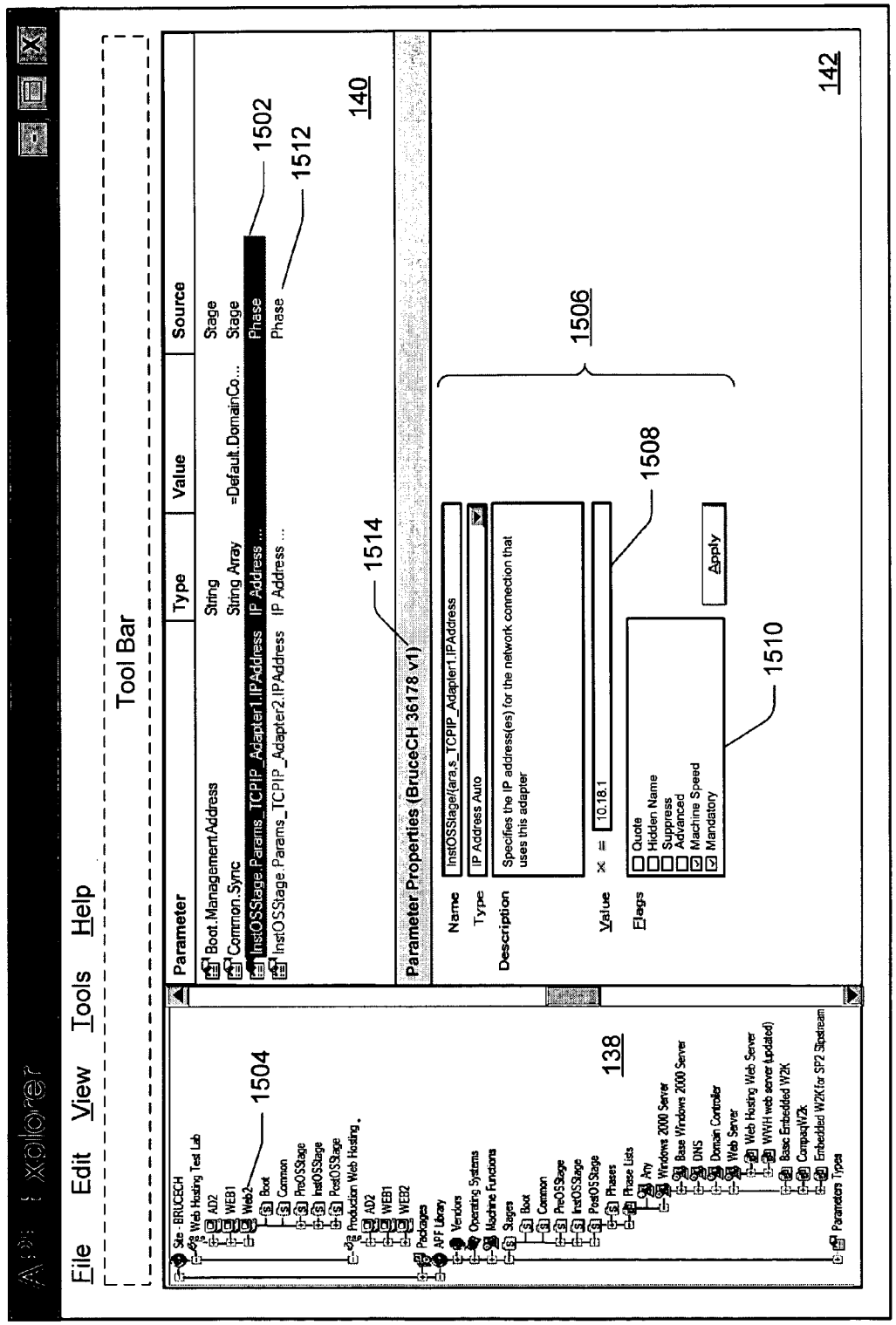

FIG. 15 shows a UI presentation for displaying properties associated with parameters. In the specific example of FIG. 15, the user has highlighted one of the parameters in the parameter display pane 140, namely parameter 1502. Parameter 1502, in turn, is associated with highlighted machine object WEB2 1504 in the tree display pane 138. By virtue of the highlighting of a parameter in the parameter display pane 140, the build management logic 144 displays properties associated with the identified parameter in the property display pane 142. For instance, the property display pane 142 represents a collection 1506 of properties including: Name information (representing the name assigned to parameter 1502); Type (representing the type of the parameter 1502); Value 1508 (representing the value assigned to the identified parameter 1502); and Flags 1510, representing flags associated with the parameter 1502). In this case, the Value 1508 of the parameter 1502 is assigned the IP address "10.18.1."

The Flags 1510 assigned to the parameter 1502 include a collection of fields that can be toggled on or off (indicated by a check mark, or the absence of a check mark, placed in the boxes associated with the flags). More specifically, a "quote" flags prompts the build management logic to add quotes around the parameter value when it appears in the .INI file. A "hide name" flag prompts the build management logic 116 to cause only data to be written (instead of the typical format of "name=value"). A "suppress" flag prompts the build management logic 116 to not write the parameter value to the .INI file. An "advanced" flag prompts the build management logic 116 to display advanced properties associated with the parameter, such as an identification of the owner of the parameter. A "machine specific" field prompts the build management logic 116 to display the parameter at the machine level and reset the parameter when a copy of the machine is made. Finally, a "mandatory" flag prompts the build management logic 116 to highlight the parameter when it appears in the parameter display field 140 when its value is mandatory and is also left blank. For instance, parameter 1512 shown in the parameter display field 140 is displayed in red to indicate that it is mandatory and its value has been omitted.

Caption 1514 provides information regarding the owner the of highlighted parameter 1502, as well as the version of the highlighted parameter.

Figure 16:
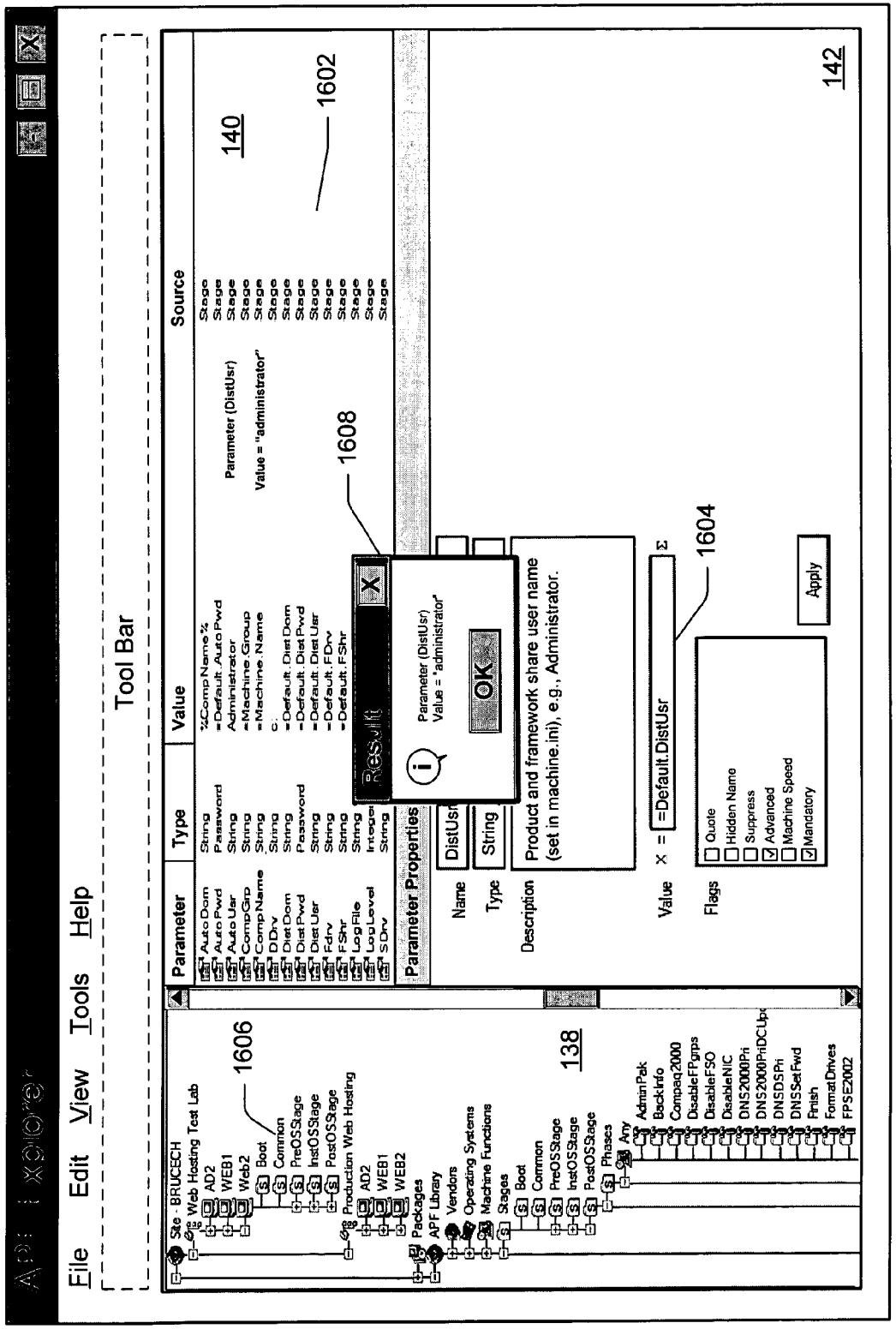

Whereas FIG. 15 presented a case where the highlighted parameter was assigned a fixed value ("10.18.1"), FIG. 16 presents a case where a highlighted parameter 1602 is assigned a variable value 1604 (i.e., "=Default.DistUsr"). The parameter 1602 is associated with a common stage 1606 in the configuration of the WEB2 machine. The user can prompt the build management logic 116 to resolve the value of the variable value 1604. The UI presentation responds by displaying the resolved value in window 1608 (identifying that the parameter DistUser is resolved to have a value of: "administrator").

Figure 17:
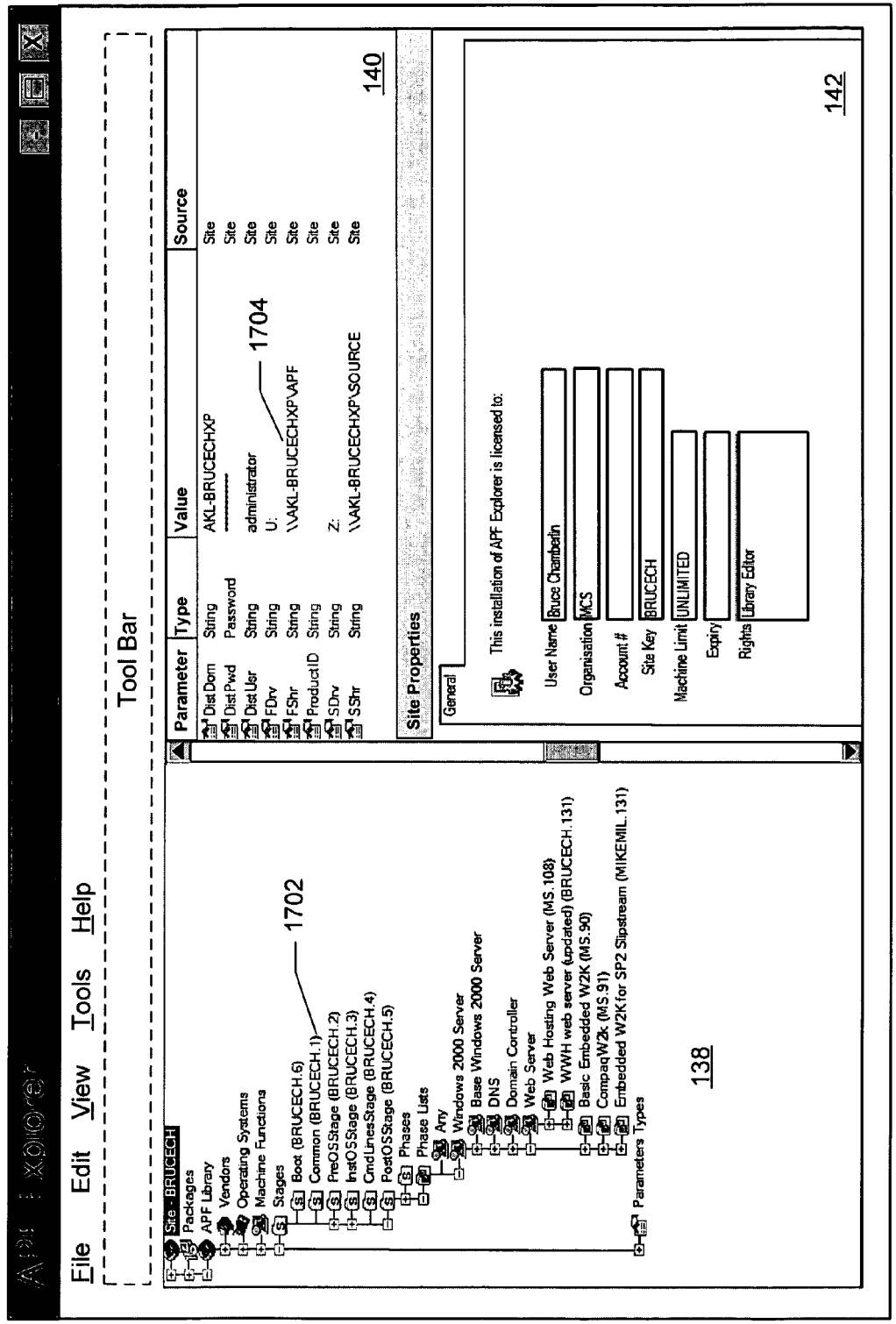

FIG. 17 shows an "advanced view" feature provided by the build management logic 116. In one implementation, this feature can be implemented by activating a corresponding "advanced view" menu item under the view menu. The advanced view feature prompts the build management logic 116 to display additional information regarding the objects and properties shown in the UI presentation 128. For instance, the advanced view feature can prompt the build management logic 116 to display information regarding the individual who has rights to change the objects and properties. For example, added textual information indicates that the user BRUCECH has rights to modify the common stage object 1702, and the parameter 1704. The individual who has rights to modify these features typically corresponds to person who originally created or specified these features.

Library UI Functionality

Figure 18:
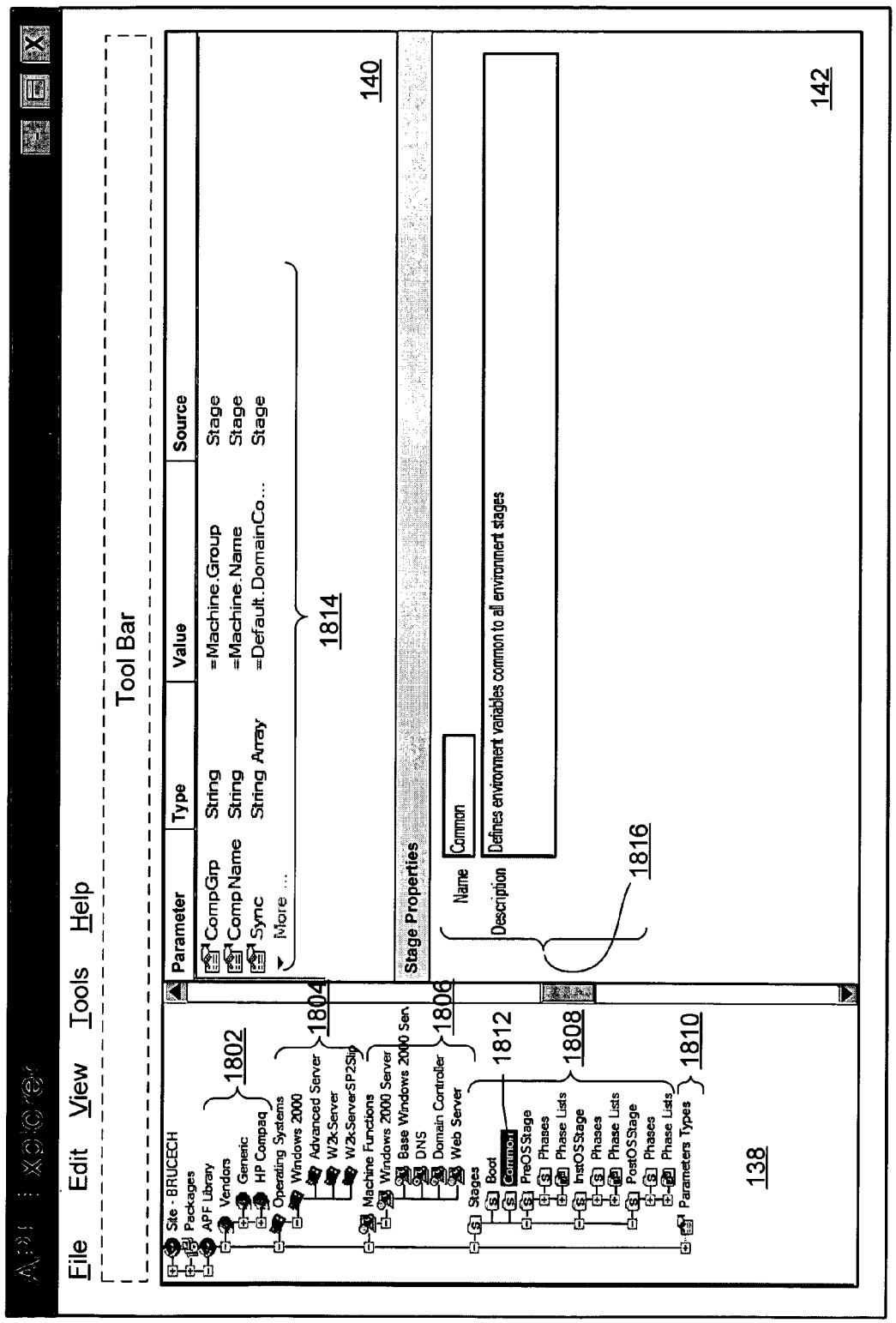

The UI presentation 128 provided by the build management logic 116 also allows a user to perform various actions that target the library 124. As discussed in Section A, the library 124 stores the universe of objects available to the user when defining a particular object configuration for a site. FIG. 18 is used as an introductory vehicle to illustrate selected features of the library-based UI functionality provided by the build management logic 116. To begin with, the tree display pane 138 shown in FIG. 18 includes a breakdown of categories of objects available in the library 124. As was discussed in connection with FIG. 4, the library includes vendor information 1802, operating system information 1804, machine function information 1806, stage, phase, and phase list information 1808, and parameter type information 1810. The common stage 1812 is highlighted in the tree display pane 138, which prompts the build management logic 116 to shown the parameters 1814 associated with this stage in the parameter display pane 140. Various properties 1816 of the common stage are presented in the properties display pane 142.

Figure 19:
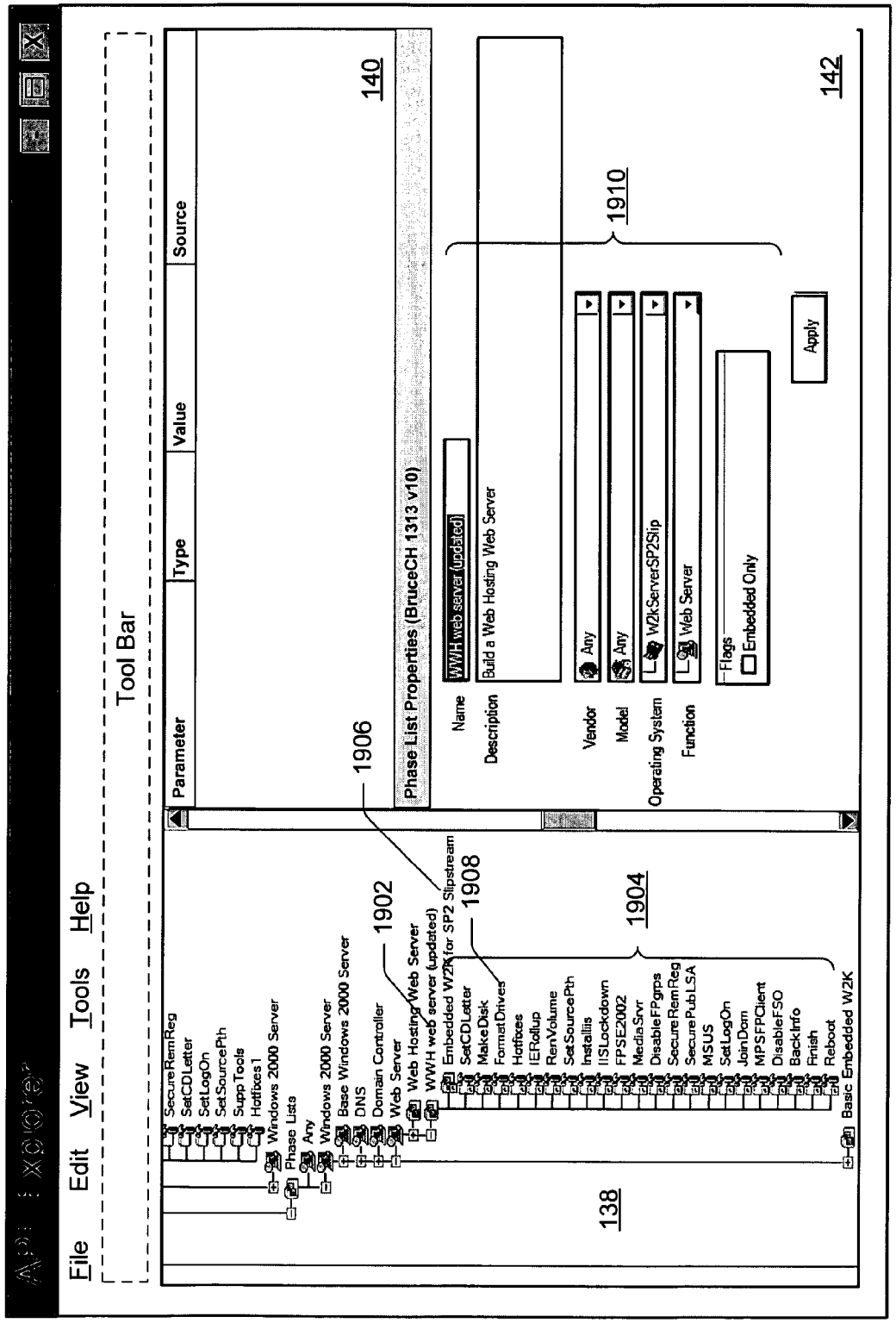

FIG. 19 shows the display of information regarding a phase list within the database 120. More specifically, an identified phase list 1902 in the library tree identifies a collection 1904 of items that specify various kinds of information, such as links to phases, and links to other phase lists. For example, item 1906 represents a link to another phase list. Item 1908 represents a link to another phase. Information 1910 in the property display pane 142 conveys details regarding properties associated with the identified phase list 1902.

Figure 20:
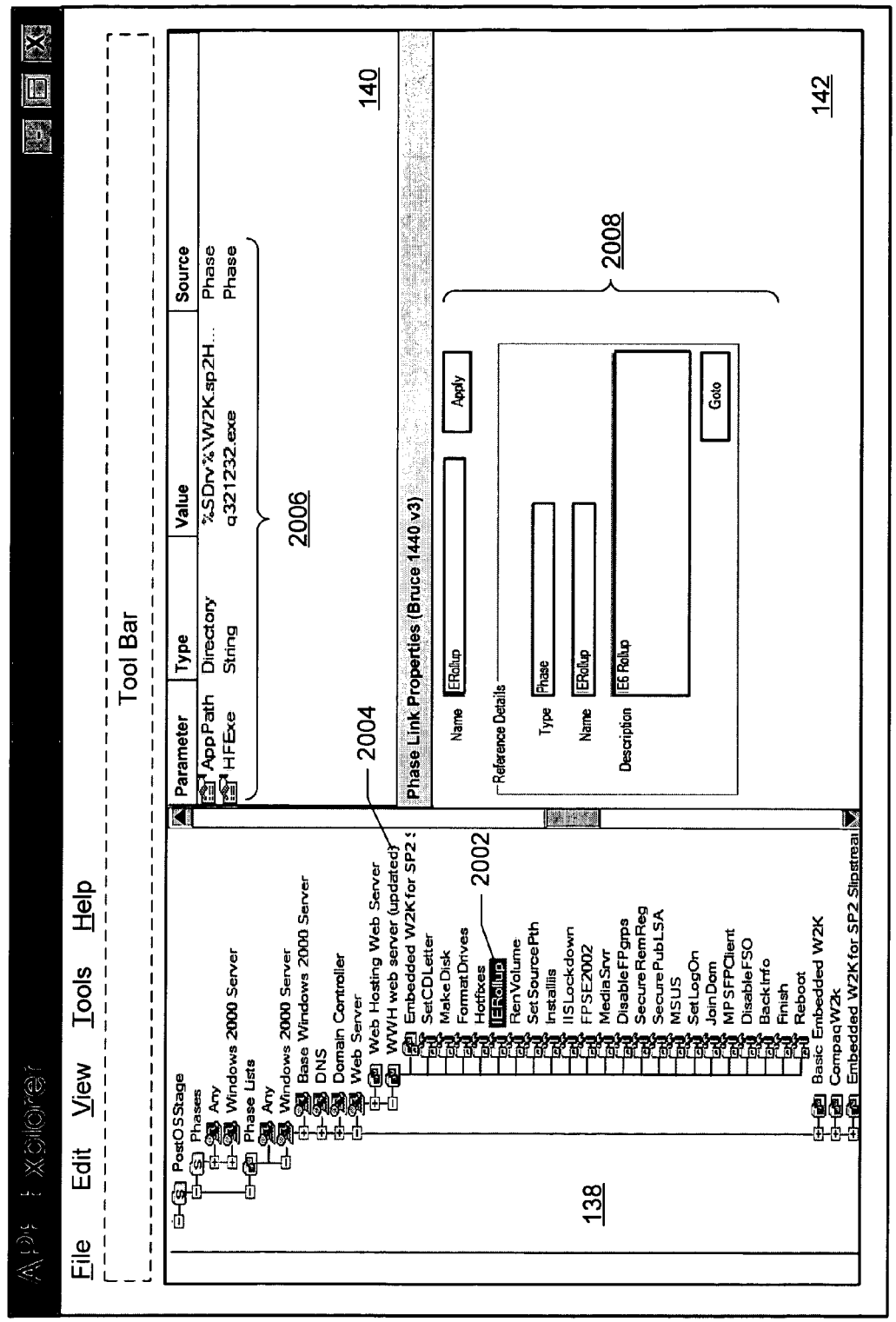

In FIG. 20, the user has selected a particular phase link 2002 within the phase list 2004. The parameters 2006 displayed in the parameter display pane 140 pertain to the phase that the phase link is referencing. The user can override the parameter values at this level. Such an override will only affect the parameter value in the context of the phase list 2004. The properties display pane 142 presents information regarding the identified phase link 2002.

To add a phase to a phase list, the user can copy the desired phase from another source. The user can then select the phase list that is to receive the desired phase, and then point to the phase link below where the user wishes the new phase to be inserted. Then the user can paste the new phase into the specified location, prompting the build management logic 116 to define a new phase link.

Figure 21:
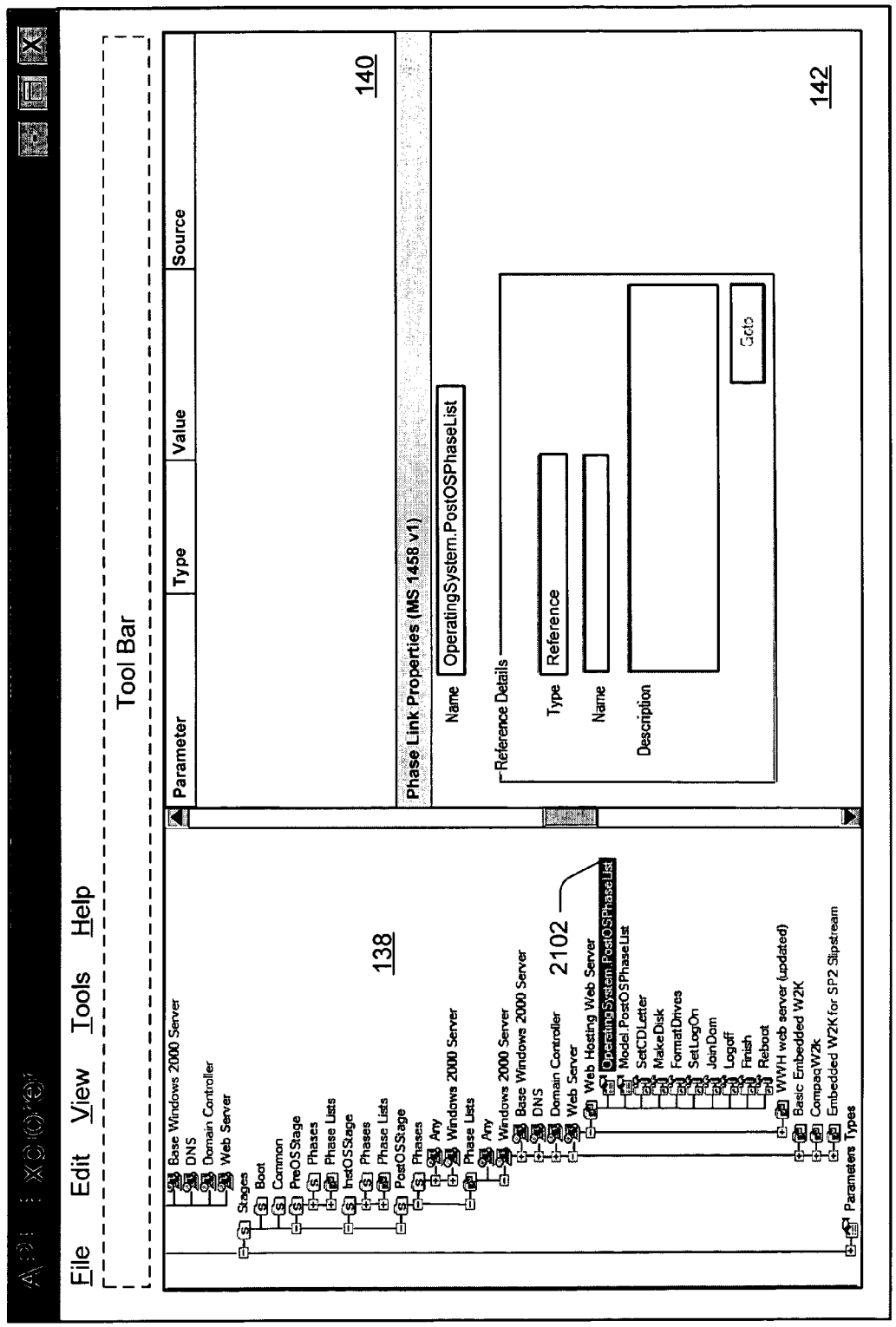

As shown in FIG. 21, a phase list can also have a special type of link called a reference. A reference points at a parameter using the convention "category.parameter." The referenced category parameter, in turn, should point to a phase or a phase list. For instance, the reference 2102 in FIG. 21 points to the phase list "PostOSPhaseList" in the category "OperatingSystem." This feature allows a user to define a phase list that varies depending on the operating system (or other category) chosen.

Figure 22:
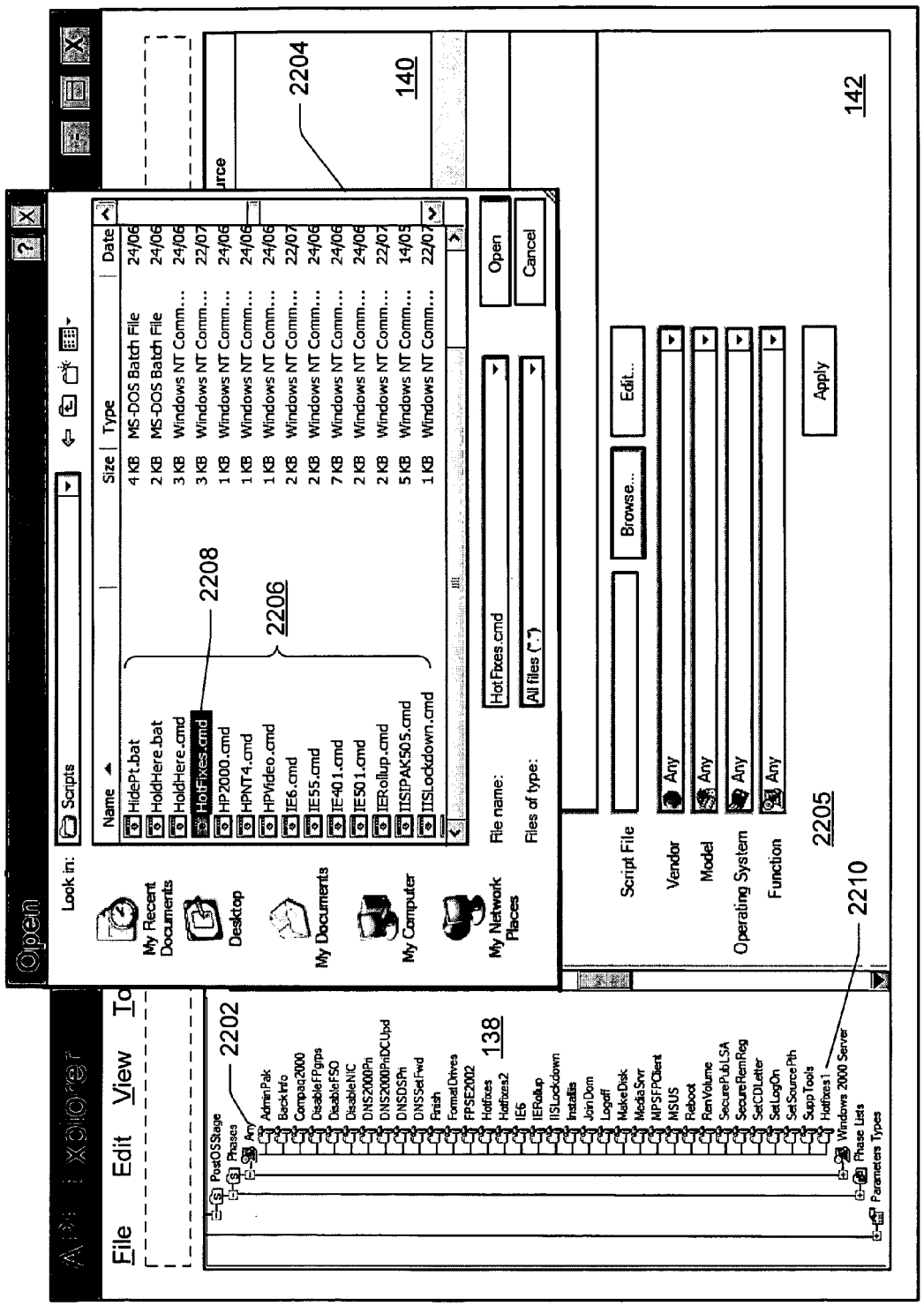

FIG. 22 shows a procedure for entering a phase to the library of phases. To perform this task, the user can right click the mouse device on the category "phases.any" 2202 in the library tree within the tree display field 138. This prompts the build management logic 116 to display the script selection panel 2204 that identifies a list of available scripts 2206. FIG. 22 indicates that the user has selected script 2208 within the list of available scripts 2206. The user can also specify a new name for the selected script. FIG. 22 shows the inclusion of a phase link 2210 for the new pane within the tree display pane 138.

Figure 23:
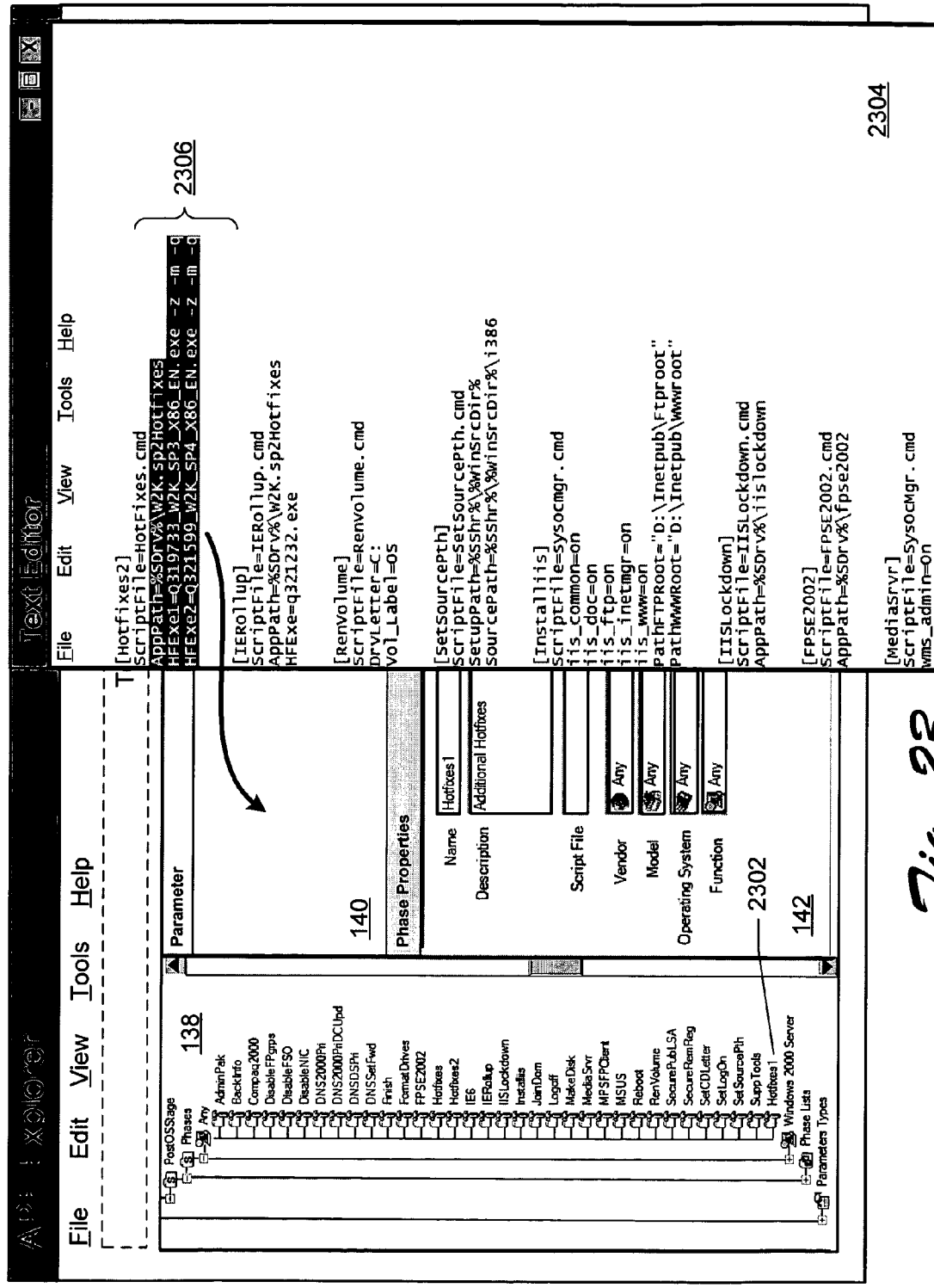

FIG. 23 shows a shorthand technique for adding phase parameters to a phase. In the case of FIG. 23, the technique is used to add parameters to a phase represented by phase link 2302. In this technique, the user retrieves and displays an already created manifest file 2304. The manifest file 2304 contains a collection 2306 of parameters in its body. The user can associate this collection 2306 of parameters with the phase pointed to by phase link 2302 by cutting and pasting the collection 2306 of parameters from the manifest file to the parameter display pane 140. Another technique for adding new parameters is to right click on the mouse device to command the build management logic 116 to add a new parameter as specified by the user.

Figure 24:
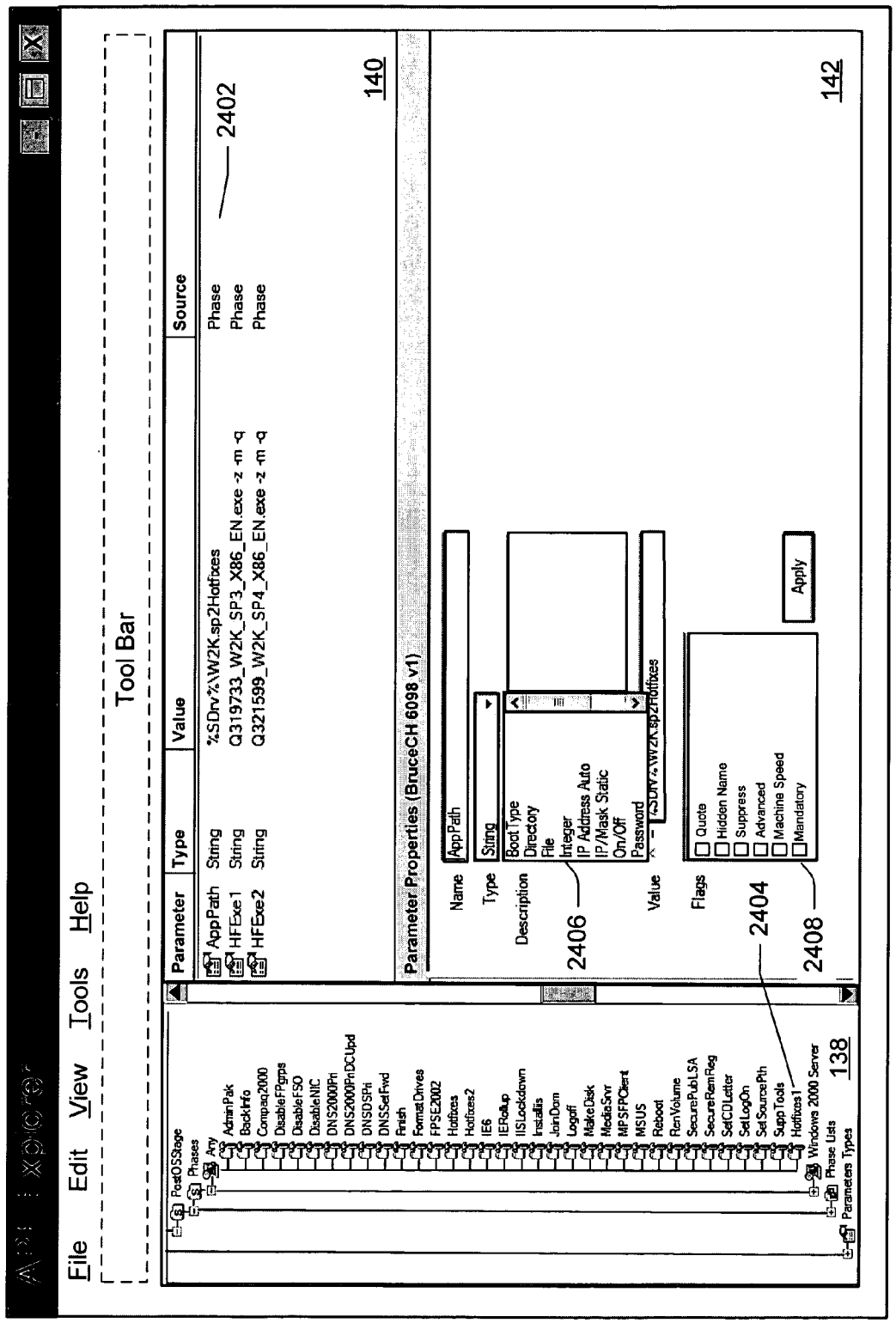

FIG. 24 shows a technique for adding data types and flags to a specified parameter 2402 associated with phase link 2404. A drop-down menu 2406 within property display pane 142 is used to specify the parameter type associated with the parameter 2402, while field 2408, containing a collection of check boxes, is used to specify the flags associated with the parameter 2402. Validation rules can enforce the specification of types made via the drop-down menu 2406. That is, the build management logic 116 can be configured to generate an error message if the user attempts to enter information that does not conform to the data types specified via the drop-down menu 2406. This task is performed by comparing the user's input with predetermined validation criteria.

More generally, in another implementation, the build management logic 116 can include functionality that enables the user to specifically tailor the validation rules that will be invoked upon the entry of data into the build management logic 116. For instance, the build management logic 116 can include an interface panel (not shown) which allows the users to add, modify, and delete validation rules, and to fully define the behavior of the validation rules (e.g., when they are invoked, in what context they are invoked, the messages that will be displayed in response thereto, and so on).

Figure 25:
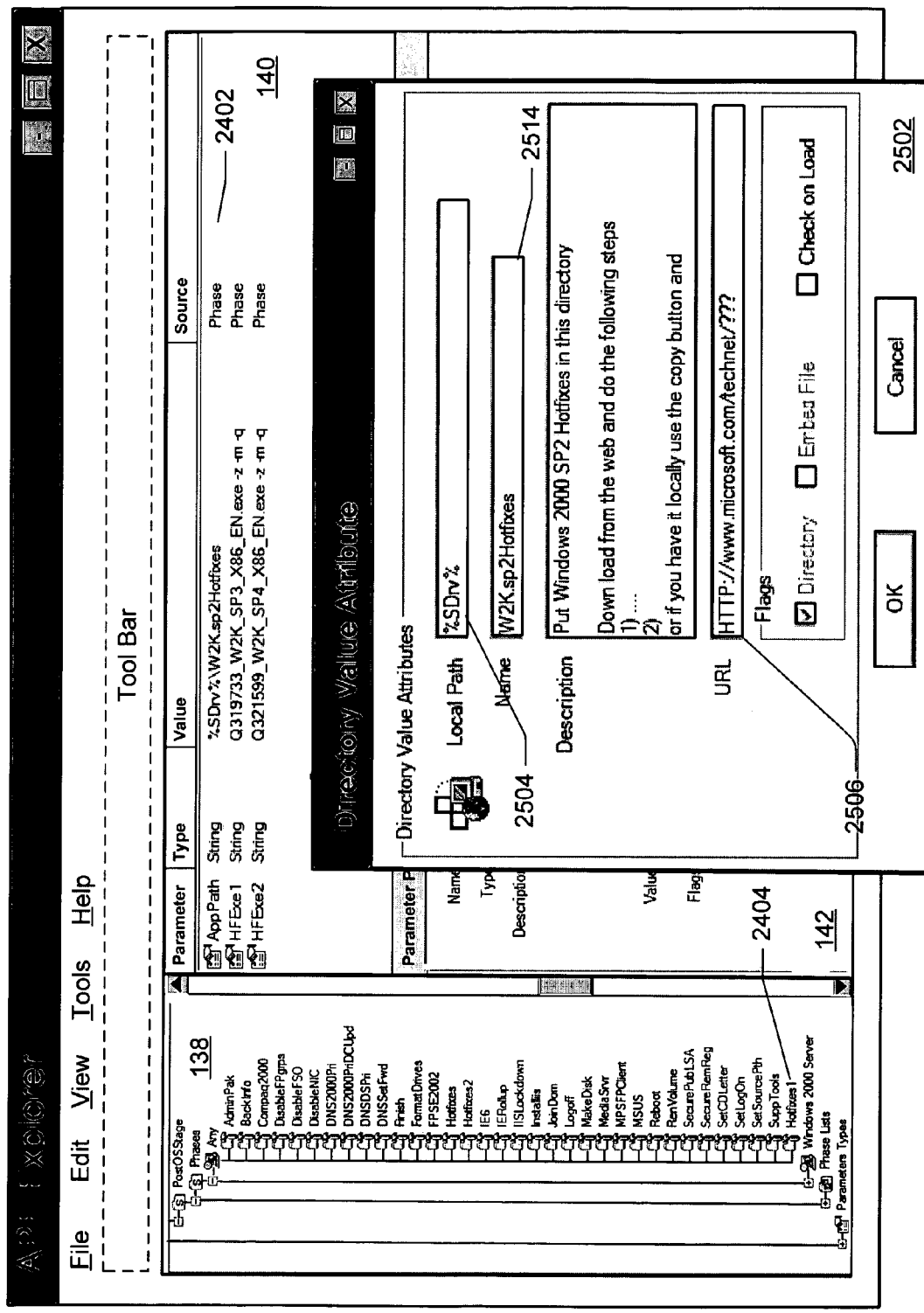

FIG. 25 indicates that the user has selected the data type directory for the parameter 2402 associated with phase 2404. This prompts the build management logic 116 to generate a directory value attribute display panel 2502. This panel 2502 specifies the information required to get the install files for this phase 2404. For instance, panel 2502 can specify the location of the install files by providing local path information or URL information in selection fields 2504 and 2506, respectively. The build management logic 116 can be configured to check whether the specified file exists upon generating the manifest files, rather than during the actual configuration procedure.

UI Features Pertaining to the Generation of Output Files and Packages

Figure 26:
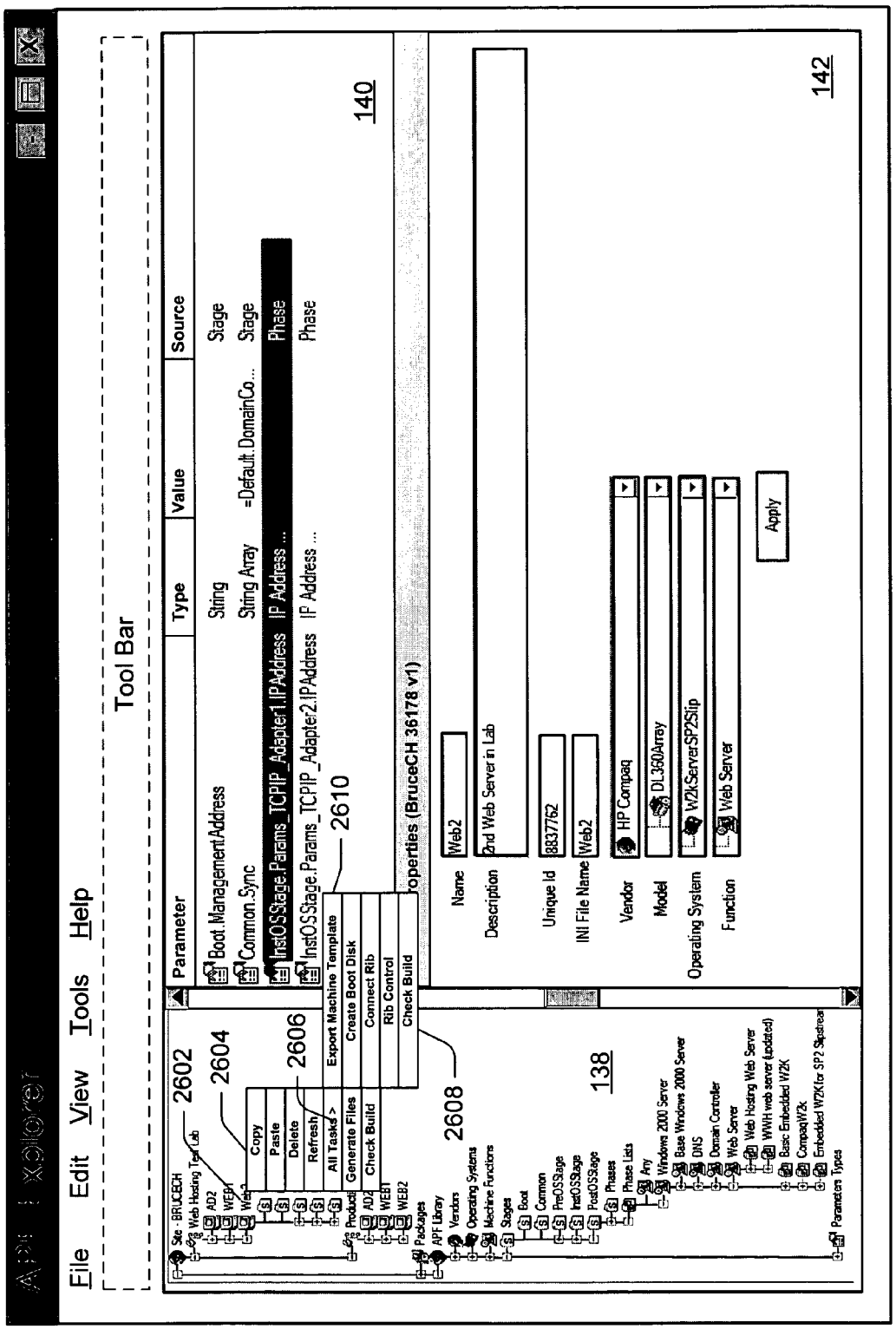

After the user is satisfied with the object-specification of a site, the user can export one or more XML templates that describe configuration instructions used to build respective machines. FIG. 26 shows an exemplary procedure for exporting an XML template for an identified WEB2 machine 2602. The procedure involves pointing to the machine object 2602 in the tree display pane 138 with a mouse device, and then right-clicking clicking on the machine object. This prompts the build management logic 116 to display a task menu 2604. Selection of an "All Tasks" item 1506 in the task menu 2604 prompts the build management logic 116 to generate another task menu 2608. The other task menu 2608 has an item 2610 that commands the build management logic 116 to export the machine template for the WEB2 machine object 2602. An exemplary exported XML template is illustrated in FIG. 8. The user can export an XML template for an entire group of machines in the above-described manner by right clicking on a group of machines in the site tree.

Figure 27:
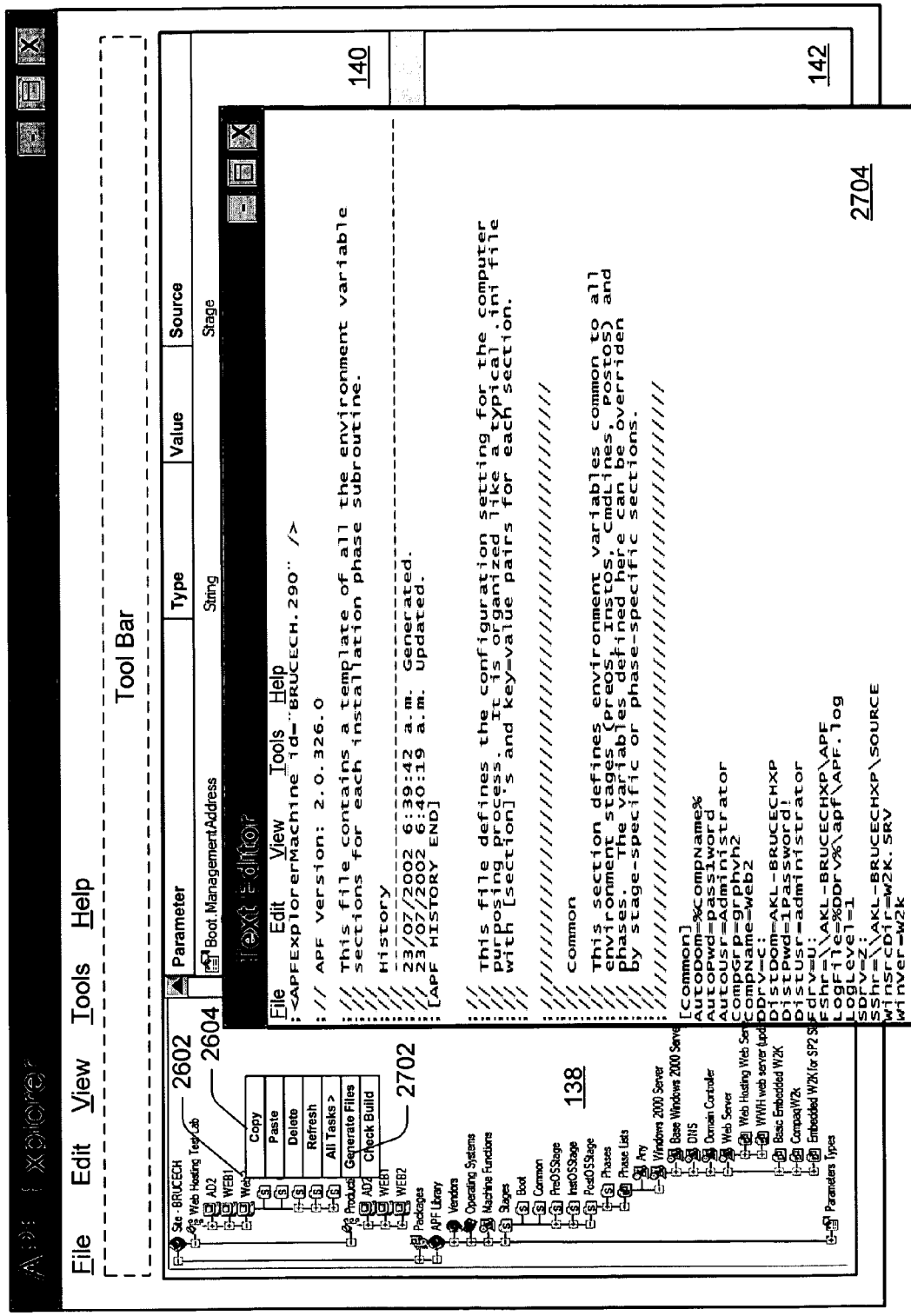

Instead of exporting an XML template for the machine object 2602, the user may want to generate an .INI file that defines the configuration instructions for this machine object 2602. FIG. 27 provides a technique for performing this task. Again, the user can initiate this task by right-clicking on the WEB2 machine object 2602, which prompts the display of the menu 2604. Clicking on a "Generate Files" option 2702 in the menu 2604 prompts the generation and display of the .INI file 1604 for the machine object 2602. As shown in FIG. 27, the build management logic 116 displays the .INI file 2604 using a text editor 2706. If the user is satisfied with the .INI file, the user can then command the system 100 shown in FIG. 1 to configure the physical machine corresponding to the WEB2 machine object 2602 using the .INI file.

Figure 28:
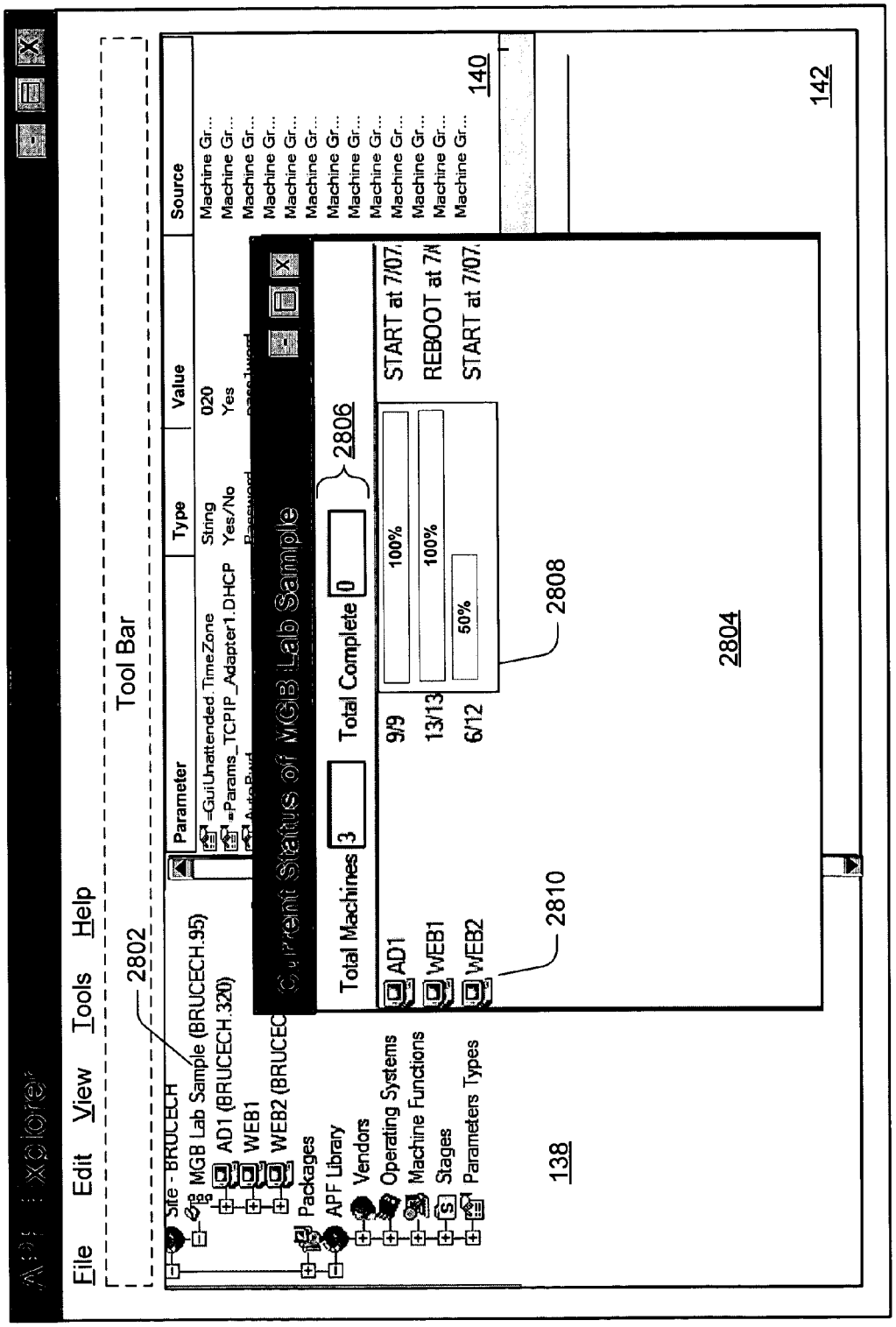

Once the configuration operation is underway, the user can use the build management logic 116 to also report the status of configuration. This feature is illustrated in FIG. 28. As indicated there, the user has initiated the configuration of a machine corresponding to machine objects in group 2802. The user can then determine the status of the configuration for each of the machine objects in the group 2802. A status inquiry can be initiated through various mechanisms, such as by clicking on a corresponding status-related icon in the tool bar (not shown).

Status information can be conveyed via the status display pane 2804 shown in FIG. 17. This status display pane 2804 includes numerical status information in field 2806 and graphical status information in field 1708. More specifically, the field 2808 conveys the level of completion of configuration tasks in bar chart format for the respective machines listed in field 2810.

Figure 29:
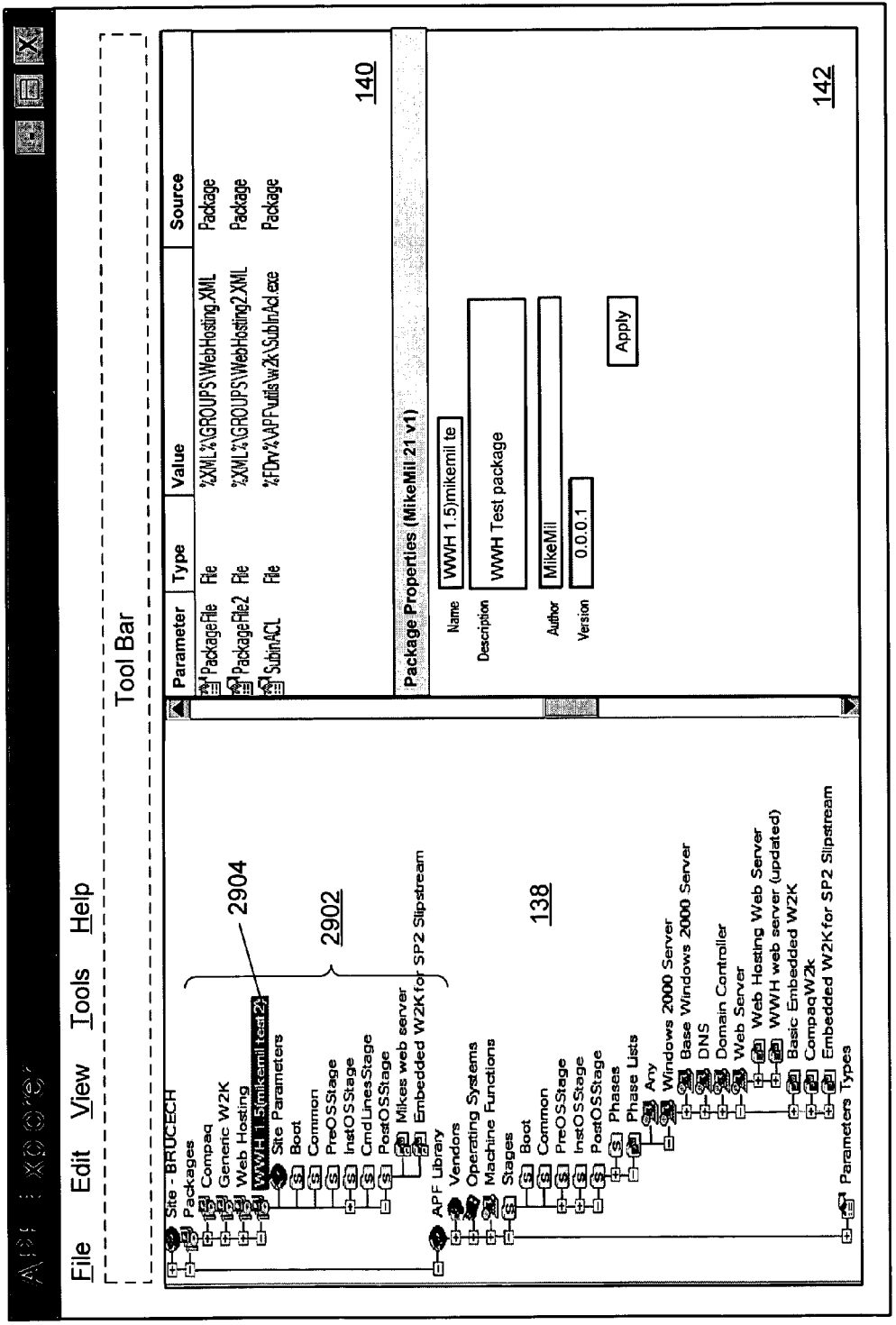

Finally, FIG. 29 shows the management of packages using the UI presentation 128. Namely, the tree display pane 138 shows a collection of packages 2902. A specific package 2904 is selected and its contexts expanded for viewing. The parameter display pane 140 shows parameters associated with the selected package 2904. The property display pane 142 shows properties associated with the selected package 2904. A new package can be created by activating a corresponding menu item that initiates the creation of the package. The user can then drag and drop phase lists and other objects from the library into the newly created package. A final package can contain phase lists, phases, and associated script files, etc. in a single package that can easily be transferred between users at different sites.

UI Features Pertaining to Table View Functionality

The above-described FIGS. 14-29 use a so-called tree view to present information regarding objects in the tree pane 138. The tree view allows the user to display a hierarchical list of machines within a group by double left clicking on the group in the site tree (e.g., the site tree 1402 in FIG. 14). The user can then select an object within the expanded hierarchical list and view the properties of the object in the manner described above.

Figure 30:
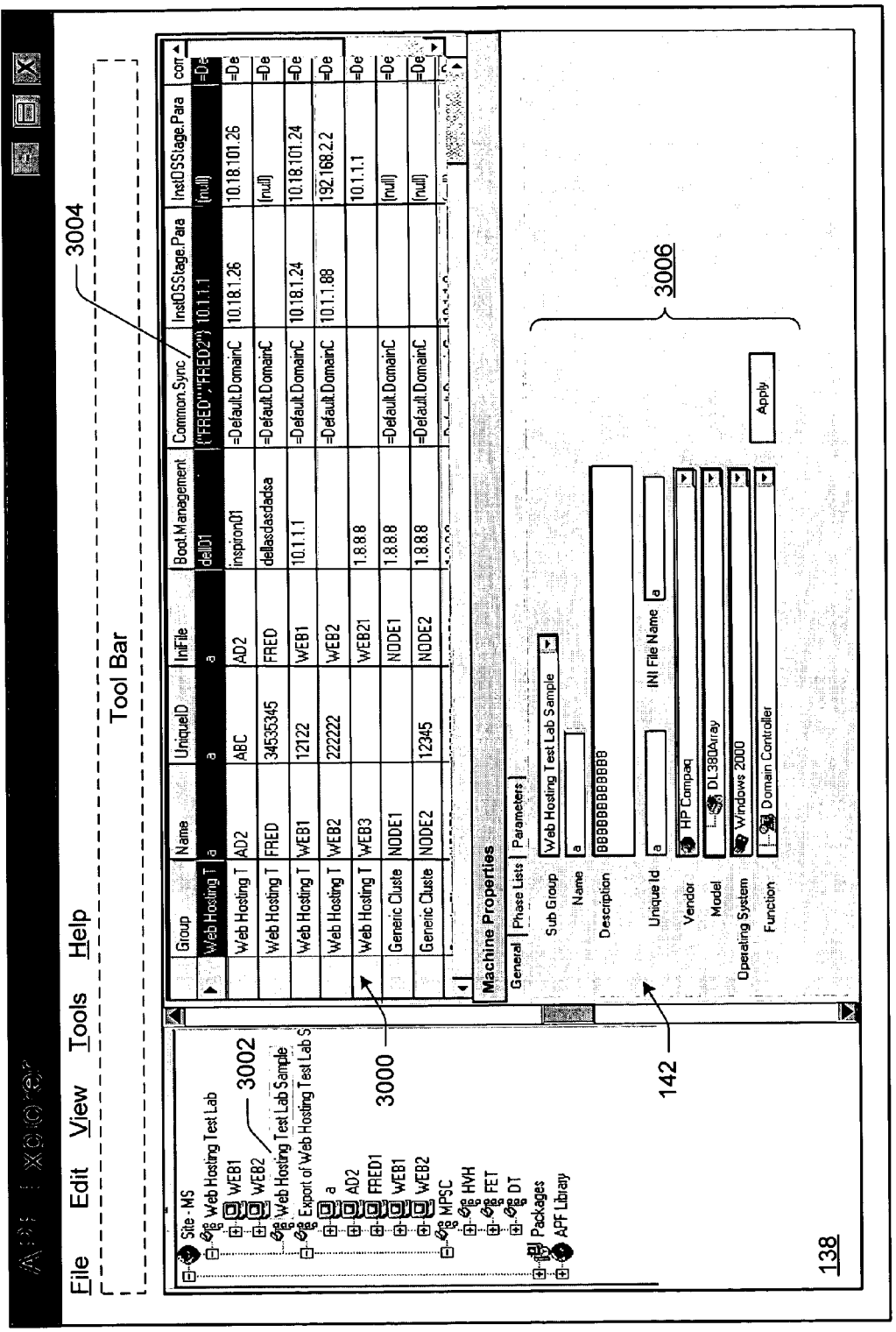

In contrast, FIGS. 30-33 use a so-called table view to present information regarding objects in the tree pane 138. As shown in FIG. 30, a table view 3000 provides information regarding machines in a group of machines using a table format. For instance, in FIG. 30, the user has selected the machine group "Web Host Test Lab Sample" 3002. The table view 3000 presents a table that identifies the machines in the group 3002 and also provides information regarding the machines, such as Name, UniqueID, IniFile, Boot.Management, Common.Sync, InstOSStage.Para, InstOSStage.Para, etc. The properties display pane 142 presents information regarding one or more selected machines in the table view 3000. For instance, the user in FIG. 30 has selected object 3004 in the table view 3000. The properties display pane 142 responds by providing information regarding the properties of this object 3004. More specifically, the properties display pane 142 allows the user to view: a) general information regarding the selected object; b) information regarding the phase list properties associated with the selected object; and c) information regarding the parameter properties associated with the selected object. In the case of FIG. 30, the user has selected a pane that provides general information 3006 regarding the selected object. The properties display pane 142 allows the user to edit and modify the properties of the selected machine—in this case, machine 3002.

To switch between tree view and table view, the user can right click on a selected group in the tree pane 138. This causes the presentation of a menu that gives the user the option of selected either the tree view or the table view. One reason that the user may want to select the table view is to edit groups of machines in an efficient en bloc manner. This editing technique is discussed further with respect to FIGS. 31-33.

Figure 31:
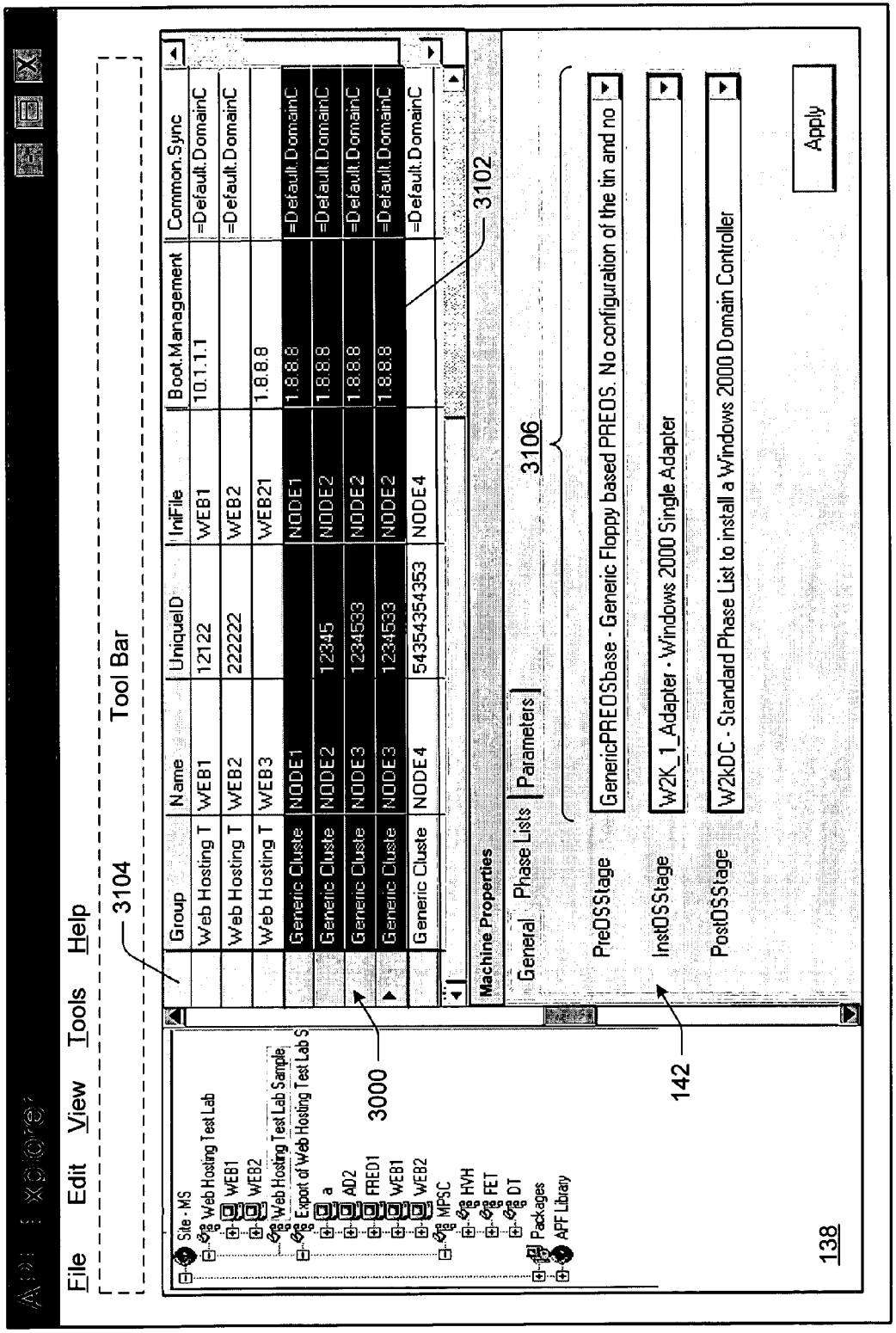

To begin with, in FIG. 31, the user has selected a group of machines 3102 in the table view 3000. This can be performed by left clicking and dragging on the row selection field 3104 using the mouse device. In the properties display pane 142, the user has opted to view the properties of the phase lists used in configuring the selected group of machines 3102. That is, a collection of fields 3106 shows information regarding the phase lists used in the PreOSStage, InstOSStage, and PostOSstage stages when configuring the selected group of machines 3102. Since multiple machines 3102 have been selected, there is a chance that different machines will use different phase lists. In this case, the build management logic 116 present blanks fields for any dissimilar phase lists in the collection 3106. However, in the example of FIG. 31, all of the machines in the selected group of machines 3102 use the same phase lists. The collection of fields 3106 therefore shows the common phase list information for the selected group of machines 3102. Any changes made to the collection of fields 3106 will modify the phase lists associated with all of the machines in the selected group of machines 3102 (that is, upon the user pressing the Apply control button). Accordingly, this editing technique provides a quick and efficient mechanism for changing common properties associated with multiple machines.

The build management logic 116 also gives the user the option of exporting the selected group of machines 3102 to a CVS file (i.e., a Comma-Separated Values file) or other kind of file. Information in this file can then be manipulating using conventional spreadsheet applications, such as the Excel software product produced by Microsoft Corporation of Redmond, Washington. The build management logic 116 also gives the user the option of importing CVS files. Thus, the user can export a group of machines, edit the machines using a spreadsheet application, and then import the edited machines back into the build management logic 116 for viewing on its UI.

Figure 32:
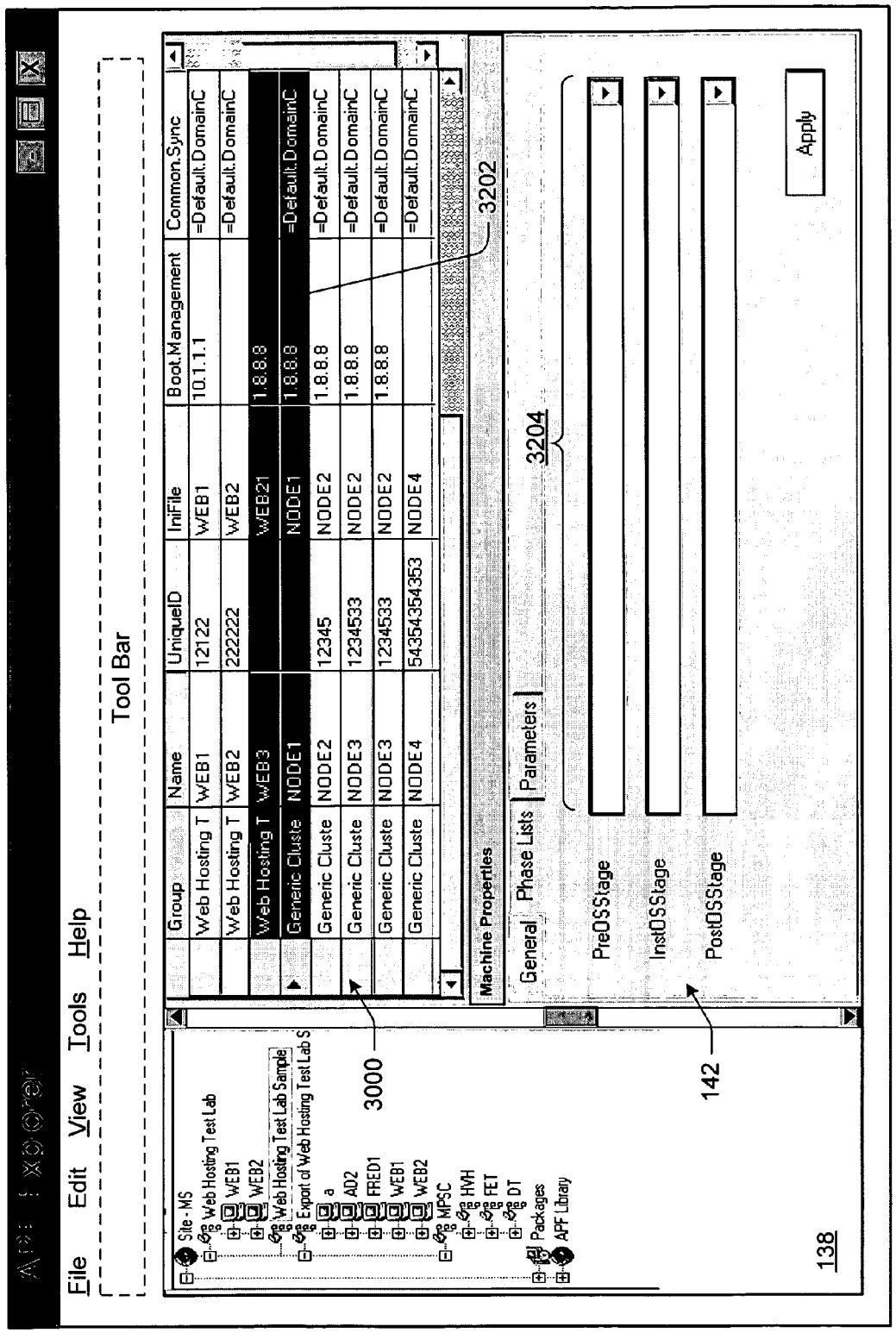

FIG. 32 shows the above-described case where the user has selected a group of machines 3202 that employ dissimilar phase lists. In this case, the collection of fields 3204 in the properties display pane 142 will present blank fields.

Figure 33:
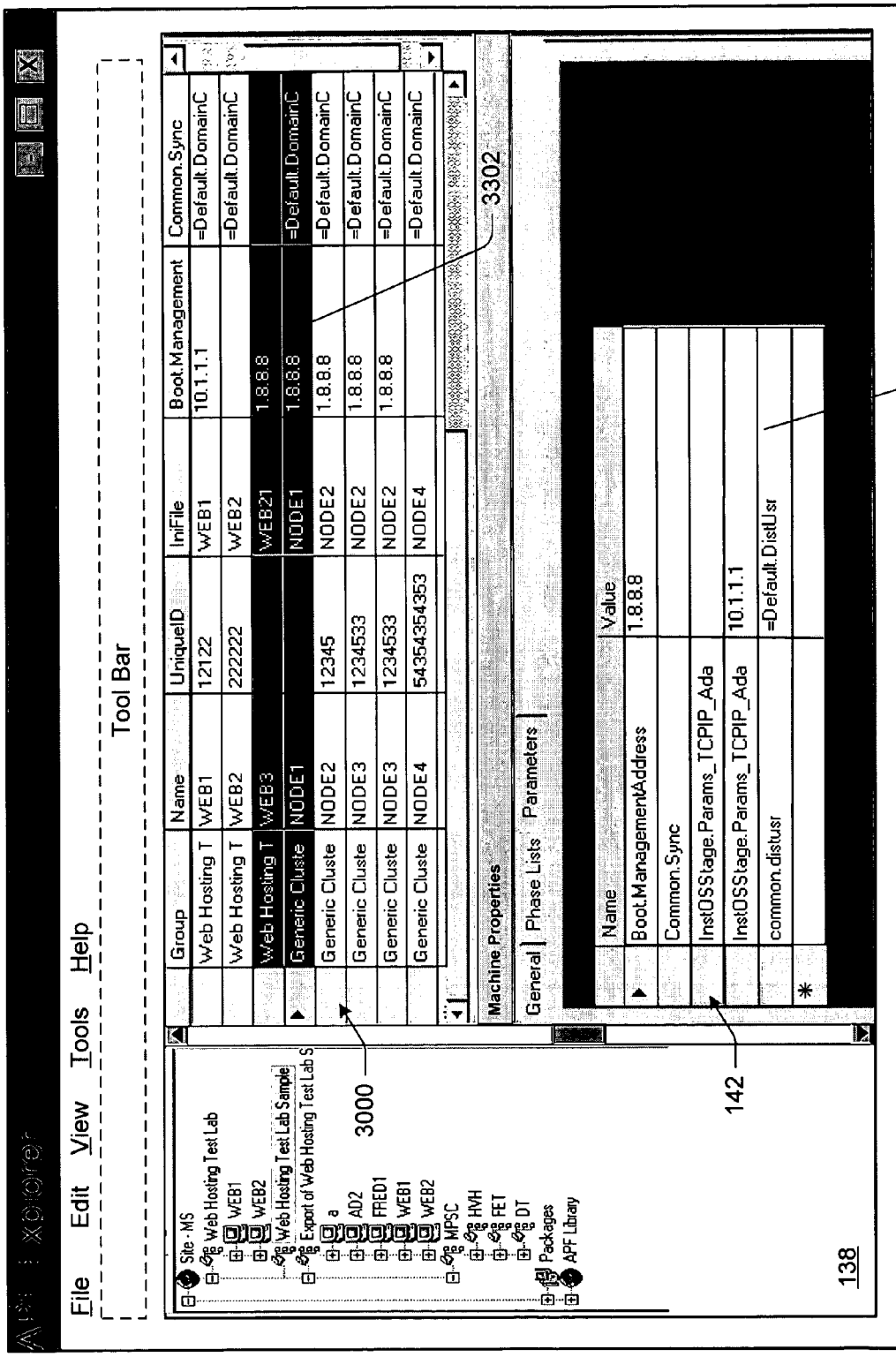

FIG. 33 shows the case where the user has opted to view the parameters associated with a selected group of machines 3302. In this case, the build management logic 116 provides a table 3304 that identifies the parameters associated with the selected group of machines 3302. By default, the build management logic 116 shows machine-specific parameters. Additional parameters can be shown by right clicking and selecting an "add parameter" option presented to the user. Again, if any of the parameters differ within the selected group of machines 3302, then the build management logic 116 displays a blank field for these parameters. A change to any of the parameter values shown in the table 3304 will affect all of the machines in the selected group of machines 3302.

C. Exemplary Method of Operation

Figure 34:
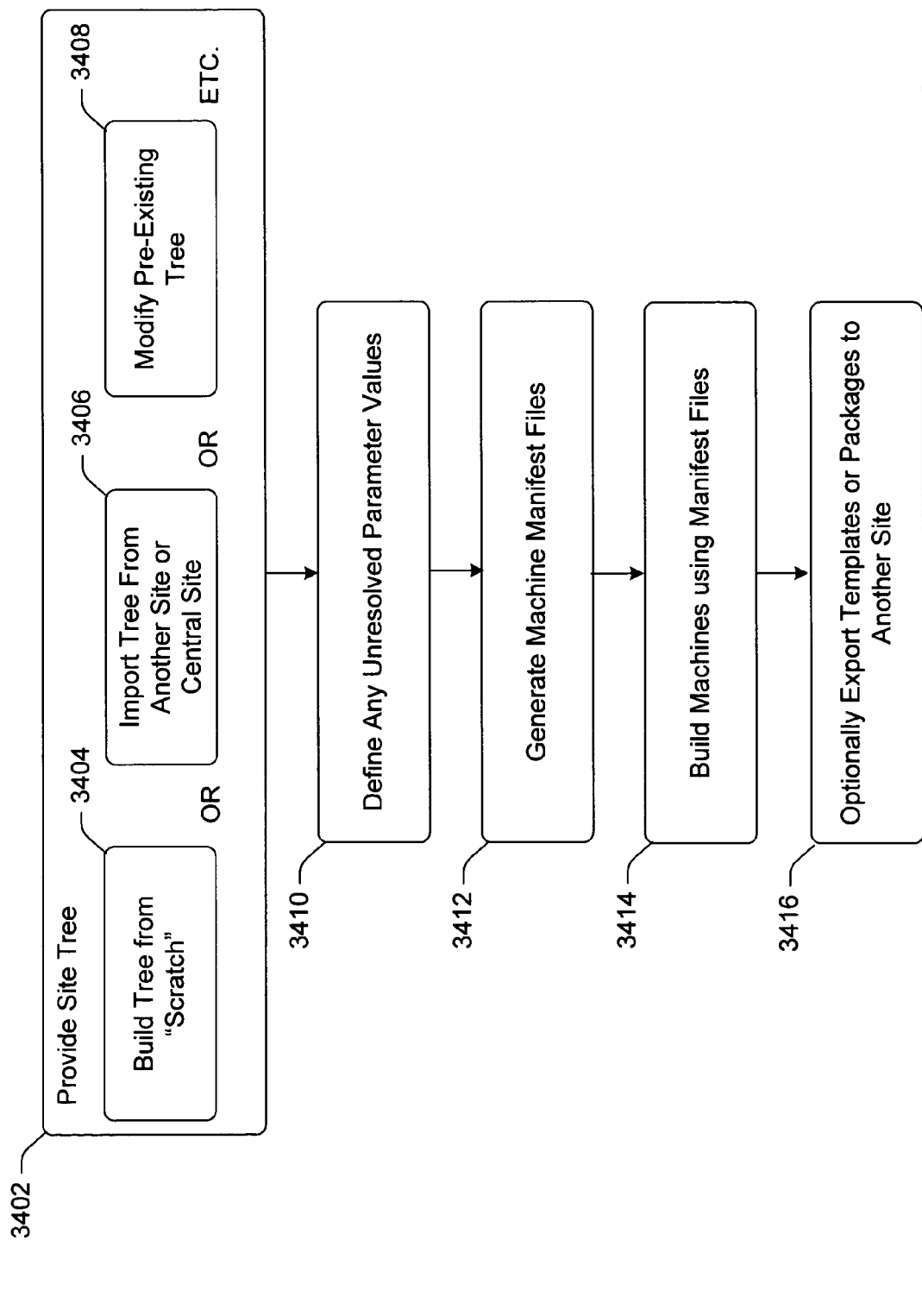
FIG. 34 shows an exemplary procedure for creating and applying configuration files using the system of FIG. 1.

FIG. 34 shows an overview of an exemplary procedure 3400 for creating and deploying configuration files using the system of FIG. 1. Step 3402 entails specifying the objects that govern the generation of the configuration files using the build management logic 116. The objects are arranged to form a hierarchical "site tree" shown in the UI presentation figures (i.e., FIGS. 10-29). The site tree can be produced using various techniques. Step 3404 entails building the tree from scratch by successively defining the properties of machines which make up the site tree based on a template. Step 3406 entails importing a site tree from another site or the central site 166. Step 3408 entails modifying a pre-existing site tree (if the user has permission to make such a modification) to produce a new site tree.

Step 3410 entails defining the values for any parameters that are mandatory yet remain unspecified. In one implementation, the build management logic 116 highlights critical unspecified parameters in the parameter display pane 140 of the UI presentation 128.

Step 3412 entails generating the manifest files based on the site tree defined in step 3402. Step 3414 entails actually building the machines based on the manifest files created in step 3412.

Step 3416 entails optionally exporting XML templates for a machine or group of machines to a destination site. Step 3416 can also involve creating a package and transferring the package to the destination site.

Figure 35:
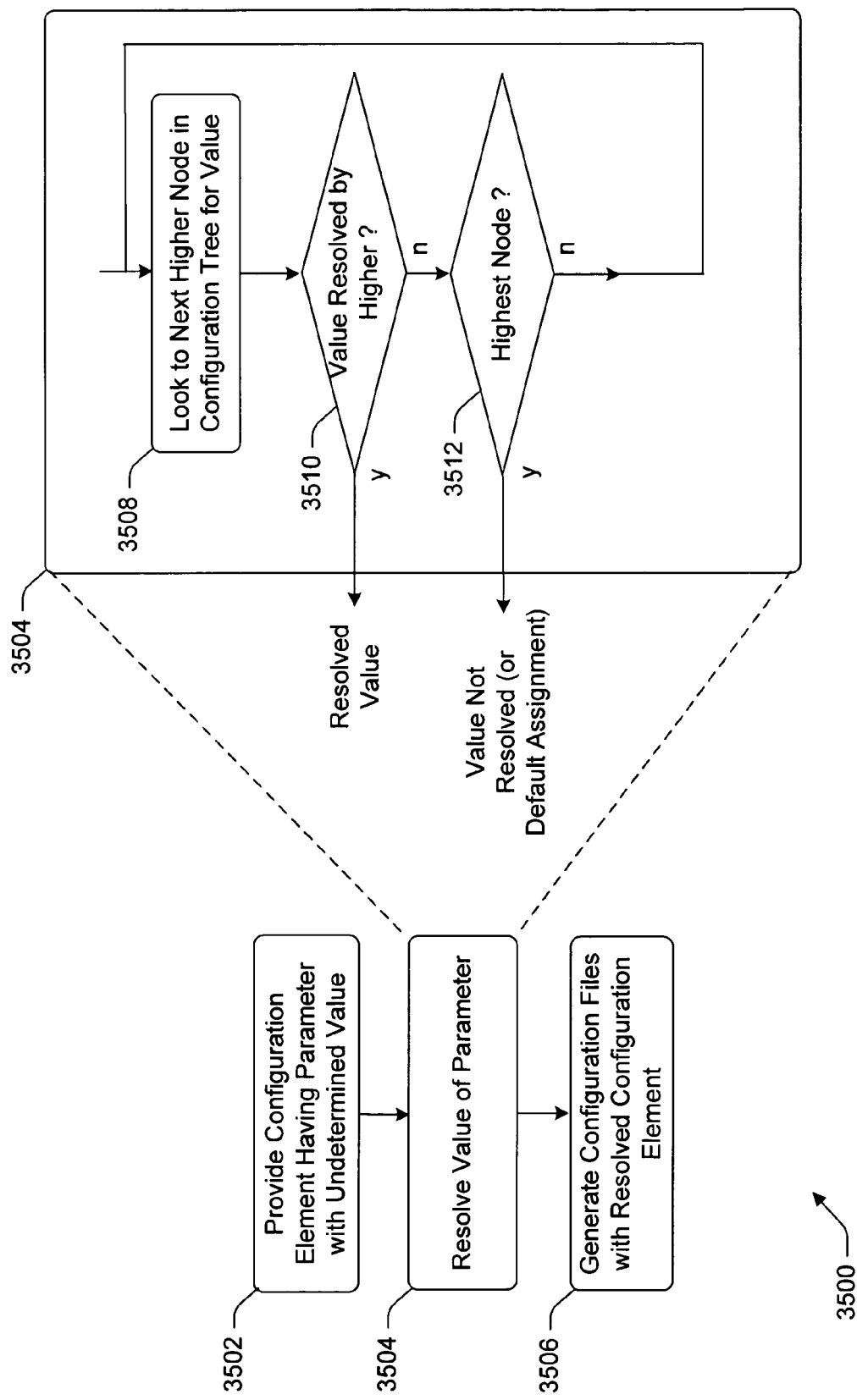
FIG. 35 shows an exemplary procedure whereby parameters associated with objects in a configuration hierarchy can inherit values from objects located higher in the hierarchy.

FIG. 35 shows an exemplary procedure 3500 whereby parameters associated with objects in a configuration hierarchy can inherit values from objects located higher in the hierarchy. Step 3502 involves adding a configuration object to a site tree, where the object has at least one parameter having an undetermined value. Step 3504 involves resolving the undetermined value. Step 3506 involves generating configuration files from the site tree once the value has been resolved. (However, in one implementation, the build management logic 116 does not perform step 3504 until the user enters a request to generate the configuration files.)

The step 3504 of resolving the value can involve performing the procedure shown in the right hand side of FIG. 35. In that procedure, step 3508 involves looking to a next higher node in the site tree to determine whether that node can resolve the undetermined value. If the value is resolved, as assessed in step 3510, then the procedure in step 3504 terminates. If the value is not resolved, then the flow advances to step 3512, which determines whether the top of the site tree has been reached without determination of the unspecified value. If this is the case, then the build management logic 116 can abandon the procedure shown in step 3504 and so notify the user (e.g., by highlighting the parameter having the missing value in the parameter display pane 140 of the UI interface 128). If the highest node has not been reached, the build management logic 116 repeats the above-described steps with respect to the next higher node in the site tree. In this manner, an initially undetermined value associated with an object in the site tree can inherit the value defined in a higher level of the site tree. This makes it easy to modify the site tree by adding and deleting objects in the site tree without having to perform pain-staking and ad hoc revision of the tree as a whole.

Other kinds of referencing strategies can be used to supplement the inheritance strategy described in procedure 3500.

Figure 36:
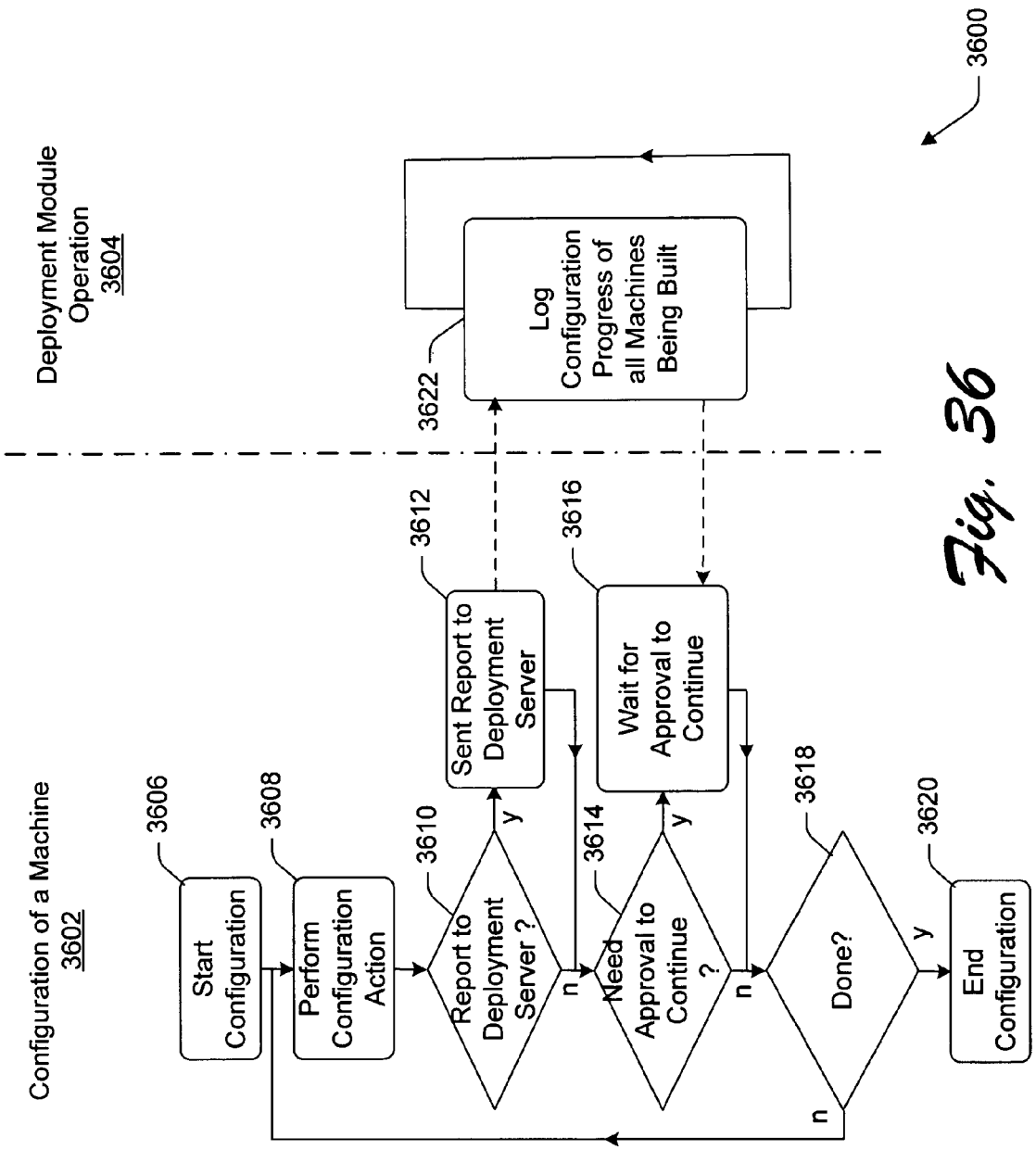
FIG. 36 shows an exemplary procedure for building a machine by taking into account interdependencies involved in configuring multiple machines.

FIG. 36 shows an exemplary procedure 3600 for building a machine by taking into account interdependencies involved in configuring multiple different machines. The left side 3602 of the figure shows operations performed locally at a machine being built (referred to as the "specified machine"). The right side 3604 of the figure shows operations performed at the deployment module 146 of FIG. 1.

Beginning with the left side 3602, step 3606 entails initiating the configuration of the specified machine based on previously defined manifest files for that machine. Step 3608 entails performing a configuration action specified in the manifest files. For instance, this step may involve executing a script associated with a phase specified in the manifest files, or performing part of a script associated with the phase. Step 3610 involves determining whether it is time to report the specified machine's progress in building the specified machine to the deployment module 146. For instance, the specified machine may report its progress at predetermined intervals, or after predetermined events have taken place, or in response to an express polling request by the deployment module 146. If step 3610 is answered in the affirmative, then step 3612 involves sending a report to the deployment module 146. Following steps 3610 and 3612, the specified machine determines whether it has reached a point in its configuration such that it needs to take into account dependencies between its own configuration progress and the configuration progress of other machines at the site. For instance, the specified machine may require a value that is furnished by other machines only when the other machines reach a predetermined point in their own configuration. Many other factors may create configuration interdependencies among multiple machines. Whatever the cause, at this juncture, step 3614 entails determining whether the specified machine needs to check the progress of the configuration of other machines before proceeding further with its own configuration. If this is so, step 3616 entails determining the status of other machines by querying the master dependency log 150. Once the specified machine is granted approval to proceed with its configuration, the flow advances to step 3618, in which it is determined whether the configuration of the specified machine has been completed. If this is the case, then, in step 3620, the configuration terminates. If the configuration has not finished, then the specified machine repeats the above-identified steps, that is, by performing the configuration of the machine in piecemeal fashion, stopping whenever necessary such that the other machines can catch up with it if need be.

Now referring to the right side 3604 of the figure, step 3622 generally represents the logging of progress information obtained from different machines within the master dependency log 150 of the deployment server 146. More specifically, as mentioned above, each machine periodically sends status reports to the master dependency log 150 in the deployment module 146. The status reports reflect each machine's progress in performing its allocated configuration tasks.

A machine being configured can periodically poll the information in the master dependency log 150, or can access the master dependency log 150 upon the occurrence of specific events (such as the machine reaching a predetermined point in its allocated configuration tasks). Information retrieved from the master dependency log 150 specifies how far other machines have advanced in their own configuration. This information, in turn, allows the machine to determine whether it can advance to a subsequent configuration task.

In the above discussion, a machine being configured played an active roll in polling the master dependency log 150, and then analyzing information obtained therefrom. However, may other strategies can be used to achieve the same monitoring function. For instance, the deployment module 146 can play an active role by periodically sending reports to each machine being configured which alerts each machine as to the configuration status of other machines. Alternatively, the deployment module 146 can include logic for resolving dependency synchronization issues, rather than allocating this determination to each individual machine being configured.

Figure 37:
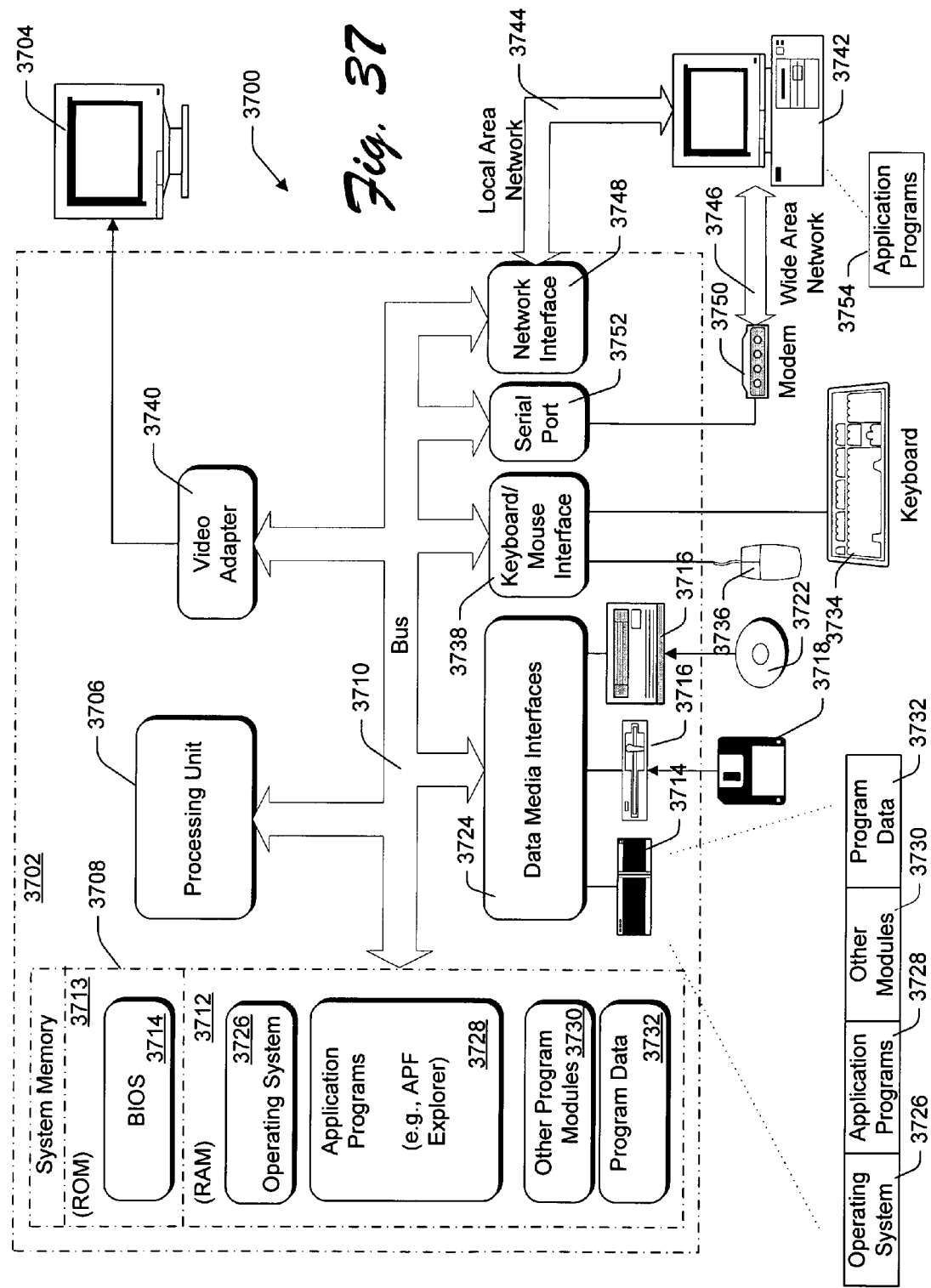
FIG. 37 shows an exemplary computer architecture that can be used to implement build management logic shown in FIG. 1.

D. Exemplary Computer Environment for Implementing the Configuration Management and Definition Module FIG. 37 shows an exemplary computer environment 3700 that can be used to implement any of the processing devices shown in FIG. 1, such as the configuration management and definition module 114 or the deployment module 146. The computing environment 3700 includes the general purpose computer 3702 and display device 3704 (which can correspond to the display device 134 shown in FIG. 1). However, the computing environment 3700 can include other kinds of computer and network architectures. For example, although not shown, the computer environment 3700 can include handheld or laptop devices, set top boxes, programmable consumer electronics, mainframe computers, gaming consoles, etc. Further, FIG. 37 shows objects of the computer environment 3700 grouped together to facilitate discussion. However, the computing environment 3700 can employ a distributed processing configuration. In a distributed computing environment, computing resources can be physically dispersed throughout the environment.

Exemplary computer 3702 includes one or more processors or processing units 3706, a system memory 3708, and a bus 3710. The bus 3710 connects various system components together. For instance, the bus 3710 connects the processor 3706 to the system memory 3708. The bus 3710 can be implemented using any kind of bus structure or combination of bus structures, including a memory bus or memory controller, a peripheral bus, an accelerated graphics port, and a processor or local bus using any of a variety of bus architectures. For example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 3702 can also include a variety of computer readable media, including a variety of types of volatile and non-volatile media, each of which can be removable or non-removable. For example, system memory 3708 includes computer readable media in the form of volatile memory, such as random access memory (RAM) 3712, and non-volatile memory, such as read only memory (ROM) 3713. ROM 3713 includes an input/output system (BIOS) 3714 that contains the basic routines that help to transfer information between objects within computer 3702, such as during start-up. RAM 3712 typically contains data and/or program modules in a form that can be quickly accessed by processing unit 3706.

Other kinds of computer storage media include a hard disk drive 3714 for reading from and writing to a non-removable, non-volatile magnetic media, a magnetic disk drive 3716 for reading from and writing to a removable, non-volatile magnetic disk 3718 (e.g., a "floppy disk"), and an optical disk drive 3720 for reading from and/or writing to a removable, non-volatile optical disk 3722 such as a CD-ROM, DVD-ROM, or other optical media. The hard disk drive 3714, magnetic disk drive 3716, and optical disk drive 3720 are each connected to the system bus 3710 by one or more data media interfaces 3724. Alternatively, the hard disk drive 3714, magnetic disk drive 3716, and optical disk drive 3720 can be connected to the system bus 3710 by a SCSI interface (not shown), or other coupling mechanism. Although not shown, the computer 3702 can include other types of computer readable media, such as magnetic cassettes or other magnetic storage devices, flash memory cards, CD-ROM, digital versatile disks (DVD) or other optical storage, electrically erasable programmable read-only memory (EEPROM), etc.

Generally, the above-identified computer readable media provide non-volatile storage of computer readable instructions, data structures, program modules, and other data for use by computer 3702. For instance, the readable media can store the operating system 3726, one or more application programs 3728 (such as the definition file module 118), other program modules 3730, and program data 3732.

The computer environment 3700 can include a variety of input devices. For instance, the computer environment 3700 includes the keyboard 3734 and a pointing device 3736 (e.g., a "mouse") for entering commands and information into computer 3702. The computer environment 3700 can include other input devices (not illustrated), such as a microphone, joystick, game pad, satellite dish, serial port, scanner, card reading devices, digital or video camera, etc. Input/output interfaces 3738 couple the input devices to the processing unit 3706. More generally, input devices can be coupled to the computer 3702 through any kind of interface and bus structures, such as a parallel port, serial port, game port, universal serial bus (USB) port, etc.

The computer environment 3700 also includes the display device 3704. A video adapter 3740 couples the display device 3704 to the bus 3710. In addition to the display device 3704, the computer environment 3700 can include other output peripheral devices, such as speakers (not shown), a printer (not shown), etc.

Computer 3702 can operate in a networked environment using logical connections to one or more remote computers, such as a remote computing device 3742. The remote computing device 3742 can comprise any kind of computer equipment, including a general purpose personal computer, portable computer, a server, a router, a network computer, a peer device or other common network node, etc. Remote computing device 3742 can include all of the features discussed above with respect to computer 3702, or some subset thereof.

Any type of network can be used to couple the computer 3702 with remote computing device 3742, such as a local area network (LAN) 3744, or a wide area network (WAN) 3746 (such as the Internet). When implemented in a LAN networking environment, the computer 3702 connects to local network 3744 via a network interface or adapter 3748. When implemented in a WAN networking environment, the computer 3702 can connect to the WAN 3746 via a modem 3750 or other connection strategy. The modem 3750 can be located internal or external to computer 3702, and can be connected to the bus 3710 via serial I/O interfaces 3752 other appropriate coupling mechanism. Although not illustrated, the computing environment 3700 can provide wireless communication functionality for connecting computer 3702 with remote computing device 3742 (e.g., via modulated radio signals, modulated infrared signals, etc.).

In a networked environment, the computer 3702 can draw from program modules stored in a remote memory storage device 3754. Generally, the depiction of program modules as discrete blocks in FIG. 37 serves only to facilitate discussion; in actuality, the programs modules can be distributed over the computing environment 3700, and this distribution can change in a dynamic fashion as the modules are executed by the processing unit 3706.

Wherever physically stored, one or more memory modules 3708, 3718, 3722, etc. can be provided to store the build management logic 116 programming code.

The server 166 illustrated in FIG. 1 can include a similar architecture to that described above, e.g., including one or more processing devices, one or more busses, system memory, input/output interfaces, and so on.

The design concepts disclosed herein are applicable to other business and technical environments. For instance, the design concepts are extendable to include management and resource mapping for other resources, such as network device ports, storage device resources, etc. In other application, the efficient transfer of XML template documents can be used to implement a software vending or subscription system.

E. Conclusion

A technique for abstracting the task of generating configuration instructions was described. The technique has the potential of expediting and facilitating the generation of configuration instructions, and for facilitating the transfer of configuration instructions between different users.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A system for generating configuration instructions to build a programmable machine that transfers the programmable machine from a generic machine into a specific machine that serves a specified role, comprising:
   a memory;
   a processor coupled to the memory;
   a build management logic configured to automate building by interacting with a library that is in a standardized and a generic form, wherein the generic form allows common building blocks to represent many different configuration options,
   wherein the library comprising:
      a plurality of objects representing aspects of a configuration process for a specific collection of programmable machines;
      a plurality of parameters associated with respective objects, wherein at least one of the parameters includes an unspecified value for the generic form; and
      the plurality of objects having attributes of an internal identification assigned to an object, a name assigned to the object, a description of the object, a version number of the object, an individual authorized to perform action on the object, an ID assigned to an owner of the object, and a parent of the object;
   wherein the build management logic configured to:
      specify a set of objects from the library to implement the configuration of the programmable machine, and to generate the configuration instructions from the set of objects;
      interact with a database, wherein the database includes packages which are collections of objects in the database assembled to be transferred from a site to another site;
      interact with a template storage providing templates, wherein the templates provide a skeleton representation of a machine or a group of machines and the templates may be exported and transferred to other sites to generate configuration instructions at the other sites;
      determine the unspecified value when generating configuration instructions for the specific combination of programmable machines; and
   the unspecified value is resolved by the build management logic looking to a next higher node in a site tree to determine whether that node can resolve the unspecified value, wherein the site tree is a hierarchical organization of objects in the library that are representative of machines to be configured at the site; and
      provide a user interface to manage data assignment for the specific collection of programmable machines, wherein the user interface accepts input and returns output; and
   an automatic purposing logic configured to provide functionality for manipulating a collection of scripts and associated parameters that are assembled to create the configuration instructions as the output of the user interface.

2. The system according to claim 1, wherein the set of objects from the library have a hierarchical order, and wherein the at least one parameter that includes the unspecified value is associated with an object located at a defined level within the hierarchal order.

3. The system according to claim 2, wherein the build management logic is configured to determine the unspecified value by determining the value from an object that is higher in the hierarchical order than the defined level.

4. The system according to claim 1, wherein the at least one parameter that includes the unspecified value comprises an expression that identifies a location to determine the value, and wherein the build management logic is configured to specify the value by accessing the location specified in the expression.

5. A computer readable storage medium executed on a computing device having data structures and machine readable instructions for implementing the library and the build management logic of claim 1.

6. A system for generating configuration instructions used to build a programmable machine that transfers the programmable machine from a generic machine into a specific machine that serves a specified role, comprising:
   a memory;
   a processor coupled to the memory;
   a build management logic configured to automate building by interacting with a library, wherein building blocks in the library form a hierarchical organization of objects that are representative of machines to be configured at a site,
   wherein the hierarchical organization of objects represents a relationship between different features of the machines, wherein a topmost object represents an aggregate of machines to be configured at the site; and the hierarchical organization of objects provides root objects for a root site, a collection of vendors, a collection of top level operating systems, and a collection of top level machine functions;

wherein the library having building blocks to provide configuration instructions for a specific collection of machines, grouping the building blocks into different categories, objects pertaining to different available vendors, the objects pertaining to different operating systems, the objects pertaining to different machine functions, and the objects related to stages and each of the stages includes multiple phases involved in configuring machines; and the library having generic objects representing aspects of a configuration process, wherein the generic form allows common building blocks to represent many different configuration options; and a template providing:

a framework representing the programmable machine in combination with information in the library to reconstruct a description of the programmable machine;

a standardized framework for passing information from one machine to another; and a pointer to a phase list which comprises multiple phases so a receiving site can reconstitute phases based on a local library at the site; and the build management logic configured to generate the configuration instructions used to build the programmable machine by organizing the generic objects in the library based on a the framework established by the template; the build management logic configured to cull a subset of information from a database and organize information into a package to transfer from the site to another site, wherein the database stores a collection of objects that allow a user to manage parameter information and determine at least one unspecified value of the parameter associated with the objects by looking to a next higher node in the hierarchical organization of objects; and the build management logic is further configured to provide a user interface displaying predetermined templates to accept input in response to the predetermined templates.

7. The system according to claim 6, wherein the template is expressed in a markup language and has a form defined by a schema.

8. The system according to claim 6, wherein the build management logic is configured to transfer the template to another user, or receive the template from the other user.

9. The system according to claim 6, wherein the build management logic is configured to transfer the template to a head-end site, or receive the template from the head-end site.

10. The system according to claim 6, wherein the build management logic is configured to encapsulate information obtained from the library and the template in a package, and to transfer the package to another site.

11. The system according to claim 6, wherein the build management logic is configured to generate a plurality of sets of configuration instructions to build a respective plurality of programmable machines.

12. The system according to claim 11, wherein the build management logic is configured to generate a synchronization file that specifies a manner in which the configuration of each machine in the plurality of programmable machines impacts other machines within the plurality of programmable machines.

13. A computer readable storage medium executed on a computing device having data structures and machine readable instructions for implementing the library and build management logic of claim 6.

14. A system for generating configuration instructions used to build a programmable machine that transfers the programmable machine from a generic machine into a specific machine that serves a specified role, comprising:

a memory;

a processor coupled to the memory;

a build management logic configured to automate building by interacting with a library, wherein the library includes building blocks to provide configuration instructions for a specific collection of machines, grouping the building blocks into different categories, objects pertaining to different available vendors, the objects pertaining to different operating systems, the objects pertaining to different machine functions, and the objects related to stages and each of stages includes multiple phases involved in configuring machines, the build management logic further configured to specify a set of objects from the library to implement the configuration of the programmable machine, and configured to generate the configuration instructions from the set of objects;

wherein, the library comprising:

a plurality of generic objects representing aspects of a configuration process for the programmable machine; and a plurality of parameters associated with respective generic objects;

a template providing a framework in combination with the library to reconstruct a description of the programmable machine, a standardized framework for passing information from one machine to another machine; and a pointer to a phase list which comprises multiple phases so a receiving site can reconstitute the phases based on the library at the site;

and a user interface configured to allow a user to interact with the build management logic, wherein the user interface displays predetermined templates to accept input in response to the predetermined templates.

15. The system according to claim 14, wherein the user interface further includes a tree display section configured to display objects organized as a hierarchical tree.

16. The system according to claim 15, wherein the user interface further includes a parameter display section configured to display information pertaining to parameters that are associated with at least one of the objects in the tree display section.

17. The system according to claim 16, wherein the user interface further includes a properties display section configured to display properties of at least one of the objects in the tree display section or at least one parameter in the parameter display section.

18. The system according to claim 14, wherein the build management logic includes logic configured to display ownership information associated with at least one object, wherein the ownership information determines a user's ability to perform actions on the at least one object.

19. The system according to claim 14, wherein the build management logic includes logic configured to display version information associated with information stored in the library.

20. The system according claim 14, wherein the build management logic further includes logic configured to restrict a user's right to manipulate information stored in the library based on the user's membership in one of a plurality of groups.

21. The system according to claim 14, wherein the build management logic includes logic configured to apply validation rules to the entry of parameter information to determine whether the entered parameter information meets predetermined criteria.

22. A method for generating configuration instructions used to build a programmable machine that transfers the programmable machine from a generic machine into a specific machine that serves a specified role, comprising:
a build management logic configured to automate building by interacting with a library, wherein the library having:
a plurality of objects representing aspects of a configuration process for a specific collection of programmable machines, wherein the plurality of objects having attributes of an internal identification assigned to an object, a name assigned to the object, a description of the object, a version number of the object, an individual authorized to perform action on the object, an identifier assigned to an owner of the object, and a parent of the object; and
a plurality of parameters associated with respective objects, wherein at least one of the parameters includes an unspecified value, wherein the unspecified value is resolved by the build management logic looking to a next higher node in a site tree to determine whether that node can resolve the unspecified value, wherein the site tree is a hierarchical organization of the plurality of objects;
specifying a set of objects from the library to implement the configuration of the programmable machine;
generating the configuration instructions from the set of objects for the specific combination of programmable machines, including determining the value of the unspecified value;
providing packages which are collections of objects in a database assembled together as a single file to be transferred from a site to another site;
providing a template to provide a skeleton representation of a machine or a group of machines and the template may be exported and transferred to other sites to generate configuration instructions at the other sites;
filling out the template that governs an organization and a nature of the group of machines;
filling out the template that governs a makeup of individual machines in the group of machines; and
providing a user interface by the build management logic to manage data assignment for the specific collection of programmable machines, wherein the user interface accepts input and returns output, wherein the output is the configuration instructions for the specific collection of programmable machines.

23. The method according to claim 22, wherein the set of objects from the library have a hierarchical order, and wherein the at least one parameter that includes the unspecified value is associated with an object located at a defined level within the hierarchal order.

24. The method according to claim 23, wherein the determining of the value comprises determining the value from an object that is higher in the hierarchical order than the defined level.

25. The method according to claim 22, wherein the at least one parameter that includes the unspecified value comprises an expression that identifies a location to determine the value, and wherein the determining of the value comprises accessing the location specified in the expression.

26. A computer readable storage medium executed on a computing device having data structures and machine readable instructions for implementing the method of claim 22.

27. A method for generating configuration instructions used to build a programmable machine that transfers the programmable machine from a generic machine into a specific machine that serves a specified role, comprising:
providing a library having generic objects representing aspects of a configuration process for a specific collection of programmable machines;
building blocks in the library form a hierarchical organization of objects that are representative of machines to be configured at a site, wherein the hierarchical organization of objects represents a relationship between different features of the machines, wherein a topmost object represents an aggregate of machines to be configured at the site, and provides root objects for a root site, a collection of vendors, a collection of top level operating systems, and a collection of top level machine functions;
wherein the building blocks provide configuration instructions for a specific collection of machines, grouping the building blocks into different categories, objects pertaining to different available vendors, the objects pertaining to different operating systems, the objects pertaining to different machine functions, and the objects related to stages and each of the stages includes multiple phases involved in configuring machines;
providing a template, wherein the template to give a skeleton representation of a machine or a group of machines and the templates may be exported and transferred to other sites to generate configuration instructions at the other sites;
determining the value of the unspecified value for the object by looking to a next higher node in hierarchical organization of the objects to resolve the unspecified value;
generating configuration instructions used to build the programmable machine by organizing the generic objects in the library based on a framework established by the template;
wherein generating configuration instructions for the specific combination of programmable machines established by the template;
providing packages which are collections of objects in a database that are assembled as a single file to be transferred from a site to another site;
providing a user interface to manage data assignment for the specific collection of programmable machines, wherein the user interface accepts input and returns output, wherein the output is the configuration instructions for the specific collection of programmable machines.

28. The method according to claim 27, wherein the template is expressed in a markup language and has a form defined by a schema.

29. The method according to claim 27, further comprising transferring the template to another user, or receiving the template from the other user.

30. The method according to claim 27, further comprising transferring the template to a head-end site, or receiving the template from the head-end site.

31. The method according to claim 27, further comprising:
encapsulating information obtained from the library and the template in a package; and
transferring the package to another site.

32. The method according to claim 27, further comprising generating a plurality of sets of configuration instructions to build a respective plurality of programmable machines.

33. The method according to claim 32, further comprising generating a synchronization file that specifies a manner in which the configuration of each machine in the plurality of programmable machines impacts other machines within the plurality of programmable machines.

34. A computer readable storage medium executed on a computing device having data structures and machine readable instructions for implementing the method of claim 27.

* * * * *